United States Patent
Isahaya et al.

(10) Patent No.: US 10,053,537 B2
(45) Date of Patent: *Aug. 21, 2018

(54) HIGH-FLUIDITY POLYCARBONATE COPOLYMER, PROCESS FOR PRODUCTION HIGHLY POLYMERIZED AROMATIC POLYCARBONATE RESIN AND AROMATIC POLYCARBONATE COMPOUND

(71) Applicant: MITSUBISHI GAS CHEMICAL COMPANY, INC., Tokyo (JP)

(72) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Yousuke Shinkai, Tokyo (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/135,063

(22) Filed: Apr. 21, 2016

(65) Prior Publication Data

US 2016/0264726 A1    Sep. 15, 2016

Related U.S. Application Data

(62) Division of application No. 14/118,439, filed as application No. PCT/JP2012/062853 on May 18, 2012, now Pat. No. 9,353,216.

(30) Foreign Application Priority Data

May 19, 2011 (JP) ................. 2011-112087
May 19, 2011 (JP) ................. 2011-112933

(51) Int. Cl.
| | |
|---|---|
| *C08G 64/16* | (2006.01) |
| *C08G 64/30* | (2006.01) |
| *C08G 64/06* | (2006.01) |
| *C08G 64/42* | (2006.01) |
| *C08G 64/20* | (2006.01) |
| *C08G 64/18* | (2006.01) |
| *C08J 5/18* | (2006.01) |
| *B29C 67/24* | (2006.01) |
| *C08G 64/14* | (2006.01) |
| *B29K 69/00* | (2006.01) |

(52) U.S. Cl.
CPC ............. *C08G 64/06* (2013.01); *B29C 67/24* (2013.01); *C08G 64/14* (2013.01); *C08G 64/1608* (2013.01); *C08G 64/18* (2013.01); *C08G 64/20* (2013.01); *C08G 64/305* (2013.01); *C08G 64/42* (2013.01); *C08J 5/18* (2013.01); *B29K 2069/00* (2013.01); *C08J 2369/00* (2013.01)

(58) Field of Classification Search
None
See application file for complete search history.

(56) References Cited

U.S. PATENT DOCUMENTS

| | | | |
|---|---|---|---|
| 3,166,606 A | 1/1965 | Reinkiag et al. | |
| 3,535,280 A | 10/1970 | Schnell et al. | |
| 4,460,752 A | 7/1984 | Neuray et al. | |
| 4,762,896 A | 8/1988 | Fox et al. | |
| 5,410,014 A | 4/1995 | Haese et al. | |
| 5,521,275 A | 5/1996 | McCloskey et al. | |
| 5,696,222 A | 12/1997 | Kaneko et al. | |
| 5,703,196 A | 12/1997 | Funakoshi et al. | |
| 5,747,632 A | 5/1998 | Adachi et al. | |
| 6,255,438 B1 | 7/2001 | Whitney et al. | |
| 6,300,459 B1 | 10/2001 | Kaneko et al. | |
| 6,399,738 B1 | 6/2002 | Ito | |
| 6,462,165 B1 | 10/2002 | Ito et al. | |
| 8,674,053 B2 | 3/2014 | Isahaya et al. | |
| 8,969,505 B2 | 3/2015 | Isahaya et al. | |
| 9,353,216 B2* | 5/2016 | Isahaya ............. | C08G 64/1608 |

(Continued)

FOREIGN PATENT DOCUMENTS

| | | |
|---|---|---|
| DE | 4244008 | 6/1994 |
| EP | 0033089 | 8/1981 |

(Continued)

OTHER PUBLICATIONS

ISOCHEM product sheet for 5-butyl-5-ethyl-1,3-Dioxan-2-one, (2016).*
CHEMEO chemical properties of 5,5-dimethyl-1,3-dioxan-2-one, (2016).*
LeGrand, Handbook of Polycarbonate Science and Technology; (2000) p. 180-181. (Year: 2000).*
United States Office Action in respect to U.S. Appl. No. 14/441,956 (published as US 2015-0322203), dated Dec. 11, 2015.
Extended European Search Report in respect to European Application No. 12785306.7, dated Feb. 17, 2015.

(Continued)

*Primary Examiner* — David J Buttner
(74) *Attorney, Agent, or Firm* — Greenblum & Bernstein, P.L.C.

(57) ABSTRACT

Copolymer having high fluidity and high molecular weight which is formed of a structural unit derived from an aliphatic diol compound and a structural unit derived from an aromatic dihydroxy compound. A polycarbonate resin composition is also provided comprising a highly polymerized aromatic polycarbonate resin as a main component and also comprising cyclic carbonate present in an amount of not more than 3000 ppm, wherein the highly polymerized aromatic polycarbonate resin is produced by a process which comprises a highly-polymerizing process wherein an aromatic polycarbonate is reacted with an aliphatic diol compound in the presence of a transesterification catalyst to increase the molecular weight.

2 Claims, 7 Drawing Sheets

(56) References Cited

U.S. PATENT DOCUMENTS

| | | | |
|---|---|---|---|
| 9,428,608 B2* | 8/2016 | Isahaya | C08G 64/06 |
| 9,499,661 B2* | 11/2016 | Isahaya | C08G 64/38 |
| 9,546,249 B2* | 1/2017 | Isahaya | C08G 64/06 |
| 9,822,218 B2* | 11/2017 | Isahaya | C08G 64/06 |
| 2004/0260049 A1 | 12/2004 | Miyamoto et al. | |
| 2007/0135569 A1 | 6/2007 | DeRudder | |
| 2011/0021739 A1 | 1/2011 | Miyamoto et al. | |
| 2013/0310535 A1 | 11/2013 | Kato et al. | |
| 2013/0317182 A1 | 11/2013 | Isahaya et al. | |
| 2014/0206826 A1 | 7/2014 | Isahaya et al. | |
| 2014/0221541 A1 | 8/2014 | Tajima et al. | |
| 2014/0371404 A1 | 12/2014 | Isahaya et al. | |
| 2015/0267006 A1 | 9/2015 | Isahaya et al. | |
| 2015/0274887 A1 | 10/2015 | Isahaya et al. | |
| 2016/0272757 A1* | 9/2016 | Isahaya | C08G 64/305 |
| 2017/0174833 A1 | 6/2017 | Isahaya et al. | |

FOREIGN PATENT DOCUMENTS

| | | | |
|---|---|---|---|
| EP | 0 595 608 | | 5/1994 |
| EP | 1363962 | | 11/2003 |
| JP | S56-45945 | | 4/1981 |
| JP | 02120356 | * | 5/1990 |
| JP | H02-153923 | | 6/1990 |
| JP | 4-153218 | | 5/1992 |
| JP | H04-366128 | | 12/1992 |
| JP | H05-39354 | | 2/1993 |
| JP | H05-140435 | | 6/1993 |
| JP | H05-186676 | | 7/1993 |
| JP | 5-287070 | | 11/1993 |
| JP | 6-41290 | | 2/1994 |
| JP | H06-073280 | | 3/1994 |
| JP | H06-157891 | | 6/1994 |
| JP | 06239989 | * | 8/1994 |
| JP | H06-228301 | | 8/1994 |
| JP | H06-94501 | | 11/1994 |
| JP | H07-173277 | | 7/1995 |
| JP | H08-003397 | | 1/1996 |
| JP | H08-081552 | | 3/1996 |
| JP | 2521375 | | 5/1996 |
| JP | H11-001551 | | 1/1999 |
| JP | H11-181198 | | 7/1999 |
| JP | 2000-281769 | | 10/2000 |
| JP | 3141297 | | 3/2001 |
| JP | 3271353 | | 4/2002 |
| JP | 3301453 | | 7/2002 |
| JP | 3317555 | | 8/2002 |
| JP | 3379265 | | 2/2003 |
| JP | 2003-238790 | | 8/2003 |
| JP | 2004-035587 | | 2/2004 |
| JP | 2004-250551 | | 9/2004 |
| JP | 2005-060540 | | 3/2005 |
| JP | 2005-113003 | | 4/2005 |
| JP | 2006-509862 | | 3/2006 |
| JP | 2006-89757 | | 4/2006 |
| JP | 3785965 | | 6/2006 |
| JP | 3874671 | | 1/2007 |
| JP | 2007-039490 | | 2/2007 |
| JP | 3962883 | | 8/2007 |
| JP | 2007-308687 | | 9/2007 |
| JP | 4030749 | | 1/2008 |
| JP | 2008-037965 | | 2/2008 |
| JP | 2008-115249 | | 5/2008 |
| JP | 2008-514754 | | 5/2008 |
| JP | 4112979 | | 7/2008 |
| JP | 2009-52027 | | 3/2009 |
| JP | 2009-57574 | | 3/2009 |
| JP | 2009-102536 | | 5/2009 |
| JP | 4286914 | | 7/2009 |
| JP | 2010-132929 | | 6/2010 |
| WO | 95/27749 | | 10/1995 |
| WO | 99/047580 | | 9/1999 |
| WO | 2002-053623 | | 7/2002 |
| WO | 2004/052991 | | 6/2004 |
| WO | 2006/036545 | | 4/2006 |
| WO | 2007/132596 | | 11/2007 |
| WO | 2011/062220 | | 5/2011 |
| WO | 2012/052988 | | 2/2012 |
| WO | 2012/108510 | | 8/2012 |
| WO | 2012/157766 | | 11/2012 |

OTHER PUBLICATIONS

U.S. Appl. No. 14/368,043 to Yoshinori Isahaya et al., filed Jun. 23, 2014.

Search report from International Bureau of WIPO in PCT/JP2012/062853, dated Jun. 26, 2012.

* cited by examiner

HIGH-FLUIDITY POLYCARBONATE COPOLYMER, PROCESS FOR PRODUCTION HIGHLY POLYMERIZED AROMATIC POLYCARBONATE RESIN AND AROMATIC POLYCARBONATE COMPOUND

CROSS-REFERENCE TO RELATED APPLICATIONS

The present application is a divisional of U.S. application Ser. No. 14/118,439, now U.S. Pat. No. 9,353,216, which is a national stage of International Patent application No. PCT/JP2012/062853, filed May 18, 2012, which claims priority of JP 2011-112087, filed May 19, 2011 and JP 2011-112933, filed May 19, 2011. The entire disclosures of U.S. application Ser. No. 14/118,439 and International patent application No. PCT/JP2012/062853 are expressly incorporated by reference herein.

TECHNICAL FIELD

The present invention relates to a novel high-fluidity polycarbonate copolymer. More precisely, the present invention relates to a polycarbonate copolymer having a specific which exhibits high fluidity in spite of having a high molecular weight.

The present invention also relates to a novel process for producing a highly polymerized polycarbonate resin. More precisely, the present invention relates to a process for producing a highly polymerized polycarbonate resin comprising a highly polymerization process wherein an aromatic polycarbonate is reacted with an aliphatic diol compound having a specific structure while removing by-product cyclic carbonate to be highly polymerized.

The present invention also relates to a novel aromatic polycarbonate compound. More precisely, the present invention relates to an aromatic polycarbonate compound having a low concentration of terminal hydroxy groups which can suitably be used for a process for production of a highly polymerized aromatic polycarbonate resin comprising a highly polymerization process wherein said aromatic polycarbonate compound is reacted with an aliphatic diol compound having a specific structure, and to a prepolymer material containing said aromatic polycarbonate compound.

BACKGROUND ART

Since polycarbonate is excellent in heat resistance, impact resistance and transparency, it has been widely used in many fields in recent years. Various studies have been carried out with processes for production of polycarbonate. Among them, polycarbonate derived from aromatic dihydroxy compounds such as 2,2-bis(4-hydroxyphenyl)propane, hereinafter "bisphenol A", is industrialized by both processes of interfacial polymerization and melt polymerization.

According to the interfacial polymerization, polycarbonate is produced from bisphenol A and phosgene, but toxic phosgene has to be used. In addition, it remains a problem such as corrosion of equipments caused by by-products such as hydrogen chloride and sodium chloride and chlorine-containing compounds such as methylene chloride used in great quantities as a solvent, and difficulties in removal of impurities such as sodium chloride or residual methylene chloride which might have an influence on polymer properties.

Meanwhile, as a method for producing polycarbonate from an aromatic dihydroxy compound and diarylcarbonates, a melt-polymerization method has been long known, wherein, for example, bisphenol A and diphenylcarbonate are polymerized through a transesterification reaction under melting conditions while removing by-product aromatic monohydroxy compounds. Unlike the interfacial polymerization method, the melt-polymerization method has advantages such as not using solvents. However, it has an essential problem as follows: As the polymerization proceeds, viscosity of polymer in the system increases drastically to make it difficult to remove by-product aromatic monohydroxy compounds efficiently out of the system which would cause the reaction rate extremely decrease to make it difficult to increase the polymerization degree.

In order to solve the above problem, various attempts have been studied to extract aromatic monohydroxy compounds from polymer under conditions of high viscosity. For example, Patent Document 1 (Japanese Examined Patent Application Publication No. S50-19600) discloses a screw-type polymerization vessel having a vent. Patent Document 2 (Japanese Unexamined Patent Application Publication No. H02-153923) discloses a method using a thin-film evaporator in combination with a horizontal polymerizer.

Patent Document 3 (U.S. Pat. No. 5,521,275) discloses a method for redistribution of molecular weight of an aromatic polycarbonate under the presence of a catalyst using an extruder having a polymer seal and a vent under reduced pressure.

However, the methods disclosed in the above documents would not be able to increase the molecular weight of polycarbonate sufficiently. The above methods for increasing the molecular weight using catalyst in large quantity or using strict conditions such as applying a high shearing might cause problems which would have a significant influence to polymer such as the deterioration in hue or the progress of a cross-linking reaction.

It is known that the polymerization degree of polycarbonate can be increased by adding a polymerization accelerator to the reaction system of melt-polymerization. Increasing the molecular weight under a short reaction residence time and a low reaction temperature enables to increase the production volumes of polycarbonate which would make it easy to design simple and inexpensive reaction vessels.

Patent Document 4 (European Patent No. 0 595 608) discloses a method for reacting several diarylcarbonates at the time of redistribution which, however, would not bring a significant increase in molecular weight. Patent Document 5 (U.S. Pat. No. 5,696,222) discloses a method for producing a highly polymerized polycarbonate by adding a certain type of polymerization accelerator such as arylester compounds of carbonic acid and dicarboxylic acid including bis (2-methoxyphenyl) carbonate, bis (2-ethoxyphenyl) carbonate, bis (2-chlorophenyl) carbonate, bis (2-methoxyphenyl) terephthalate and bis (2-methoxyphenyl) adipate.

Said Patent Document 5 teaches that an ester bond is introduced by using esters as a polymerization accelerator, which causes the production of a polyestercarbonate copolymer, instead of producing a homopolymer, which is low in hydrolytic stability.

Patent Document 6 (Japanese Patent No. 4,112,979) discloses a method of reacting several salicylic carbonates with an aromatic polycarbonate in order to increase the molecular weight thereof.

Patent Document 7 (Japanese Unexamined Patent Application Publication (Translation of PCT Application) No. 2008-514754) discloses a method of introducing polycarbonate oligomer and bis-salicylic carbonate or the like into an extruder to increase in molecular weight.

Patent Document 8 (Japanese Patent No. 4286914) discloses a method of increasing the amount of terminal hydroxy groups by an active hydrogen compound such as a dihydroxy compound and subsequently to carry out a coupling reaction of the aromatic polycarbonate having the increased amount of terminal hydroxy groups using a salicylic acid ester derivative.

However, the method disclosed in the above document requiring the amount of terminal hydroxy groups of polycarbonate is complicated in processes because it needs both a reaction process with an active hydrogen compound and a reaction process with a salicylic acid ester derivative. In addition, according to the method, polycarbonate having many terminal hydroxy groups is low in thermal stability and has a risk of deterioration in physical properties. As shown in Non-Patent Documents 1-2, the increase in the amount of hydroxy groups by active hydrogen compounds might induce a partial chain-decoupling reaction accompanied by widening of the molecular weight distribution. Furthermore, relatively large amount of catalyst is required to obtain a sufficiently high reaction rate, which might bring about deterioration in physical properties at the time of forming processes.

Several methods for producing polycarbonate by adding diol compounds in the reaction system are proposed. For example, Patent Document 9 (Japanese Examined Patent Application Publication No. H06-94501) discloses a process for producing a high-molecular polycarbonate by introducing 1,4-cyclohexanediol. According to the method disclosed therein, however, 1,4-cyclohexanediol is introduced together with an aromatic dihydroxy compound into the polycondensation reaction system from the beginning and therefore, 1,4-cyclohexanediol would be consumed first by the polycarbonate-forming reaction to form an oligomer, and then the aromatic dihydroxy compound would be reacted to participate the highly polymerization reaction. For this reason, it has such a defect that the reaction time would become relatively long, which might cause the deterioration of appearance features such as the color or hue.

Patent Document 10 (Japanese Unexamined Patent Application Publication No. 2009-102536) discloses a process for producing polycarbonate by copolymerizing specific aliphatic diol and etherdiol. However, since the polycarbonate disclosed therein has an isosorbide skeleton as a main structure, excellent impact resistance required to aromatic polycarbonates would not be exhibited.

A method of adding cyclic carbonate compound to the reaction system (Patent Document 11; Japanese Patent No. 3271353) and a method of adding a diol having hydroxyl groups having basicity higher than that of hydroxyl groups of the dihydroxy compound (Patent Document 12; Japanese Patent No. 3301453, Patent Document 13; Japanese Patent No. 3317555) are also provided. However, none of them succeeded in providing a highly polymerized polycarbonate resin having totally satisfying performances.

As mentioned above, the conventional methods for producing highly polymerized aromatic polycarbonate have many problems, and still there are requests for developing an improved production method which enables the increase in molecular weight of the aromatic polycarbonate resin satisfactorily while keeping good quality that a polycarbonate originally has.

A polycarbonate also has defects that it is poor in fluidity, and has difficulty in molding precision components or thin parts by injection molding. In order to improve fluidity, increase in a molding temperature and/or a die temperature is required, which might cause problems such as lengthening of a molding cycle, increase in mold cost and deterioration of polycarbonate during molding.

Examples of methods for improving fluidity include the decrease in weight average molecular weight of a polycarbonate. However, the polycarbonate thus obtained has defects of a significant decrease in impact resistance and stress cracking-resistance, and also in solvent resistance.

It is proposed to improve fluidity by widening a molecular weight distribution by blending polycarbonates having different molecular weight (Patent Document 14; U.S. Pat. No. 3,166,606, Patent Document 15; Japanese Unexamined Patent Application Publication No. S56-45945).

According to the above methods, polycarbonate resin compositions which are a non-Newtonian fluid having a large die swell were obtained. However, these polycarbonate resin compositions have lower fluidity under a low-shear stress compared to ones having a normal molecular weight distribution, whereas they have fluidity comparable with ones having a normal molecular weight distribution under a high-shear stress. These polycarbonate resin compositions certainly have a property of a non-Newtonian fluid having a large ratio of fluidity under a high-shear stress and those under a low-shear stress, but fluidity itself was not so excellent compared to the conventional ones. In addition, since the polycarbonate resin compositions have a wide molecular weight distribution, mechanical strength of the mold products would be deteriorated because of the low-molecular weight components. In the case of using a polycarbonate having an extremely high-molecular-weight range in order to obtain a polycarbonate having an intended molecular weight, the deterioration of hue of the molded products might be incurred caused by the increase in the content of colored components derived from a relatively long residence time.

The above-mentioned Patent Document 9 disclosing a method for producing a high-molecular-weight polycarbonate by introducing 1,4-cyclohexanediol does not teach anything about impact resistance or fluidity which are important properties of a polycarbonate, while it is described about heat resistance and tensile strength.

Besides the above documents, various methods for high fluidization of a polycarbonate are proposed. Examples of the proposals include Patent Documents 16-18 which disclose a method of adding a low-molecular weight oligomer to a polycarbonate or a method for high fluidization by determining the content of said oligomer and Patent Documents 19-20 which disclose a method for high fluidization by controlling production conditions.

Examples of the proposals also include Patent Documents 21-27 which disclose a method for high fluidization by adding other resins to a polycarbonate or copolymerizing, Patent Documents 28-30 which disclose a method for high fluidization by modifying the polymer molecular structure of a polycarbonate, Patent Documents 31-33 which disclose a method for high fluidization by modifying the end structure of a polycarbonate and additionally adding other resins and additives, Patent Documents 34-36 which disclose a method for high fluidization by devising an additive and Patent Documents 37-39 which disclose a fluidity-improving agent for a polycarbonate and a method for high fluidization by using said fluidity-improving agent.

While the above-mentioned methods may enable to achieve high fluidity, however, they have defects such as deterioration of properties that a polycarbonate originally has, complexity of the production process by adding a mixing and kneading operation or the like, deterioration of moldability such as releasability other than fluidity, restriction of intended use and possibility of having high toxicity. Therefore, it had not been easy to obtain a high-fluidity polycarbonate resin while keeping good physical properties such as impact resistance or heat resistance which are useful properties of an aromatic polycarbonate resin.

The present inventors had found a novel method of a chain extension by linking the end-capped terminal groups of an aromatic polycarbonate with an aliphatic diol compound to achieve a high polymerization rate to obtain an aromatic polycarbonate resin excellent in quality. See Patent Document 40 (WO2011/062220). According to the method, a highly polymerized aromatic polycarbonate resin having weight average molecular weight (Mw) of 30,000 to 100,000 can be produced in a short time by the chain extension by linking the capped end of an aromatic polycarbonate with an aliphatic diol compound. According to the method, since a polycarbonate can be produced by a high-rate polymerization reaction, branching and/or cross-linking reaction can be inhibited, and thus, deterioration of polymer such as color change can be prevented.

In addition, the present inventors had proposed a process for producing a branched aromatic polycarbonate resin having an intended branching degree comprising a process of transesterification reaction of an aromatic polycarbonate prepolymer introducing a branch structure with an aliphatic diol compound in the presence of a transesterification catalyst. See Patent Document 41 (PCT/JP2012/052988).

In addition, it is required that an aromatic polycarbonate compound which is a starting material or a prepolymer to be suitably used for producing a highly polymerized polycarbonate resin using an aliphatic diol compound has specific properties such as a certain concentration of terminal hydroxy groups.

Methods for reducing the concentration of terminal hydroxy groups of a polycarbonate prepolymer as the starting material for producing an aromatic polycarbonate resin are disclosed in Patent Document 42 wherein a catalyst combining basic nitrogen compounds and alkali metal or alkali earth metal compounds is used, Patent Document 43 wherein a specific ester compound is added, Patent Document 44 wherein an excess amount of aromatic diester carbonate is subjected to reaction, Patent Document 45 wherein conditions of the polycondensation process is selected or Patent Document 46 wherein terminal hydroxy groups are alkyl-etherified.

As mentioned above, the conventional methods for producing highly polymerized aromatic polycarbonate have many problems, and still there are requests for developing a polycarbonate resin having a satisfactorily high molecular weight while keeping good quality that a polycarbonate originally has, and an improved production method of highly polymerized polycarbonate resin.

PRIOR ART DOCUMENTS

Patent Document

Pat. Doc. 1: Jpn. Examined Pat. Appl. Publ. No. S50-19600
Pat. Doc. 2: Jpn. Unexamined Pat. Appl. Publ. No. H02-153923
Pat. Doc. 3: U.S. Pat. No. 5,521,275
Pat. Doc. 4: European Pat. No. 0 595 608
Pat. Doc. 5: U.S. Pat. No. 5,696,222
Pat. Doc. 6: Jpn. Pat. No. 4112979
Pat. Doc. 7: Jpn. Unexamined Pat. Appl. Publ. (Translation of PCT Application) No. 2008-514754
Pat. Doc. 8: Jpn. Pat. No. 4286914
Pat. Doc. 9: Jpn. Examined Pat. Appl. Publ. No. H06-94501
Pat. Doc. 10: Jpn. Unexamined Pat. Appl. Publ. No. 2009-102536
Pat. Doc. 11: Jpn. Pat. No. 3271353
Pat. Doc. 12: Jpn. Pat. No. 3301453
Pat. Doc. 13: Jpn. Pat. No. 3317555
Pat. Doc. 14: U.S. Pat. No. 3,166,606
Pat. Doc. 15: Jpn. Unexamined Pat. Appl. Publ. No. S56-45945
Pat. Doc. 16: Jpn. Pat. No. 3217862
Pat. Doc. 17: Jpn. Unexamined Pat. Appl. Publ. No. H05-186676
Pat. Doc. 18: Jpn. Pat. No. 3141297
Pat. Doc. 19: Jpn. Pat. No. 3962883
Pat. Doc. 20: Jpn. Pat. No. 3785965
Pat. Doc. 21: Jpn. Unexamined Pat. Appl. Publ. No. 2008-037965
Pat. Doc. 22: Jpn. Unexamined Pat. Appl. Publ. No. 2008-115249
Pat. Doc. 23: Jpn. Unexamined Pat. Appl. Publ. No. H08-003397
Pat. Doc. 24: Jpn. Unexamined Pat. Appl. Publ. (Translation of PCT Application) No. 2006-509862
Pat. Doc. 25: Jpn. Unexamined Pat. Appl. Publ. No. H06-157891
Pat. Doc. 26: Jpn. Unexamined Pat. Appl. Publ. No. H06-073280
Pat. Doc. 27: Jpn. Unexamined Pat. Appl. Publ. No. H05-140435
Pat. Doc. 28: Jpn. Pat. No. 4030749
Pat. Doc. 29: Jpn. Unexamined Pat. Appl. Publ. No. 2005-060540
Pat. Doc. 30: Jpn. Pat. No. 2521375
Pat. Doc. 31: Jpn. Pat. No. 3874671
Pat. Doc. 32: Jpn. Unexamined Pat. Appl. Publ. No. H07-173277
Pat. Doc. 33: Jpn. Unexamined Pat. Appl. Publ. No. 2003-238790
Pat. Doc. 34: Jpn. Unexamined Pat. Appl. Publ. No. 2004-035587
Pat. Doc. 35: Jpn. Unexamined Pat. Appl. Publ. No. 2007-132596
Pat. Doc. 36: Jpn. Unexamined Pat. Appl. Publ. No. 2007-039490
Pat. Doc. 37: Jpn. Unexamined Pat. Appl. Publ. No. H11-181198
Pat. Doc. 38: Jpn. Unexamined Pat. Appl. Publ. No. S61-162520
Pat. Doc. 39: Jpn. Unexamined Pat. Appl. Publ. No. 2005-113003
Pat. Doc. 40: WO2011/062220
Pat. Doc. 41: PCT/JP2012/052988
Pat. Doc. 42: Jpn. Unexamined Pat. Appl. Publ. No. H05-39354
Pat. Doc. 43: Jpn. Unexamined Pat. Appl. Publ. No. H06-228301
Pat. Doc. 44: Jpn. Unexamined Pat. Appl. Publ. No. H08-081552
Pat. Doc. 45: Jpn. Pat. No. 3379265
Pat. Doc. 46: Jpn. Unexamined Pat. Appl. Publ. No. H04-366128

Non-Patent Document

Non-Pat. Doc. 1: "Polycarbonate Handbook", published by Nikkan Kogyo Shimbun Ltd., p. 344

Non-Pat. Doc. 2: "Polycarbonate Resin" published by Nikkan Kogyo Shimbun Ltd. "Plastic Material" p. 144

DISCLOSURE OF THE INVENTION

Problems to be Solved by the Invention

The problem to be solved by the present invention is to provide a novel polycarbonate copolymer having high fluidity in spite of having high molecular weight, while keeping good quality that a polycarbonate originally has without combining other resins or additives.

Another problem to be solved by the present invention is to provide an improved method for producing a highly polymerized aromatic polycarbonate resin which enables the increase in molecular weight of the aromatic polycarbonate resin satisfactorily while keeping good quality of the resin.

Another problem to be solved by the present invention is to provide an aromatic polycarbonate compound which is a prepolymer suitable for producing a highly polymerized polycarbonate using an aliphatic diol compound.

Means for Solving the Problems

As a result of the intensive studies to solve the above problems, the present inventors have found a novel highly-polymerized high-fluidity polycarbonate copolymer having a structure formed of an aromatic polycarbonate chain having at least a certain chain length and a structural unit derived from a specific aliphatic diol compound, and thus completed the present invention.

As a result of the intensive studies to solve the above problems, the present inventors also have found that a polycarbonate resin having not only high molecular weight, high fluidity and excellent quality but also having almost the same structure as a polycarbonate obtained by the interfacial polymerization and excellent heat resistance can be obtained by reacting an aromatic polycarbonate with an aliphatic diol compound having a specific structure in the presence of a transesterification catalyst to highly polymerize the aromatic polycarbonate and by removing at least a part of cyclic carbonate produced as a by-product of the reaction from the reaction system, and thus completed the present invention.

As a result of the intensive studies to solve the above problems, the present inventors have found a novel aromatic polycarbonate compound having a certain concentration range of terminal hydroxy groups and terminal phenyl groups, and thus completed the present invention.

That is, the present invention is related to a high-fluidity polycarbonate copolymer, a process for producing a highly polymerized aromatic polycarbonate resin and an aromatic polycarbonate compound as follows:

1) A high-fluidity polycarbonate copolymer satisfying the following features (a) to (d) which is substantially formed of a structural unit represented by the following general formula (I) derived from an aliphatic diol compound having aliphatic hydrocarbon groups binding to the terminal hydroxy groups and a structural unit represented by the following general formula (II):

[Chemical Formula 1]

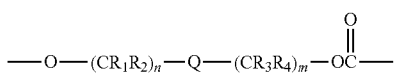

(I)

wherein "Q" represents a hydrocarbon group having at least 3 carbon atoms which may contain an atom of a different kind; $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms, with the proviso that at least one of $R_1$ and $R_2$ and at least one of $R_3$ and $R_4$ are each independently selected from the group consisting of a hydrogen atom and said aliphatic hydrocarbon group; "n" and "m" each independently represent an integer of 0-10 or "n" and "m" each independently represent an integer of 1-10 in the case that Q contains no aliphatic hydrocarbon groups,

[Chemical Formula 2]

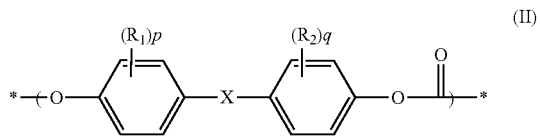

(II)

wherein $R_1$ and $R_2$ each independently represent a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms, "p" and "q" each independently represent an integer of 0-4 and X represents a single bond or a divalent organic group selected from the group consisting of the divalent organic groups represented by the following general formulas (II'):

[Chemical Formula 3]

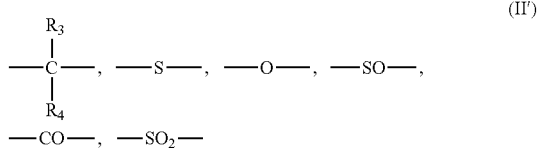

(II')

wherein $R_3$ and $R_4$ each independently represent a hydrogen atom, an alkyl group having 1-10 carbon atoms or an aryl group having 6-10 carbon atoms, with the proviso that $R_3$ and $R_4$ can be linked with each other to form an aliphatic ring, (a) said polycarbonate copolymer has a structure represented by the following general formula (III):

[Chemical Formula 4]

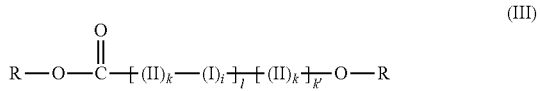

(III)

wherein "k" represents an integer of at least 4, "i" represents an integer of at least 1, "l" represents an integer of at least 1, "k'" represents an integer of 0 or 1, R represents a linear or branched hydrocarbon group, a phenyl group which may contain a fluorine atom, or a hydrogen atom, with the proviso that at least 70% by weight of the copolymer molecules based upon the total amount of said polycarbonate copolymer molecules has "i" which is an integer of 1,
(b) the content of the structural unit represented by the general formula (I) is 1-30 mol % and the content of the structural unit represented by the general formula (II) is 99-70 mol % based upon the total amount of the structural units constituting said polycarbonate copolymer,
(c) said polycarbonate copolymer has Q-value (280° C., 160 kg load) which is an index of fluidity in the range from 0.02 to 1.0 ml/s, and
(d) said polycarbonate copolymer has weight average molecular weight (Mw) of 30,000 to 100,000.
2) The high-fluidity polycarbonate copolymer according to 1), which has a structural viscosity index (N-value) represented by the following mathematical formula (1) of 1.25 or less:

[Mathematical Formula 1]

$$N\text{-value}=(\log(Q160)-\log(Q10))/(\log 160-\log 10) \quad (1)$$

3) The high-fluidity polycarbonate copolymer according to 1), wherein said Mw and Q-value satisfy the following mathematical formula (2):

[Mathematical Formula 2]

$$4.61\times\text{EXP}(-0.0000785\times Mw)<Q(\text{ml/s}) \quad (2)$$

4) The high-fluidity polycarbonate copolymer according to 1), wherein said Mw and Q-value satisfy the following mathematical formula (3):

[Mathematical Formula 3]

$$4.61\times\text{EXP}(-0.0000785\times Mw)<Q(\text{ml/s})<2.30\times\text{EXP}(-0.0000310\times Mw) \quad (3)$$

5) The high-fluidity polycarbonate copolymer according to 1), wherein said aliphatic diol compound which derives the structural unit represented by the general formula (I) is a compound represented by the following general formula (A):

[Chemical Formula 5]

$$\text{HO}-(CR_1R_2)_n\text{-}Q\text{-}(CR_3R_4)_m-\text{OH} \quad (A)$$

wherein "Q" represents a hydrocarbon group having at least 3 carbon atoms which may contain an atom of a different kind; $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms, with the proviso that at least one of $R_1$ and $R_2$ and at least one of $R_3$ and $R_4$ are each independently selected from the group consisting of a hydrogen atom and said aliphatic hydrocarbon group; "n" and "m" each independently represent an integer of 0-10 or "n" and "m" each independently represent an integer of 1-10 in the case that Q contains no aliphatic hydrocarbon groups.
6) The high-fluidity polycarbonate copolymer according to 5), wherein said aliphatic diol compound is a compound represented by the following general formula (i):

[Chemical Formula 6]

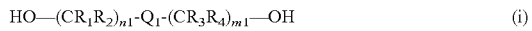

$$\text{HO}-(CR_1R_2)_{n1}\text{-}Q_1\text{-}(CR_3R_4)_{m1}-\text{OH} \quad (i)$$

wherein $Q_1$ represents a hydrocarbon group having 6-40 carbon atoms containing aromatic ring(s); $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms; "n1" and "m1" each independently represent an integer of 1-10.
7) The high-fluidity polycarbonate copolymer according to 6), wherein said aliphatic diol compound is selected from the group consisting of 4,4'-bis(2-hydroxyethoxy)biphenyl, 2,2'-bis[(2-hydroxyethoxy)phenyl]propane, 9,9'-bis[4-(2-hydroxyethoxy)phenyl]fluorene, 9,9'-bis(hydroxymethyl)fluorene, 9,9'-bis(hydroxyethyl)fluorene, fluorene glycol and fluorene diethanol.
8) The high-fluidity polycarbonate copolymer according to 5), wherein said aliphatic diol compound is a compound represented by the following general formula (ii):

[Chemical Formula 7]

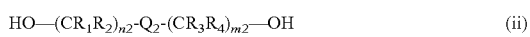

$$\text{HO}-(CR_1R_2)_{n2}\text{-}Q_2\text{-}(CR_3R_4)_{m2}-\text{OH} \quad (ii)$$

wherein $Q_2$ represents a linear or branched hydrocarbon group having 3-40 carbon atoms which may contain heterocyclic ring(s); $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms; "n2" and "m2" each independently represent an integer of 0-10.
9) The high-fluidity polycarbonate copolymer according to 8), wherein said $Q_2$ represents a branched chain aliphatic hydrocarbon group having 6-40 carbon atoms which contains no heterocyclic rings.
10) The high-fluidity polycarbonate copolymer according to 9), wherein said aliphatic diol compound is selected from the group consisting of 2-butyl-2-ethylpropane-1,3-diol, 2,2-diisobutylpropane-1,3-diol, 2-ethyl-2-methylpropane-1,3-diol 2,2-diethylpropane-1,3-diol and 2-methyl-2-propylpropane-1,3-diol
11) The high-fluidity polycarbonate copolymer according to 5), wherein said aliphatic diol compound is a compound represented by the following general formula (iii):

[Chemical Formula 8]

$$\text{HO}-(CR_1R_2)_{n3}\text{-}Q_3\text{-}(CR_3R_4)_{m3}-\text{OH} \quad (iii)$$

wherein $Q_3$ represents a cyclic hydrocarbon group having 6-40 carbon atoms; $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms; "n3" and "m3" each independently represent an integer of 0-10.
12) The high-fluidity polycarbonate copolymer according to 11), wherein said aliphatic diol compound is selected from the group consisting of pentacyclopentadecanedimethanol, 1,4-cyclohexanedimethanol, 1,3-adamantanedimethanol, decalin-2,6-dimethanol and tricyclodecanedimethanol.
13) The high-fluidity polycarbonate copolymer according to any one of 5) to 12), wherein said aliphatic diol compound has a boiling point of 240° C. or higher.
14) A molded product molded by a method selected from the group consisting of injection molding, blow molding, extrusion molding, injection blow molding, rotational molding and compression molding using the high-fluidity polycarbonate copolymer according to 1).
15) A molded product selected from the group consisting of a sheet product or a film product formed of the high-fluidity polycarbonate copolymer according to 1).
16) A process for producing a highly polymerized aromatic polycarbonate resin which comprises a highly-polymerizing process wherein an aromatic polycarbonate is reacted with an aliphatic diol compound represented by the following general formula (g1) in the presence of a transesterification catalyst to increase the molecular weight:

[Chemical Formula 9]

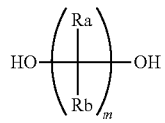
(g1)

wherein Ra and Rb each independently represent a hydrogen atom, a linear or branched alkyl group having 1-12 carbon atoms or a phenyl group, and "m" represents an integer of 1-30.

17) The process for producing a highly polymerized aromatic polycarbonate resin according to 16), wherein said "m" in the general formula (g1) represents an integer of 2-8.

18) The process for producing a highly polymerized aromatic polycarbonate resin according to 16), wherein said aliphatic diol compound represented by the general formula (g1) is a compound represented by the following general formula (g2):

[Chemical Formula 10]

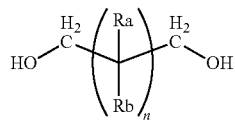
(g2)

wherein Ra and Rb each independently represent a hydrogen atom, a linear or branched alkyl group having 1-12 carbon atoms or a phenyl group, and "n" represents an integer of 1-28.

19) The process for producing a highly polymerized aromatic polycarbonate resin according to 18), wherein said "n" in the general formula (g2) represents an integer of 1-6.

20) The process for producing a highly polymerized aromatic polycarbonate resin according to 18), wherein said aliphatic diol compound represented by the general formula (g2) is a compound represented by the following general formula (g3):

[Chemical Formula 11]

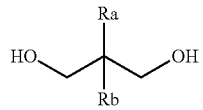
(g3)

wherein Ra and Rb each independently represent a hydrogen atom, a linear or branched alkyl group having 1-12 carbon atoms or a phenyl group.

21) The process for producing a highly polymerized aromatic polycarbonate resin according to 20), wherein said Ra and Rb each independently represent a hydrogen atom or a linear or branched alkyl group having 1-5 carbon atoms.

22) The process for producing a highly polymerized aromatic polycarbonate resin according to 20), wherein said Ra and Rb each independently represent a linear or branched alkyl group having 1-4 carbon atoms.

23) The process for producing a highly polymerized aromatic polycarbonate resin according to 22), wherein said aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

24) A process for producing a highly polymerized aromatic polycarbonate resin which comprises a highly-polymerizing process wherein an aromatic polycarbonate is reacted with an aliphatic diol compound represented by the following general formula (g4) in the presence of a transesterification catalyst to increase the molecular weight:

[Chemical Formula 12]

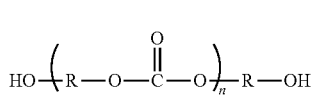
(g4)

wherein R represents a divalent hydrocarbon group selected from the group consisting of the structures represented by the following formulas and "n" represents an integer of 1-20:

[Chemical Formula 13]

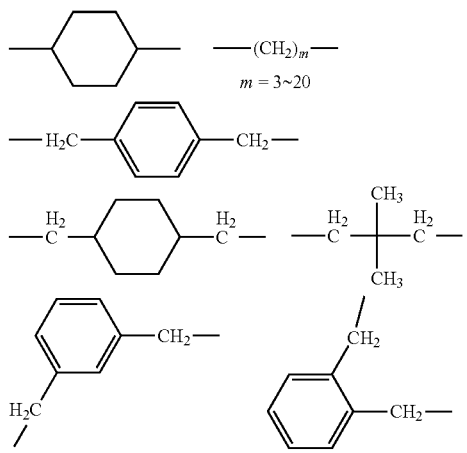

25) The process for producing a highly polymerized aromatic polycarbonate resin according to 24), wherein R in the general formula (g4) represents a divalent hydrocarbon group represented by —$(CH_2)_m$— wherein "m" is an integer of 3-20 or —$CH_2$—$C(CH_3)_2$—$CH_2$—, and "n" represents an integer of 1-3.

26) The process for producing a highly polymerized aromatic polycarbonate resin according to 16) or 24), which comprises a highly-polymerizing process wherein an aromatic polycarbonate is reacted with said aliphatic diol compound and a cyclic carbonate-removing process wherein at least a part of cyclic carbonate produced as a by-product in the highly-polymerizing process is removed from the reaction system.

27) The process for producing a highly polymerized aromatic polycarbonate resin according to 26), wherein said cyclic carbonate is a compound represented by the following general formula (h1):

[Chemical Formula 14]

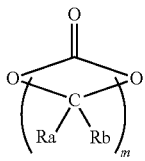

(h1)

wherein Ra and Rb each independently represent a hydrogen atom, a linear or branched alkyl group having 1-12 carbon atoms or a phenyl group, and "m" represents an integer of 1-30.

28) The process for producing a highly polymerized aromatic polycarbonate resin according to 27), wherein said "m" in the general formula (h1) represents an integer of 2-8.

29) The process for producing a highly polymerized aromatic polycarbonate resin according to 27), wherein said cyclic carbonate represented by the general formula (h1) is a compound represented by the following general formula (h2):

[Chemical Formula 15]

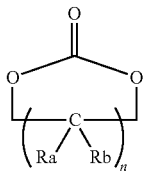

(h2)

wherein Ra and Rb each independently represent a hydrogen atom, a linear or branched alkyl group having 1-12 carbon atoms or a phenyl group, and "n" represents an integer of 1-28.

30) The process for producing a highly polymerized aromatic polycarbonate resin according to 29), wherein said "n" in the general formula (h2) represents an integer of 1-6.

31) The process for producing a highly polymerized aromatic polycarbonate resin according to 29), wherein said cyclic carbonate represented by the general formula (h2) is a compound represented by the following general formula (h3):

[Chemical Formula 16]

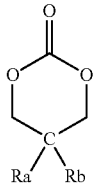

(h3)

wherein Ra and Rb each independently represent a hydrogen atom, a linear or branched alkyl group having 1-12 carbon atoms or a phenyl group.

32) The process for producing a highly polymerized aromatic polycarbonate resin according to 31), wherein said Ra and Rb each independently represent a hydrogen atom or a linear or branched alkyl group having 1-5 carbon atoms.

33) The process for producing a highly polymerized aromatic polycarbonate resin according to 16) or 24), wherein said aliphatic diol compound is used in an amount of 0.01 to 1.0 mole per mole of the total amount of the terminal groups of the aromatic polycarbonate before the reaction in the highly-polymerizing process.

34) The process for producing a highly polymerized aromatic polycarbonate resin according to 16) or 24), wherein said aromatic polycarbonate before the reaction in the highly polymerizing process is at least partially end-capped.

35) The process for producing a highly polymerized aromatic polycarbonate resin according to 16) or 24), wherein said aromatic polycarbonate before the reaction in the highly polymerizing process is a terminally end-capped prepolymer obtained by the reaction between an aromatic dihydroxy compound and diester carbonate.

36) The process for producing a highly polymerized aromatic polycarbonate resin according to 16) or 24), wherein said aromatic polycarbonate before the reaction in the highly polymerizing process has the concentration of terminal hydroxy groups of 1,500 ppm or less.

37) The process for producing a highly polymerized aromatic polycarbonate resin according to 16) or 24), wherein the weight average molecular weight (Mw) of the highly polymerized aromatic polycarbonate resin after the reaction in the highly polymerizing process is increased by 5,000 or more compared to that of the aromatic polycarbonate before the reaction in the highly polymerizing process.

38) The process for producing a highly polymerized aromatic polycarbonate resin according to 16) or 24), wherein the weight average molecular weight (Mw) of the aromatic polycarbonate before the reaction in the highly polymerizing process is 5,000 to 60,000.

39) A polycarbonate resin composition comprising a highly polymerized aromatic polycarbonate resin obtained by the process according to 16) or 24) as a main component and cyclic polycarbonate represented by the following general formula (h1) in an amount of not more than 3000 ppm:

[Chemical Formula 17]

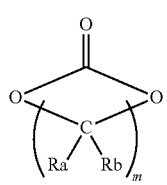

(h1)

wherein Ra and Rb each independently represent a hydrogen atom, a linear or branched alkyl group having 1-12 carbon atoms or a phenyl group, and "m" represents an integer of 1-30.

40) The polycarbonate resin composition according to 39), wherein said "m" in the general formula (h1) represents an integer of 2-8.

41) The polycarbonate resin composition according to 39), wherein said cyclic carbonate represented by the general formula (h1) is a compound represented by the following general formula (h2):

[Chemical Formula 18]

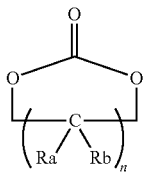

(h2)

wherein Ra and Rb each independently represent a hydrogen atom, a linear or branched alkyl group having 1-12 carbon atoms or a phenyl group, and "n" represents an integer of 1-28.
42) The polycarbonate resin composition according to 41), wherein said "n" in the general formula (h2) represents an integer of 1-6.
43) The polycarbonate resin composition according to 41), wherein said cyclic carbonate represented by the general formula (h2) is a compound represented by the following general formula (h3):

[Chemical Formula 19]

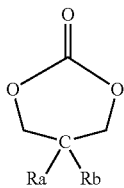

(h3)

wherein Ra and Rb each independently represent a hydrogen atom, a linear or branched alkyl group having 1-12 carbon atoms or a phenyl group.
44) The polycarbonate resin composition according to 43), wherein said Ra and Rb each independently represent a hydrogen atom or a linear or branched alkyl group having 1-5 carbon atoms.
45) The polycarbonate resin composition according to 39), wherein said highly polymerized aromatic polycarbonate resin has a structural viscosity index (N-value) represented by the following mathematical formula (1) of 1.25 or less:

[Mathematical Formula 4]

$$N\text{-value} = (\log(Q160) - \log(Q10))/(\log 160 - \log 10) \quad (1)$$

46) An aromatic polycarbonate compound satisfying the following features (A) to (C) which is substantially formed of a structural unit represented by the following general formula (1)

[Chemical Formula 20]

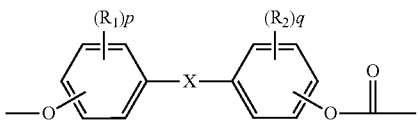

(1)

wherein $R_1$ and $R_2$ each independently represent a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms, "p" and "q" each independently represent an integer of 0-4 and X represents a single bond or a group selected from the group consisting of the divalent organic groups represented by the following general formulas (1'):

[Chemical Formula 21]

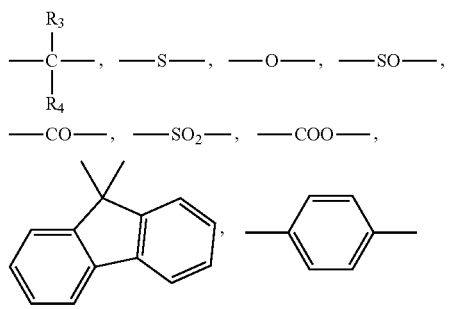

(1')

wherein $R_3$ and $R_4$ each independently represent a hydrogen atom, an alkyl group having 1-10 carbon atoms or an aryl group having 6-10 carbon atoms, with the proviso that $R_3$ and $R_4$ can be linked with each other to form an aliphatic ring,
(A) said aromatic polycarbonate compound has weight average molecular weight (Mw) of 5,000 to 60,000,
(B) the concentration of terminal hydroxy groups is not more than 1500 ppm and
(C) the concentration of terminal phenyl groups is not less than 2 mol %.
47) The aromatic polycarbonate compound according to 46), which is obtained by reacting an aromatic dihydroxy compound and diester carbonate at a ratio of [diester carbonate]/[aromatic dihydroxy compound]=1.0-1.3 (molar ratio) in the presence of a transesterification catalyst.
48) The aromatic polycarbonate compound according to 46) or 47), which has a structural viscosity index (N-value) of 1.25 or less.
49) The aromatic polycarbonate compound according to 46) or 47), which has a branch structure introduced by using a branching agent and has a structural viscosity index (N-value) of higher than 1.25.
50) A prepolymer material for producing a highly polymerized aromatic polycarbonate resin comprising a highly-polymerizing process wherein an aromatic polycarbonate prepolymer is reacted with an aliphatic diol compound having aliphatic hydrocarbon groups binding to the terminal hydroxy groups under reduced pressure in the presence of a transesterification catalyst, which comprises said aromatic polycarbonate compound according to 46) or 47) as a main component and residual carbonate monomer in an amount of 3000 ppm or less.
51) A prepolymer material for producing a highly polymerized aromatic polycarbonate resin according to 50), wherein said aliphatic diol compound is a compound represented by the following general formula (A):

[Chemical Formula 22]

$$HO\text{—}(CR_1R_2)_n\text{-}Q\text{-}(CR_3R_4)_m\text{—}OH \quad (A)$$

wherein "Q" represents a hydrocarbon group having at least 3 carbon atoms which may contain an atom of a different kind; $R_1$, $R_2$, $R_3$ and $R_4$ each independently represent a group selected from the group consisting of a hydrogen atom, an aliphatic hydrocarbon group having 1-30 carbon atoms and an aromatic hydrocarbon group having 6-20 carbon atoms, with the proviso that at least one of $R_1$ and $R_2$ and at least one of $R_3$ and $R_4$ are each independently selected from the group consisting of a hydrogen atom and said aliphatic hydrocarbon group; "n" and "m" each independently represent an integer of 0-10 or "n" and "m" each independently represent an integer of 1-10 in the case that Q contains no aliphatic hydrocarbon groups.

Effect of the Invention

The novel polycarbonate copolymer according to the present invention has a structure formed of an aromatic polycarbonate chain having at least a certain chain length and a structural unit derived from a specific aliphatic diol compound, and it has a high molecular weight and high fluidity, and in addition, a low N-value which means that it scarcely contain a branch structure.

This kind of polycarbonate copolymer having such a feature is previously unknown. Though a copolymer having an aromatic polycarbonate-forming unit derived from an aromatic dihydroxy compound and a structural unit derived from an aliphatic diol compound may be known, when it does not have a specific structure as taught by the present invention such as being formed of an aromatic polycarbonate chain having a certain chain length and a structural unit derived from a specific aliphatic diol compound, it would not satisfy the conditions of high molecular weight and high fluidity at the same time. Even a method of improving fluidity by using additives would not make possible to easily achieve high fluidity while keeping good properties that a polycarbonate resin originally has.

The polycarbonate copolymer according to the present invention has achieved high molecular weight and high fluidity without using additives while keeping useful properties that a polycarbonate resin originally such as physical strength such as impact resistance, abrasion resistance and stress-cracking resistance, a satisfactory hue, optical properties, a low equilibrium water absorption, heat resistance, dimensional stability, clarity, weather resistance, hydrolysis resistance and flame retardance. In addition, the polycarbonate copolymer of the present invention has not only high molecular weight and high fluidity but also has a low N-value which means that it scarcely has branch structures and/or different kind structures.

According to the novel process for producing a highly polymerized aromatic polycarbonate resin, an aromatic polycarbonate (=prepolymer) is reacted with an aliphatic diol compound having a specific structure to be highly polymerized, and at the same time, said aliphatic diol compound is removed away from the reaction system as the form of cyclic carbonate. As a result, the aliphatic diol compound is scarcely introduced into the main chain of the highly polymerized aromatic polycarbonate resin thus obtained.

Therefore, since the highly polymerized aromatic polycarbonate resin thus obtained scarcely has a linked part remaining in the main chain, its structure is almost same as a polycarbonate obtained by the conventional interfacial polymerization or melt polymerization. For example, when an aromatic polycarbonate prepolymer obtained by using bisphenol A (BPA) as an aromatic dihydroxy compound is subjected to the production process according to the present invention, a polycarbonate having almost the same chemical structure as an ordinary polycarbonate resin derived from bisphenol A (BPC-PC) is obtained.

The polycarbonate resin thus obtained has not only the same properties as polycarbonates obtained by conventional interfacial polymerization, but also has benefits in quality such as the low branching degree and the small amount of different kind structures because of conducting highly polymerizing rapidly using the aliphatic diol compound as a linking agent. In addition, it has significantly improved heat resistance or thermal stability under high temperature, which is caused by not containing a unit derived from the linking agent consisting of the aliphatic diol compound in the main chain.

The novel aromatic polycarbonate compound has specific terminal properties and is suitable for producing a polycarbonate resin by a transesterification reaction with a specific aliphatic diol compound having aliphatic hydrocarbon groups binding to the terminal hydroxy groups.

Reacting the aromatic polycarbonate compound having specific features as mentioned above with a specific aliphatic diol compound through a transesterification reaction enables the increase in molecular weight of the aromatic polycarbonate resin satisfactorily in a simple method while keeping good quality of the resin. Especially, a highly-polymerized high-fluidity polycarbonate copolymer scarcely containing a branching structure can be produced without using additives.

In the case of introducing a branching structure into the aromatic polycarbonate compound by using a predetermined amount of a branching agent, an aromatic polycarbonate resin having an intended branching degree can be produced with ease.

MODE(S) FOR CARRYING OUT THE INVENTION

I. High-Fluidity Polycarbonate Copolymer

Figure 1:
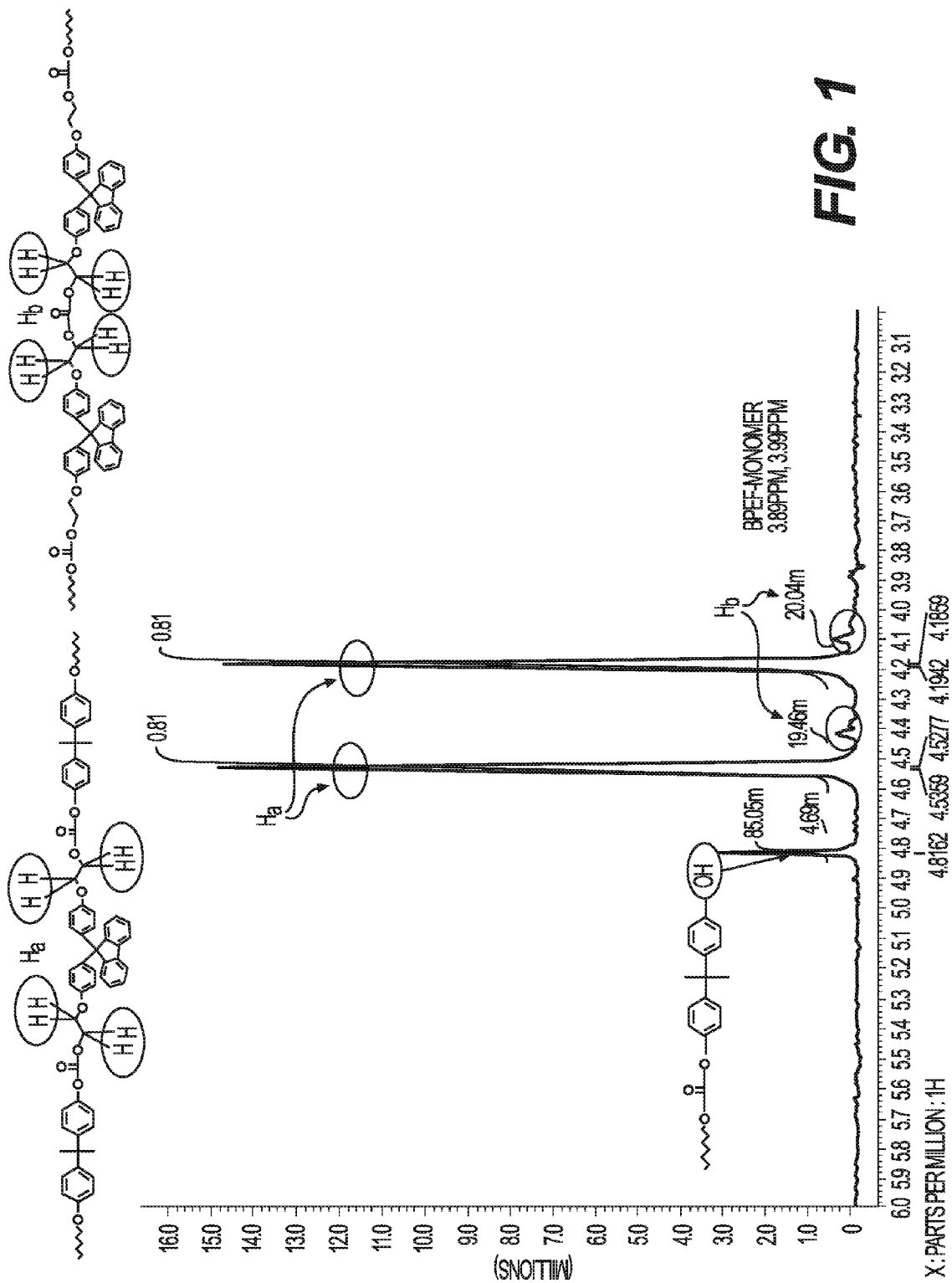
FIG. 1 shows a $^1$H-NMR chart (A) of the polycarbonate copolymer obtained by Example 1.

The high-fluidity polycarbonate copolymer is substantially formed of a structural unit represented by the above-mentioned general formula (I) and a structural unit represented by the above-mentioned general formula (II).

(1) Structural Unit Represented by Formula (I)

The structural unit represented by the general formula (I) is derived from an aliphatic diol compound. The term "aliphatic diol compound" according to the present invention means a diol compound having aliphatic hydrocarbon groups binding to the terminal hydroxy groups. The term "terminal hydroxy group" means a hydroxy group that contributes to form a carbonate bond between the aliphatic diol compound and the aromatic polycarbonate compound (=prepolymer) by transesterification reaction.

Examples of the aliphatic hydrocarbon groups include an alkylene group and a cycloalkylene group which may be substituted in part by aromatic groups, heterocyclic ring-containing groups or the like.

[Chemical Formula 23]

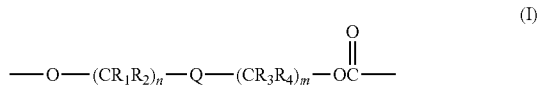
(I)

In the above general formula (I), "Q" represents a hydrocarbon group having at least 3 carbon atoms which may contain atoms of a different kind. The lower limit of the carbon number of said hydrocarbon group is 3, preferably 6 and more preferably 10, and the upper limit thereof is preferably 40, more preferably 30 and most preferably 25.

Examples of the atoms of a different kind include an oxygen atom (O), a sulfur atom (S), a nitrogen atom (N), a fluorine atom (F) and a silicon atom (Si). Among them, an oxygen atom (O) and a sulfur atom (S) are most preferable.

The hydrocarbon group can be strait chain (linear), branched or circular. "Q" can contain a cyclic structure such as an aromatic ring and a heterocyclic ring.

In the above general formula (I), $R_1$, $R_2$, $R_3$ and $R_4$ each independently represent a group selected from the group consisting of a hydrogen atom, an aliphatic hydrocarbon group having 1-30 carbon atoms, preferably 1-10 carbon atoms, and an aromatic hydrocarbon group having 6-20 carbon atoms, preferably 6-10 carbon atoms.

Examples of the aliphatic hydrocarbon groups include a linear or branched alkyl group and a cycloalkyl group. Examples of the alkyl groups include a methyl group, an ethyl group, a propyl group, an isopropyl group, a n-butyl group, an i-butyl group, a t-butyl group, a n-amyl group, an isoamyl group, a n-hexyl group, and an isohexyl group. Examples of the cycloalkyl groups include a cyclohexyl group. Examples of the aromatic hydrocarbon groups include a phenyl group and a naphthyl group.

In this regard, at least one of $R_1$ and $R_2$ and at least one of $R_3$ and $R_4$ are each independently selected from the group consisting of a hydrogen atom and an aliphatic hydrocarbon group.

Preferably, $R_1$ to $R_4$ are each independently selected from the group consisting of a hydrogen atom and an aliphatic hydrocarbon group having 1-30 carbon atoms, preferably 1-10 carbon atoms.

More preferable examples of the aliphatic hydrocarbon groups include a linear or branched alkyl group. More preferable examples of the alkyl groups include a methyl group, an ethyl group, a propyl group, an isopropyl group, a n-butyl group, an i-butyl group, a t-butyl group and an isoamyl group.

It is most preferable that $R_1$, $R_2$, $R_3$ and $R_4$ are all hydrogen atoms. That is, the aliphatic diol compound which can derive the structure represented by the above-mentioned general formula (I) is preferably a primary diol compound, and more preferably a primary diol compound except a linear aliphatic diol compound.

In the general formula (I), "n" and "m" each independently represent an integer of 0-10, preferably an integer of 0-4.

In the case that Q contains no aliphatic hydrocarbon groups binding to the terminal hydroxy groups, "n" and "m" each independently represent an integer of 1-10, preferably an integer of 1-4.

The aliphatic diol compound which can derive the structure represented by the above-mentioned general formula (I) is a dihydric compound represented by the following general formula (I') having alcoholic hydroxy groups. In the general formula (I'), what "Q", $R_1$-$R_4$, n and m represent are the same as in the above general formula (I).

[Chemical Formula 24]

(I')

Examples of the terminal structures "HO—$(CR_1R_2)_n$—" and "—$(CR_3R_4)_m$—OH" include the following structures:

[Chemical Formula 25]

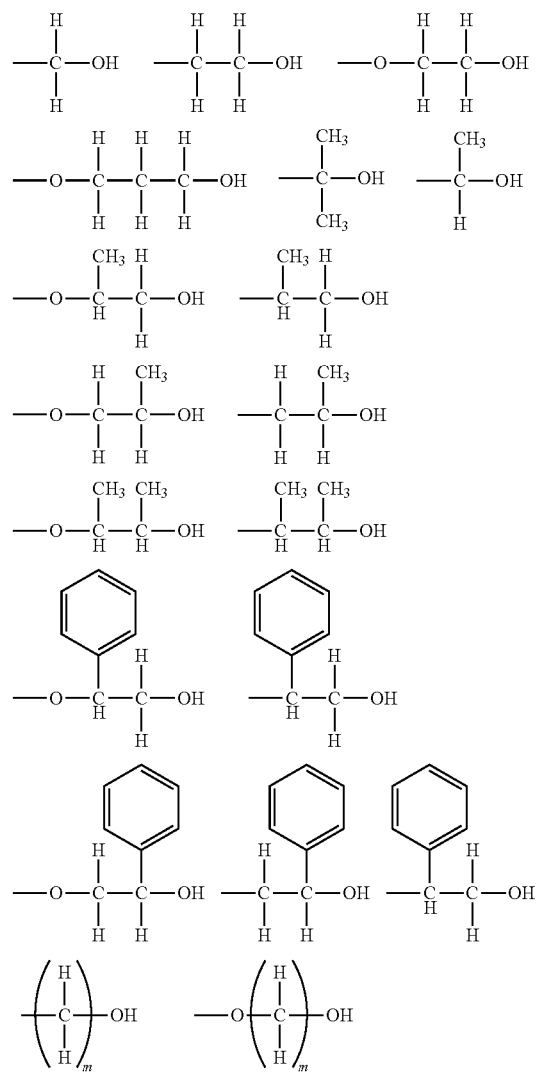

[Chemical Formula 26]

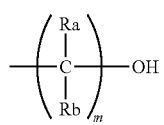

Ra and Rb each represent a hydrogen atom, a linear or branched alkyl group, a phenyl group or a naphthyl group. "m" represents an integer of 1 or more.

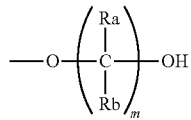

Ra and Rb each represent a hydrogen atom, a linear or branched alkyl group, a phenyl group or a naphthyl group. "m" represents an integer of 1 or more.

More preferable examples of the aliphatic diol compounds to be used for the present invention include dihydric compounds having alcoholic hydroxy groups represented by the following formulas (i) to (iii):

[Chemical Formula 27]

$$HO-(CR_1R_2)_{n1}-Q_1-(CR_3R_4)_{m1}-OH \quad (i)$$

$$HO-(CR_1R_2)_{n2}-Q_2-(CR_3R_4)_{m2}-OH \quad (ii)$$

$$HO-(CR_1R_2)_{n3}-Q_3-(CR_3R_4)_{m3}-OH \quad (iii)$$

In the above formula (i), $Q_1$ represents a hydrocarbon group having 6-40 carbon atoms containing aromatic ring(s), preferably a hydrocarbon group having 6-30 carbon atoms containing aromatic ring(s). $Q_1$ can contain at least one atom of a different kind selected from the group consisting of an oxygen atom (O), a sulfur atom (S), a nitrogen atom (N), a fluorine atom (F) and a silicon atom (Si).

In the formula (i), "n1" and "m1" each independently represent an integer of 1-10, preferably an integer of 1-4.

Examples of the aromatic rings include a phenyl group, a biphenyl group, a fluorenyl group and a naphthyl group.

Examples of $Q_1$ include the groups represented by the following structural formulas:

[Chemical Formula 28]

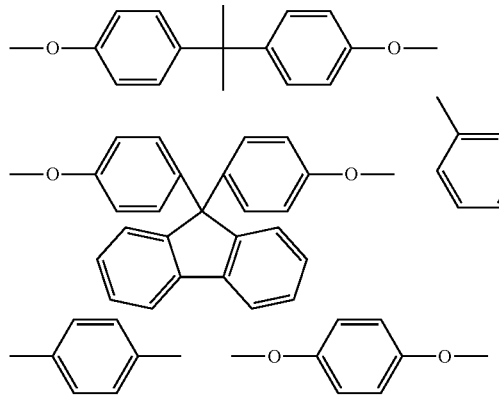

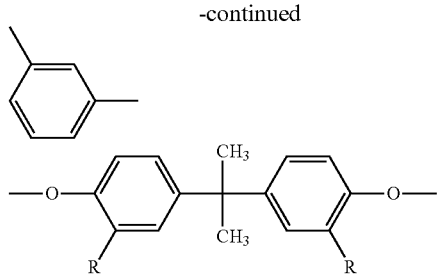

R represents a linear or branched alkyl group, a cyclohexyl group or a phenyl group.

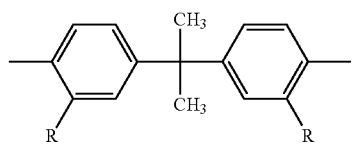

R represents a linear or branched alkyl group, a cyclohexyl group or a phenyl group.

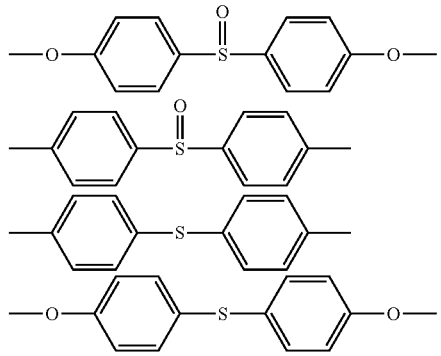

"m" represents an integer of 0-12.

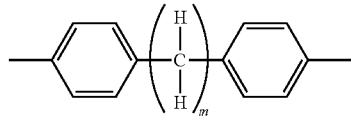

"m" represents an integer of 0-12.

[Chemical Formula 29]

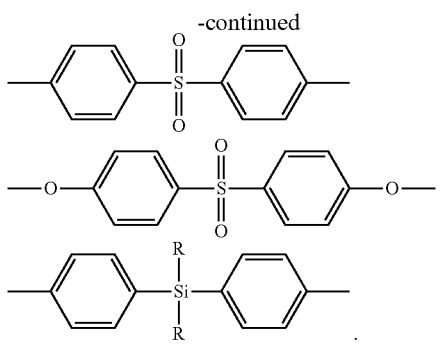

R represents a linear or branched alkyl group having 1-10 carbon atoms, a cyclohexyl group or a phenyl group.

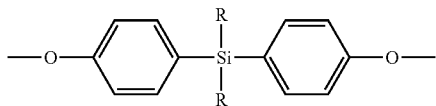

R represents a linear or branched alkyl group having 1-10 carbon atoms, a cyclohexyl group or a phenyl group.

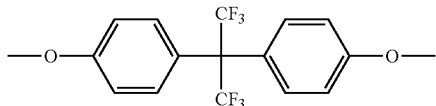

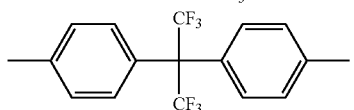

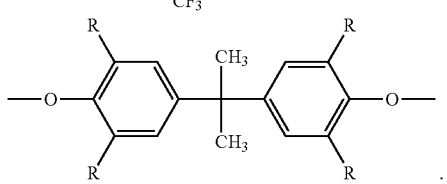

R represents a linear or branched alkyl group having 1-10 carbon atoms, a cyclohexyl group or a phenyl group.

[Chemical Formula 30]

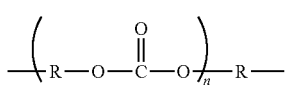

"n" represents an integer of 1-20, preferably 1-2.

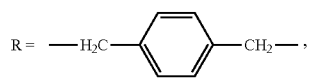

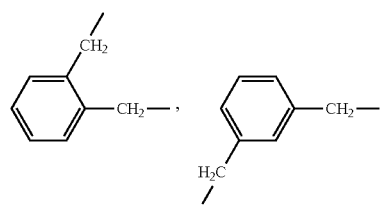

[Chemical Formula 31]

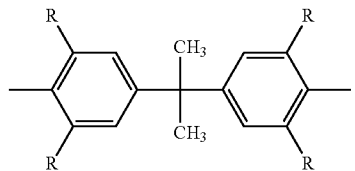

R represents a linear or branched alkyl group having 1-10 carbon atoms, a cyclohexyl group or a phenyl group.

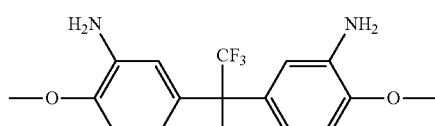

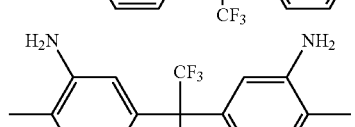

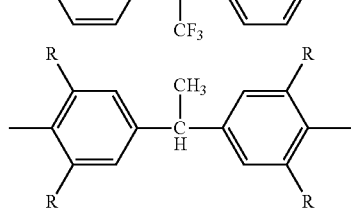

R represents a linear or branched alkyl group having 1-30 carbon atoms a cyclohexyl group or a phenyl group.

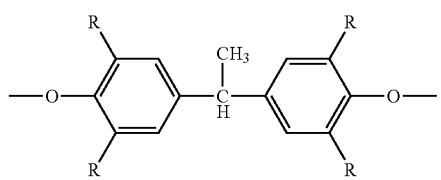

R represents a linear or branched alkyl group having 1-30 carbon atoms, a cyclohexyl group or a phenyl group.

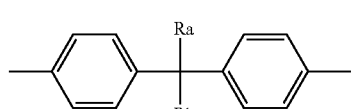

Ra represents an hydrogen atom or a methyl group. Rb represents a linear or branched alkyl group having 1-30 carbon atoms, a cyclohexyl group or a phenyl group.

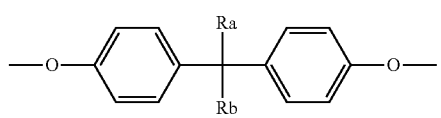

Ra represents an hydrogen atom or a methyl group. Rb represents a linear or branched alkyl group having 1-30 carbon atoms, a cyclohexyl group or a phenyl group.

[Chemical Formula 32]

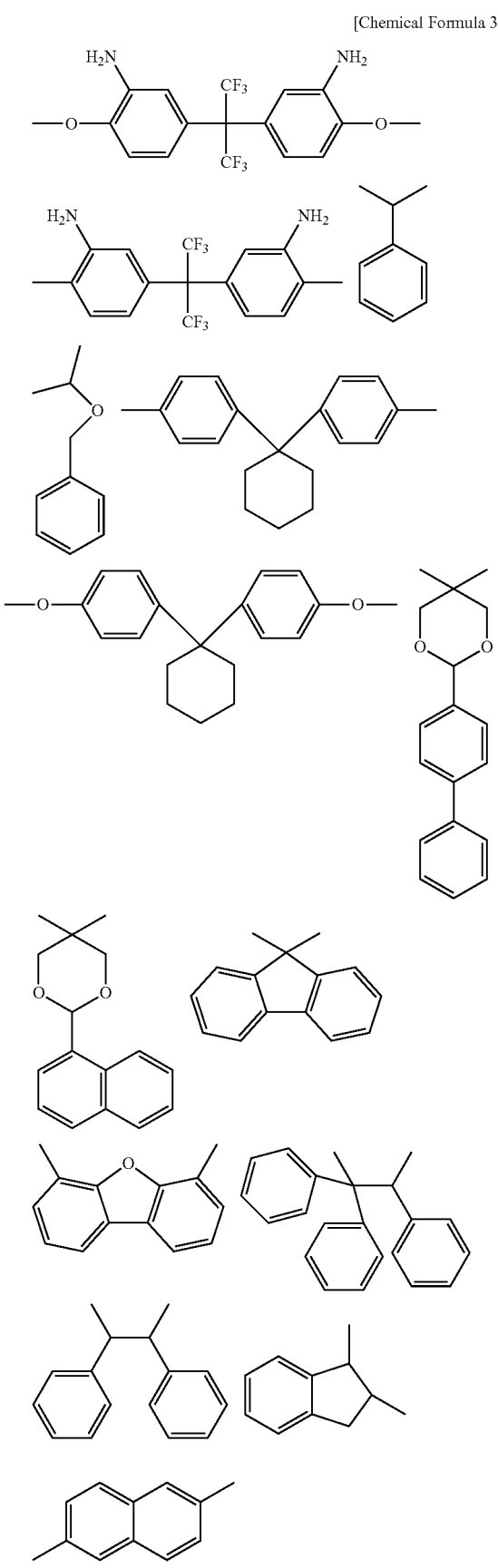

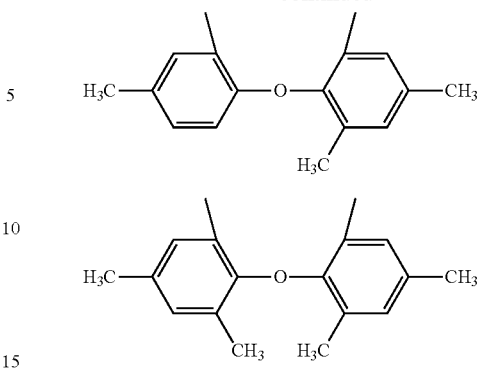

In the above formula (ii), $Q_2$ represents a linear or branched hydrocarbon group having 3-40 carbon atoms which may contain heterocyclic ring(s), preferably a linear or branched hydrocarbon group having 3-30 carbon atoms which may contain heterocyclic ring(s). $Q_2$ can contain at least one atom of a different kind selected from the group consisting of an oxygen atom (O), a sulfur atom (S), a nitrogen atom (N), a fluorine atom (F) and a silicon atom (Si). "n2" and "m2" each independently represent an integer of 0-10, preferably an integer of 0-4.

Examples of $Q_2$ include the groups represented by the following structural formulas, wherein, in the case that the following structures have a molecular weight distribution, it is preferable to select the structures having 6-40 carbon atoms on an average based on the average molecular weight:

[Chemical Formula 33]

Ra and Rb each represent a hydrogen atom or a linear or branched alkyl group which may be substituted by —NH$_2$ or —F. "m" represents an integer of 1-30.

$$—S \!-\!\!\!(CH_2)_{\overline{m}}\!-\!\!S—$$

"m" represents an integer of 1-30.

R represents a hydrogen atom, a linear or branched alkyl group having 1-12 carbon atoms or a phenyl group. "m" represents an integer of 1-30.

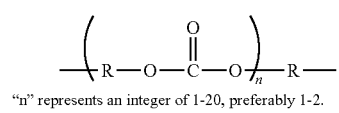

"n" represents an integer of 1-20, preferably 1-2.

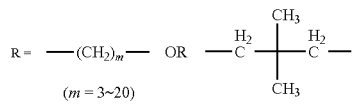

($m = 3\sim20$)

In addition to the above structures, polycaprolactone, poly(1,4-butanedioladipate)diol and poly(1,4-butanediol-succinate)diol can be included.

In the above formula (iii), $Q_3$ represents a cyclic hydrocarbon group or a cycloalkylene group having 6-40 carbon atoms, preferably having 6-30 carbon atoms. "n3" and "m3" each independently represent an integer of 0-10, preferably an integer of 1-4. Examples of the cycloalkylene groups include a cyclohexylene group, a bicyclodecanyl group and a tricyclodecanyl group.

Examples of $Q_3$ include the groups represented by the following structural formulas:

[Chemical Formula 34]

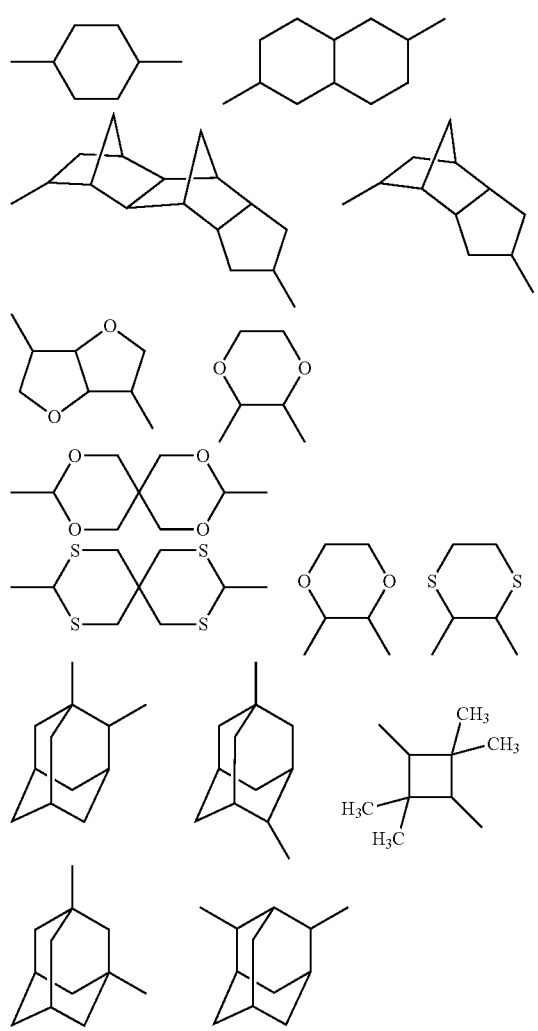

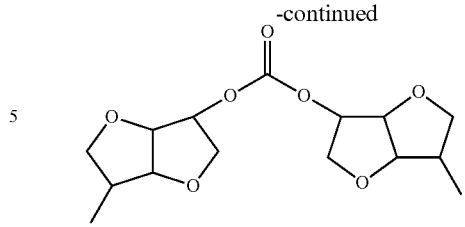

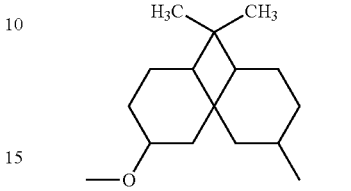

R represents a linear or branched alkyl group having 1-8 carbon atoms.

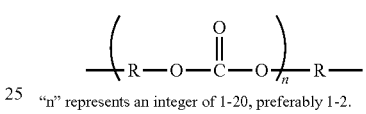

"n" represents an integer of 1-20, preferably 1-2.

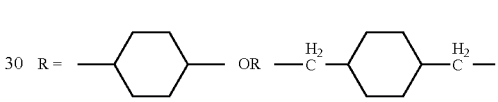

In the above formulas (i) to (iii), $R_1$, $R_2$, $R_3$ and $R_4$ each independently represent a group selected from the group consisting of a hydrogen atom, an aliphatic hydrocarbon group having 1-30 carbon atoms, preferably 1-10 carbon atoms, and an aromatic hydrocarbon group having 6-20 carbon atoms, preferably 6-10 carbon atoms. Examples of $R_1$ to $R_4$ are same as those in the above-mentioned general formula (I).

Among the aliphatic diol compounds represented by any one of the formulas (i) to (iii), it is more preferable to use a compound represented by the formulas (i) or (ii). It is most preferably to use a compound represented by the formula (ii).

Among the aliphatic diol compounds represented by the general formula (I'), in addition, it is preferable to use a primary diol compound. It is more preferable to use a primary diol compound except a linear aliphatic diol compound.

Employable examples of the aliphatic diol compounds represented by the general formula (I') include the compounds represented by the following structural formulas:

[Chemical Formula 35]

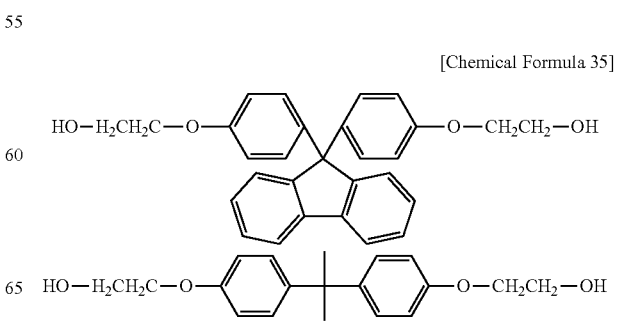

-continued

Ra and Rb each independently represent a hydrogen atom, a linear or branched alkyl group having 1-30 carbon atoms, a phenyl group or a cyclohexyl group.

Ra and Rb each independently represent a hydrogen atom, a linear or branched alkyl group having 1-30 carbon atoms, a phenyl group or a cyclohexyl group.

"m" represents an integer of 4-30.

Ra and Rb each independently represent a hydrogen atom, a linear or branched alkyl group having 1-12, preferably 1-4 carbon atoms or a phenyl group.

"m" represents an integer of 1-30.

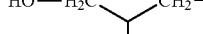

[Chemical Formula 37]

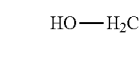

31
-continued
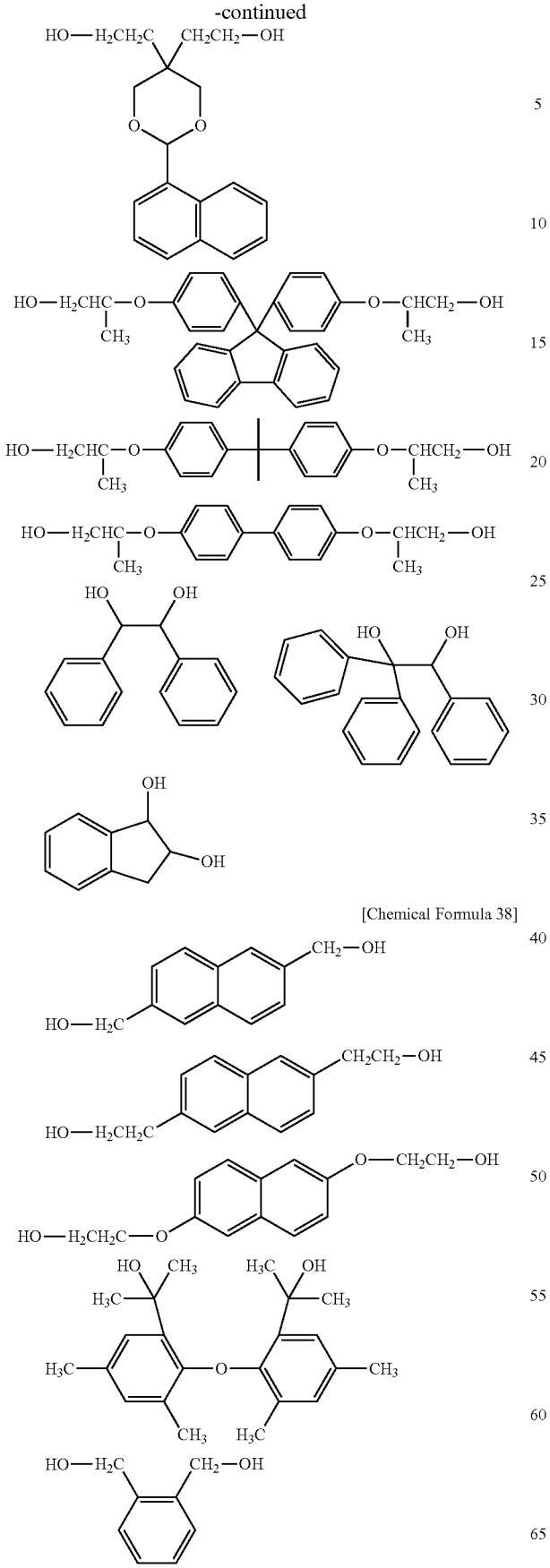
32
-continued
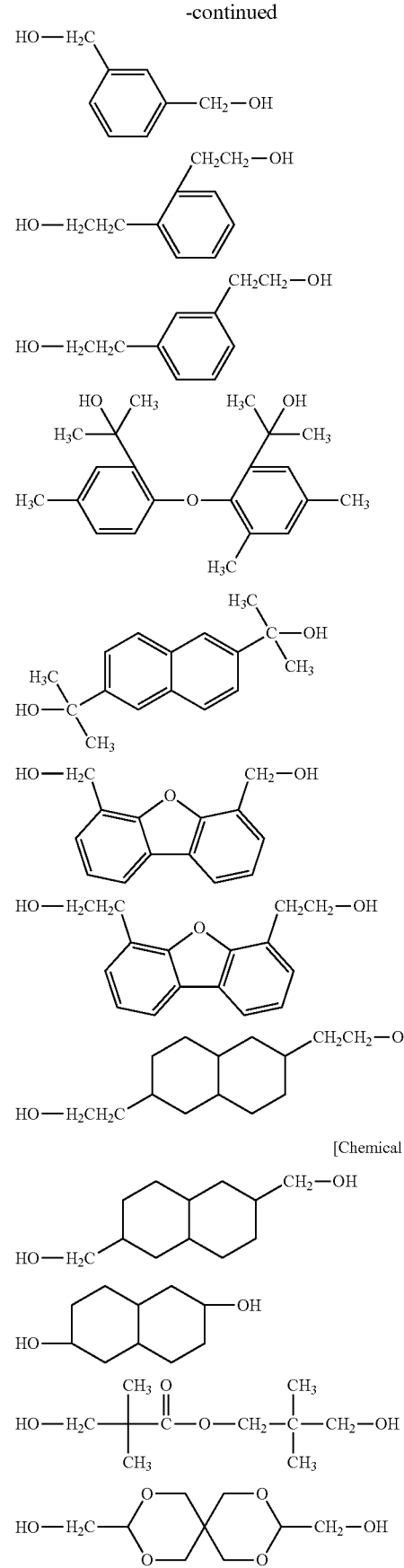
[Chemical Formula 38]
[Chemical Formula 39]

-continued

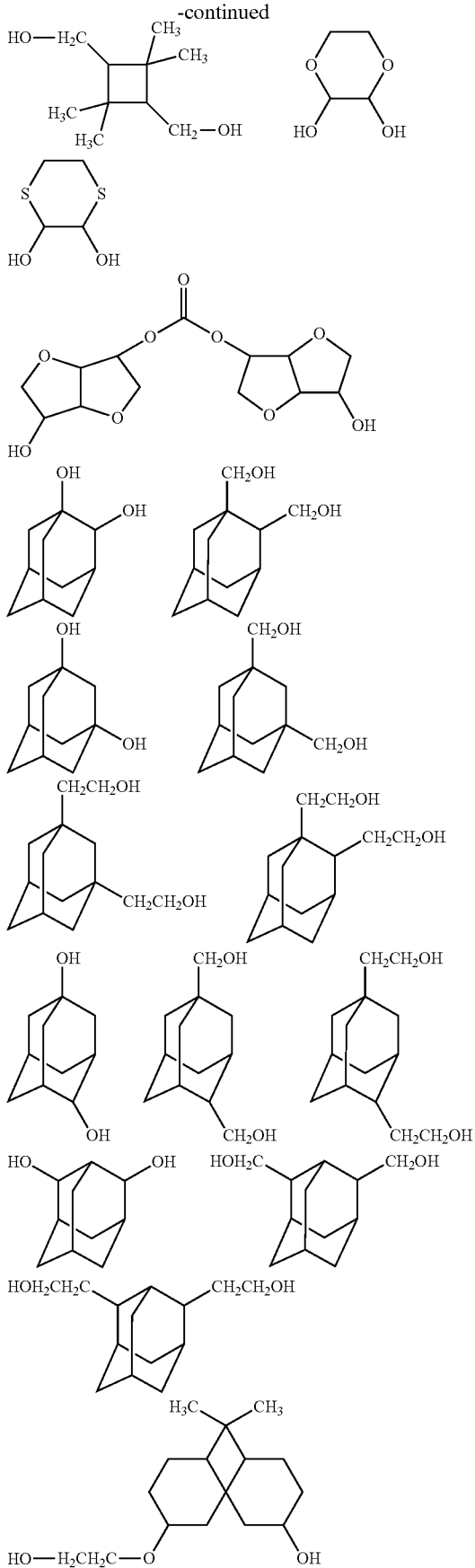

-continued

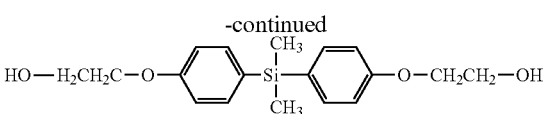

[Chemical Formula 40]

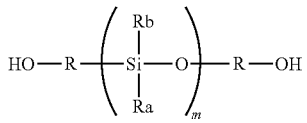

R represents a 1-10C alkyl group. Ra and Rb each independently represent a hydrogen atom, a 1-12C, preferably 1-4C linear or branched alkyl group or a phenyl group. "m" represents an integer of 1-10, preferably 1-5.

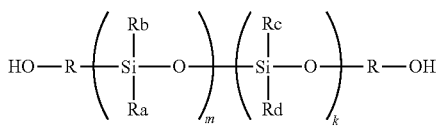

R represents a 1-10C alkyl group. Ra, Rb, Rc, and Rd each independently represent a hydrogen atom, a 1-12C, preferably 1-4C linear or branched alkyl group or a phenyl group. "m" and "k" each represents an integer of 1-10, preferably 1-5.

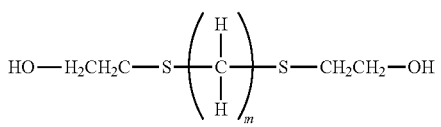

"m" represents an integer of 1-10, preferably 1-5.

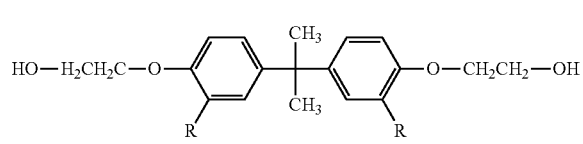

R represents an alkyl group, a phenyl group or a cyclohexyl group.

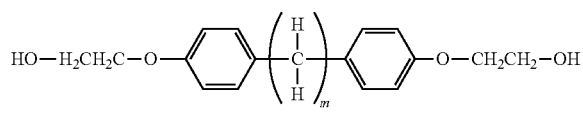

"m" represents an integer of 0-20, preferably 0-12.

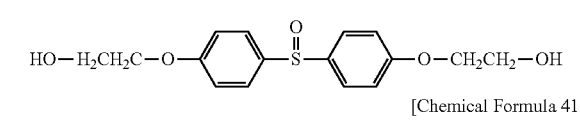

[Chemical Formula 41]

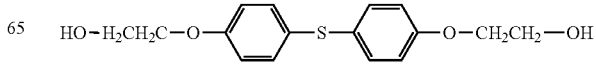

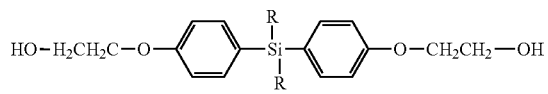

R represents a 1-10C linear or branched alkyl group.

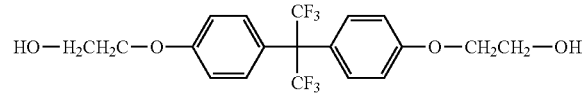

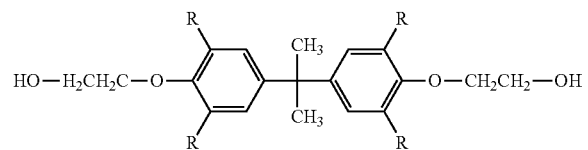

R represents a hydrogen atom, a 1-10C linear or branched alkyl group, a phenyl group or a cyclohexyl group.

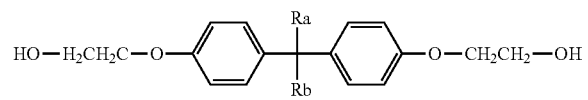

Ra and Rb each independently represent a hydrogen atom, a 1-30C, preferably 1-24C linear or branched alkyl group, a phenyl group or a cyclohexyl group.

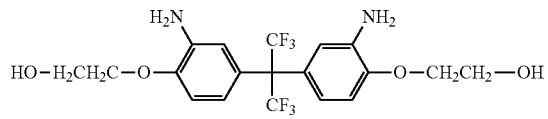

[Chemical Formula 42]

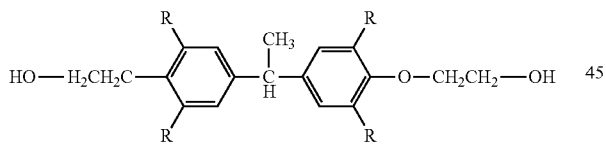

R represents a hydrogen atom, a 1-10C linear or branched alkyl group, a phenyl group or a cyclohexyl group.

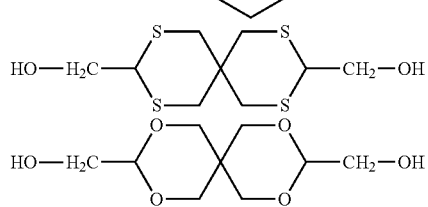

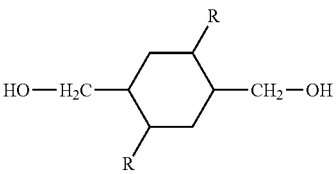

R represents a 1-8C, preferably 1-4C linear or branched alkyl group.

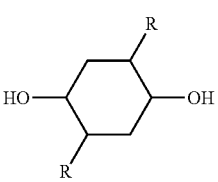

R represents a 1-8C, preferably 1-4C linear or branched alkyl group.

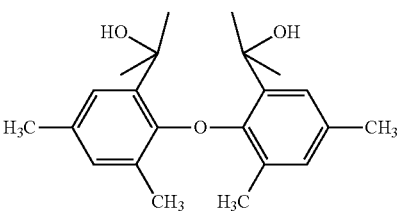

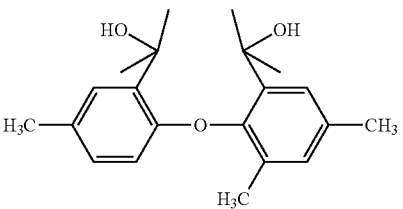

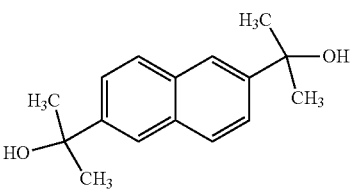

[Chemical Formula 43]

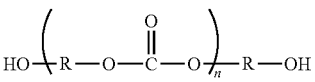

"n" represents an integer of 1-20, preferably 1-2.

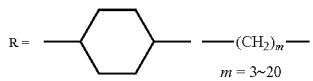

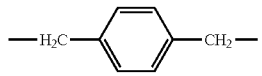

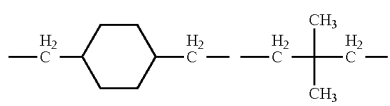

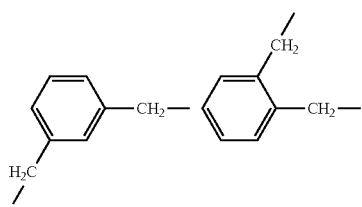

Employable examples of the aliphatic diol compounds represented by the above general formula (I') can be categorized into primary diols and secondary diols as follows:
(i) Primary Diols; 2-Hydroxyethoxy Group-Containing Compounds Preferable examples of the aliphatic diol compounds of the present invention include a 2-hydroxyethoxy group-containing compound represented by [HO—(CH$_2$)$_2$—O—Y—O—(CH$_2$)$_2$—OH], wherein "Y" is selected from the groups consisting of an organic group represented by the following structure (A), an organic group represented by the following structure (B), an organic group represented by the following structure (C) which is a divalent phenylene group or naphthylene group and a cycloalkylene group represented by the following structure (D):

[Chemical Formula 44]

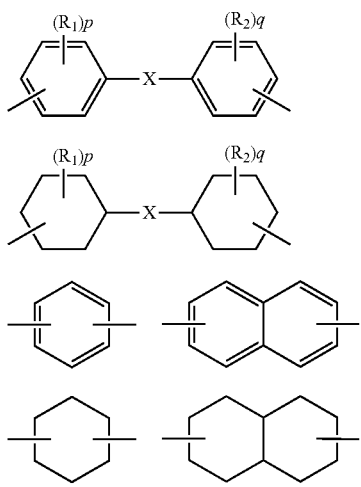

In the above structural formulas, X represents a single bond or a group having the structures shown below. R$_1$ and R$_2$ each independently represent a hydrogen atom, an alkyl group having 1-4 carbon atoms, a phenyl group or a cycloalkyl group, which may contain a fluorine atom. Preferable examples of R$_1$ and R$_2$ include a hydrogen atom and a methyl group. "p" and "q" each independently represent an integer of 0-4, preferably 0-3.

[Chemical Formula 45]

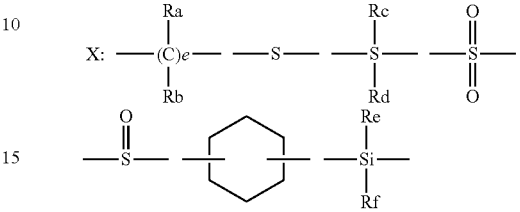

In the above structures, Ra and Rb each independently represent a hydrogen atom, a linear or branched alkyl group having 1-30, preferably 1-12, more preferably 1-6, most preferably 1-4 carbon atoms, an aryl group having 6-12 carbon atoms or a cycloalkyl group having 6-12 carbon atoms. Ra and Rb can be linked with each other to form a ring. Examples of the ring include an aromatic ring, an alicyclic ring, a heterocyclic ring containing O and/or S, and arbitrary combinations of them.

When Ra and Rb are an alkyl group or are linked with each other to form a ring, they can contain fluorine atoms.

Rc and Rd each independently represent an alkyl group having 1-10, preferably 1-6, more preferably 1-4 carbon atoms, which may contain a fluorine atom. Preferably, Rc and Rd are a methyl group or an ethyl group. "e" represents an integer of 1-20, preferably 1-12.

More specific examples of the aliphatic diol compounds are shown below. In the formulas shown below, "n" and "m" each independently represent an integer of 0-4. R$_1$ and R$_2$ each independently represent a hydrogen atom, a methyl group, an ethyl group, a n-propyl group, an isopropyl group, a butyl group, an isobutyl group, a phenyl group or a cyclohexyl group.

<Y: Organic Group (A)>

Preferable examples of the aliphatic diol compounds in the case that Y is the organic group represented by the above structure (A) are shown below.

[Chemical Formula 46]

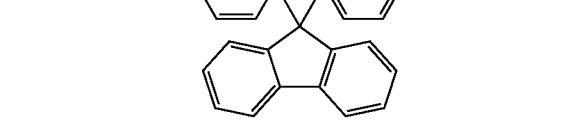

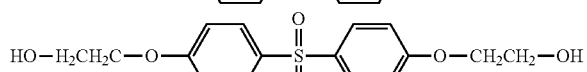

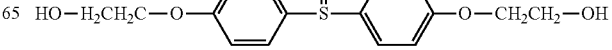

39
-continued

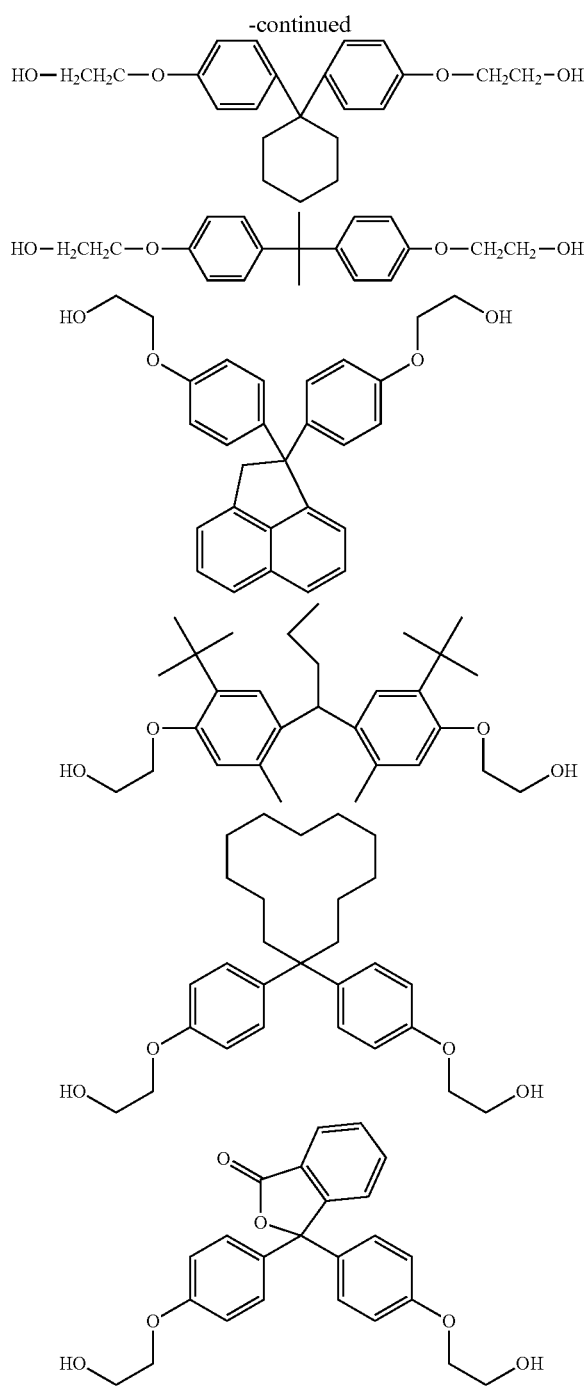

40
-continued

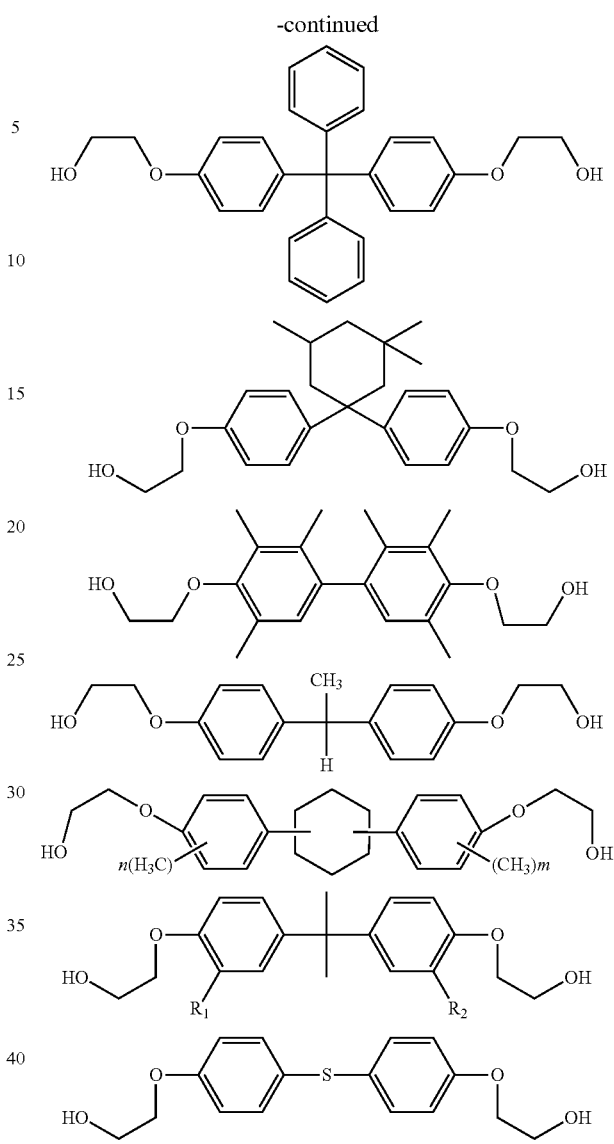

<Y: Organic Group (B)>

In the case that Y is the above-mentioned organic group represented by the above structure (B), X in the structure (B) is preferably represented by [—CRaRb—] wherein Ra and Rb each independently represent a hydrogen atom or an alkyl group having 1-6 carbon atoms, preferably a methyl group. Examples of this type of aliphatic diol compounds are shown below.

[Chemical Formula 47]

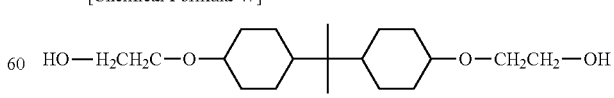

<Y: Organic Group (C)>

Preferable examples of the aliphatic diol compounds in the case that Y is the organic group represented by the above structure (C) are shown below.

[Chemical Formula 48]

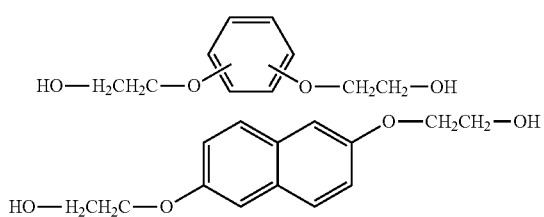

Most preferable compounds among the above-shown 2-hydroxyethoxy group-containing compounds are shown below.

[Chemical Formula 49]

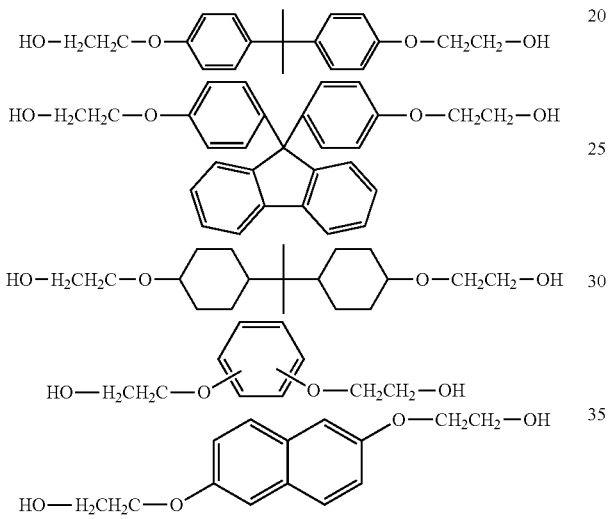

(ii) Primary Diols; Hydroxyalkyl Group-Containing Compounds

Preferable examples of the aliphatic diol compounds of the present invention include a hydroxyalkyl group-containing compound represented by [HO—$(CH_2)_r$—Z—$(CH_2)_r$—OH], wherein "r" is an integer of 1 or 2. That is, preferable hydroxyalkyl groups include a hydroxymethyl group and a hydroxyethyl group.

Examples of "Z" include organic groups shown below.

[Chemical Formula 49]

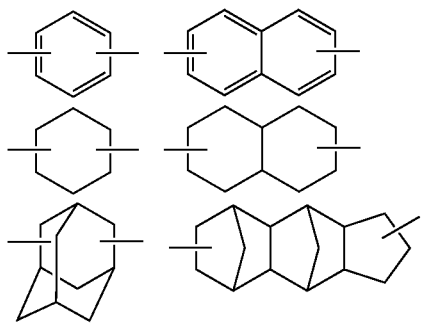

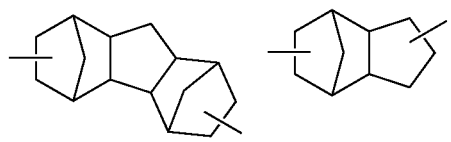

Preferable examples of the hydroxyalkyl group-containing compounds are shown below, wherein "n" and "m" each independently represent an integer of 0-4.

[Chemical Formula 51]

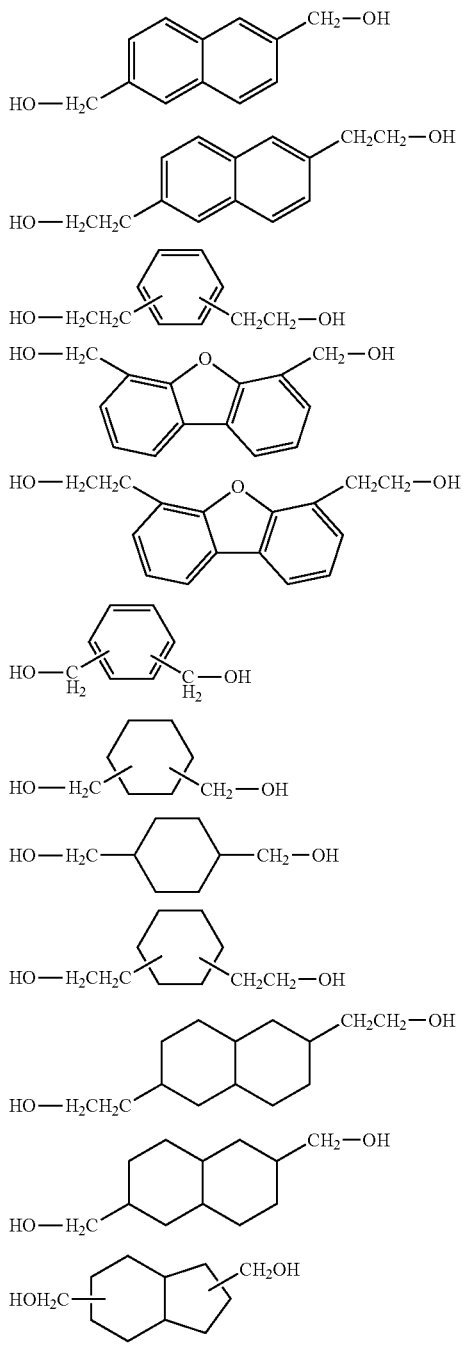

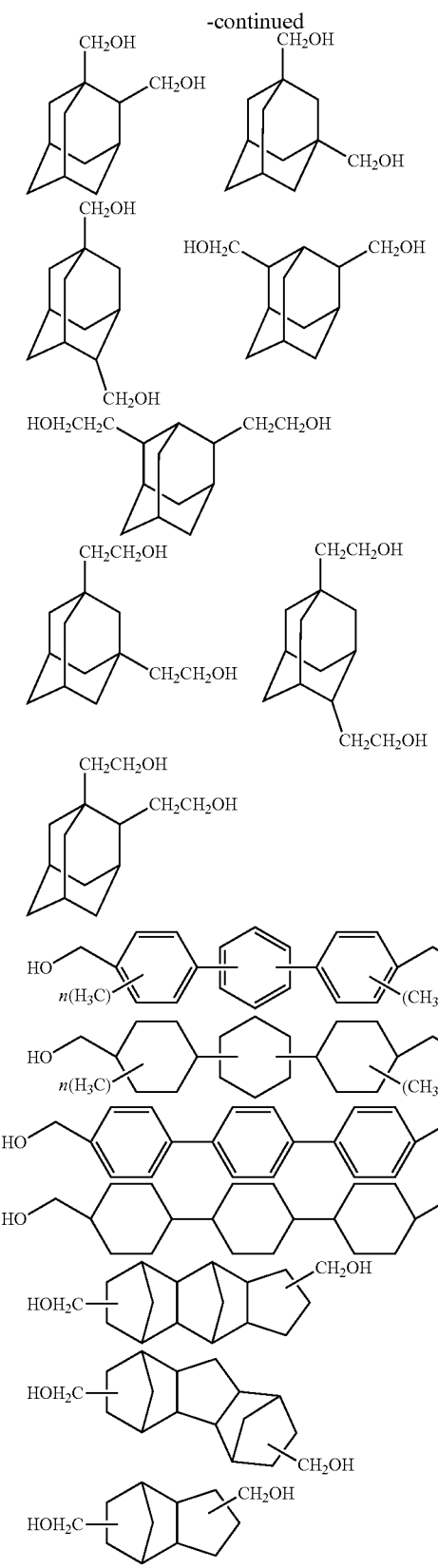

(iii) Primary Diols; Carbonate Diol Compounds

Preferable examples of the aliphatic diol compounds of the present invention also include a carbonate diol compound represented by the following structures, wherein R represents an organic group shown below, "n" represents an integer of 1-20, preferably 1-2 and "m" represents an integer of 3-20, preferably 3-10:

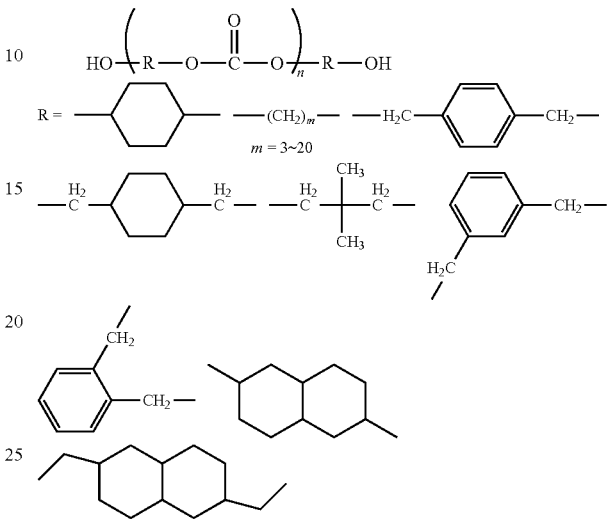

Preferable examples of the above-mentioned carbonate diol compounds include the following diols, especially cyclohexanedimethanol or a neopentylglycol dimer, or a mixture including them as a main component.

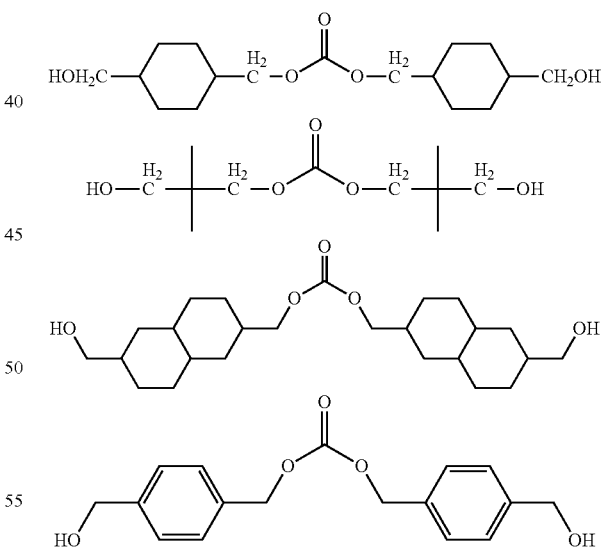

It is preferable to use a primary diol selected from the group consisting of (i) a 2-hydroxyethoxy group-containing compound, (ii) a hydroxyalkyl group-containing compound and (iii) a carbonate diol compound as the aliphatic diol compound to be used for the present invention.

The aliphatic diol compound to be used for the present invention should not be limited to the above-mentioned compounds. Employable examples of the aliphatic diol compounds remain among primary diols other than the above-mentioned primary diols or among secondary diols. Employable examples of the other primary diols or secondary diols are shown below.

In the structural formulas below, $R_1$ and $R_2$ each independently represent an hydrogen atom, a halogen atom, an amino group, a nitro group, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms and an aryloxy group having 6-20 carbon atoms. Preferable examples of $R_1$ and $R_2$ are a hydrogen atom, a fluorine atom, a methyl group, an ethyl group, a n-propyl group, an i-propyl group, a n-butyl group, an i-butyl group, a sec-butyl group, a tert-butyl group, a pentyl group, an isoamyl group, a cyclohexyl group, a phenyl group, a benzyl group, a methoxy group, or an ethoxy group.

$R_5$, $R_6$, $R_7$ and $R_8$ each independently represent a hydrogen atom or a monovalent alkyl group having 1-10 carbon atoms, R9 and R10 each independently represent a linear or branched alkyl group having 1-8, preferably 1-4 carbon atoms.

Ra and Rb each independently represent an hydrogen atom, a linear or branched alkyl group having 1-30 carbon atoms, preferably 1-12 carbon atoms, more preferably 1-6 carbon atoms, most preferably 1-4 carbon atoms, an aryl group having 6-12 carbon atoms or a cycloalkyl group having 6-12 carbon atoms. Ra and Rb can be linked with each other to form a ring. Examples of the rings include an aromatic ring, an aliphatic ring, a heterocyclic ring containing oxygen atom and/or sulfur atom and any combinations thereof. In the case that at least one of Ra and Rb is an alkyl group or Ra and Rb can be linked with each other to form a ring, the alkyl group or the ring can contain fluorine atom(s).

R' represents an alkylene group having 1-10, preferably 1-8 carbon atoms, Re and Rf each independently represent a hydrogen atom, a methyl group, an ethyl group, a n-propyl group, an isopropyl group, a butyl group, an isobutyl group or a phenyl group, "m'" represents an integer of 4-20, preferably 4-12, "m''" represents an integer of 1-10, preferably 1-5 and "e" represents an integer of 1-10.

<Other Primary Diols>

[Chemical Formula 54]

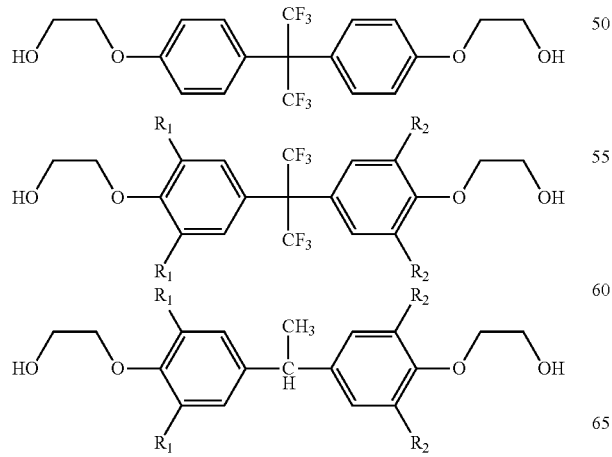

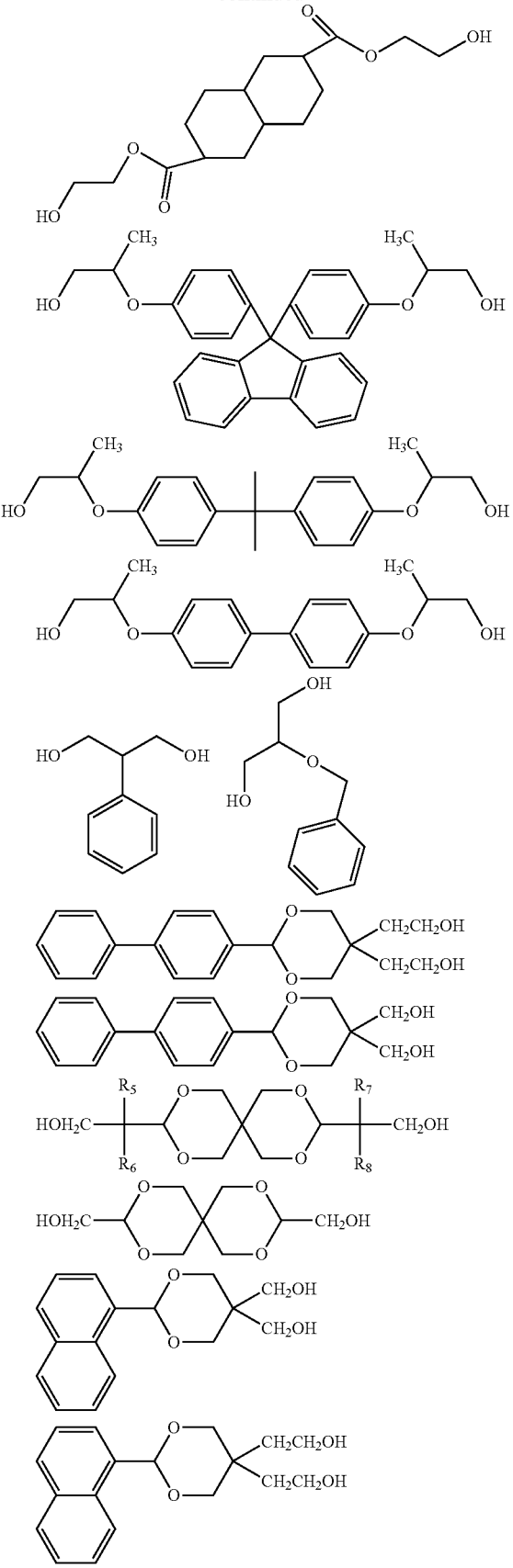

[Chemical Formula 55]
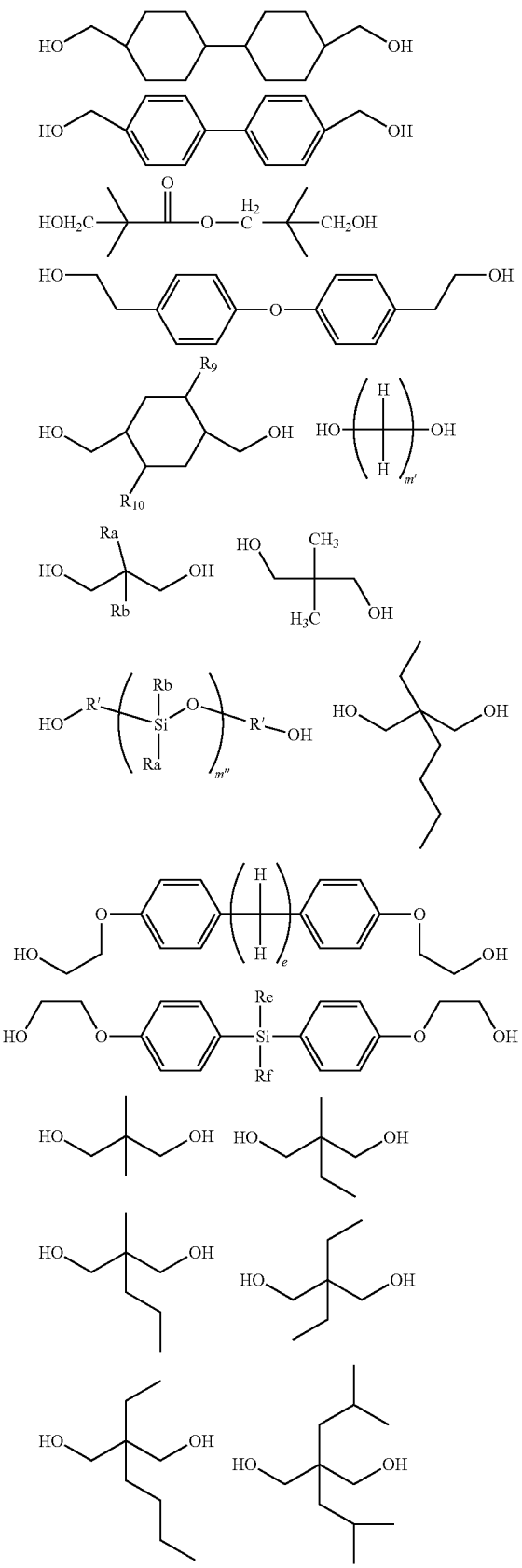
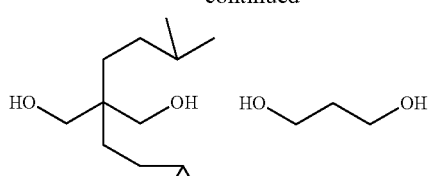
<Secondary Diols>
[Chemical Formula 56]
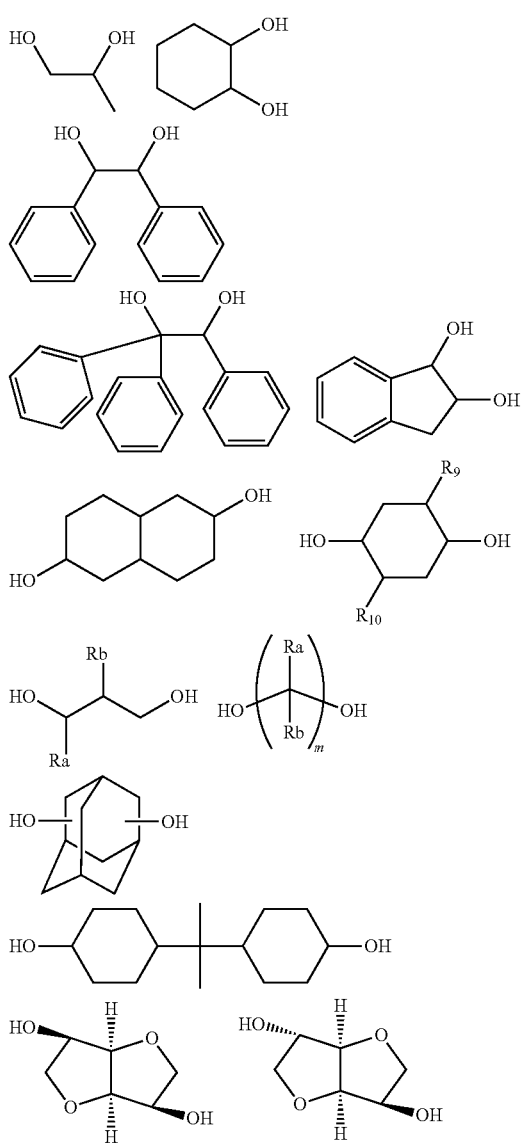

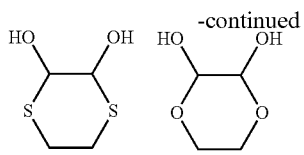

More specific examples thereof include aliphatic diols containing ring structure(s) such as 1,4-cyclohexanediol, 1,4-cyclohexanedimethanol, 1,6-cyclohexanedimethanol, tricyclo(5.2.1.0$^{26}$) decanedimethanol, decalin-2,6-dimethanol, pentacyclopentadecanedimethanol, isosorbide, isomannide and 1,3-adamantanedimethanol; aliphatic diols containing aromatic ring(s) such as p-xyleneglycol, m-xyleneglycol, naphthalenedimethanol, biphenyldimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol and fluorene diethanol; aliphatic polyester diols such as polycaprolactonediol, poly(1,4-butanedioladipate)diol and poly(1,4-butanediolsuccinate)diol; branched aliphatic diols such as 2-butyl-2-ethylpropane-1,3-diol (butylethylpropaneglycol), 2,2-diethylpropane-1,3-diol, 2,2-diisobutylpropane-1,3-diol, 2-ethyl-2-methylpropane-1,3-diol, 2-methyl-2-propylpropane-1,3-diol and 2-methyl-propane-1,3-diol; and carbonate diols such as bis(3-hydroxy-2,2-dimethylpropyl)carbonate.

The above aliphatic diol compounds can be used each independently, or two or more of them can be used in combination with each other. Practically, the aliphatic diol compound to be used can be selected in accordance with the reaction conditions employed or the like, since available compound species may vary depending on the reaction conditions or the like.

While the boiling point of the aliphatic diol compounds to be used for the present invention are not particularly limited, in light of the distillation process to remove an aromatic monohydroxy compound produced as a by-product by the reaction between the aromatic polycarbonate prepolymer with the aliphatic diol compound, it is preferable to use an aliphatic diol compound having the boiling point higher than said aromatic monohydroxy compound.

In addition, since it is necessary to progress the reaction steadily without volatilizing under a certain temperature and pressure, it is preferable to use an aliphatic diol compound having a higher boiling point in many cases. In such a case, it is desirable to use an aliphatic diol compound having a boiling point of 240° C. or higher, preferably 250° C. or higher at normal pressure.

Examples of the aliphatic diol compound having a relatively high boiling point include 1,4-cyclohexanedimethanol, 1,6-cyclohexanedimethanol (boiling point; 283° C.), decalin-2,6-dimethanol (341° C.), pentacyclopentadecalin dimethanol, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, fluorene diethanol, 2-butyl-2-ethylpropane-1,3-diol (271° C.), 2,2-diethylpropane-1,3-diol (250° C.), 2,2-diisobutylpropane-1,3-diol (280° C.) and bis(3-hydroxy-2,2-dimethylpropyl)carbonate.

Meanwhile, even the aliphatic diol compound having a boiling point lower than 240° C. at normal pressure can be used for the present invention thoroughly satisfactorily by devising a method of adding the aliphatic diol compound to the reaction system. Examples of the aliphatic diol compound having a relatively low boiling point include 2-ethyl-2-methylpropane-1,3-diol (226° C.), 2-methyl-2-propylpropane-1,3-diol (230° C.) and propane-1,2-diol (188° C.).

The upper limit of the boiling point of the aliphatic diol compound to be used for the present invention is not particularly limited, and the compound having a boiling point of 700° C. or lower can be used sufficiently.

(2) Structural Unit Represented by Formula (II)

The aromatic polycarbonate forming-unit of the polycarbonate copolymer of the present invention is a structural unit represented by the following formula (II):

[Chemical Formula 57]

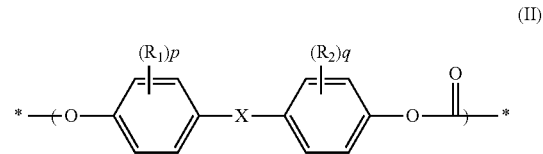

(II)

In the general formula (II), $R_1$ and $R_2$ each independently represent a halogen atom, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms or an aryloxy group having 6-20 carbon atoms, "p" and "q" each independently represent an integer of 0-4.

X represents a single bond or an organic group selected from the group consisting of the divalent organic groups represented by the following general formulas (II'):

[Chemical Formula 58]

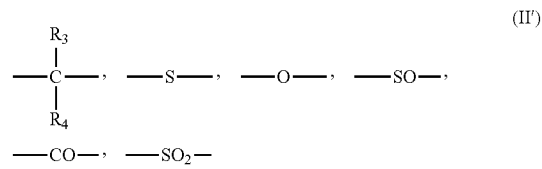

(II')

In the general formula (II'), $R_3$ and $R_4$ each independently represent a hydrogen atom, an alkyl group having 1-10 carbon atoms or an aryl group having 6-10 carbon atoms. $R_3$ and $R_4$ can be linked with each other to form an aliphatic ring.

Examples of aromatic dihydroxy compounds which can derive the structural unit represented by the above-mentioned general formula (II) include a compound represented by the following general formula (II"):

[Chemical Formula 59]

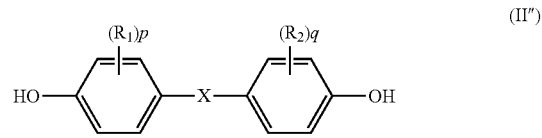

(II")

In the general formula (II"), $R_1$-$R_2$, "p", "q", and X are each same as those in the general formula (II).

Examples of the aromatic dihydroxy compounds include bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 4,4'-dihidroxydiphenylether 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone and 4,4'-dihydroxy-3,3'-dimethyldiphenylsulfone.

Among them, it is preferable to use 2,2-bis(4-hydroxyphenyl)propane because of the stability as a monomer and availability of a commercial product having a low impurity content.

The aromatic polycarbonate-forming unit of the present invention can be obtained by combining two or more of structural units derived from two or more of the above-mentioned various monomers (aromatic dihydroxy compounds) if necessary, for the purpose of controlling optical properties such as controlling a glass transition temperature, improving fluidity, improving the refractive index and reducing the birefringence.

(3) Feature (a)

The polycarbonate copolymer of the present invention has a structure represented by the following general formula (III), wherein "(I)" represents a structural unit represented by the general formula (I) and "(II)" represents a structural unit represented by the general formula (II):

[Chemical Formula 60]

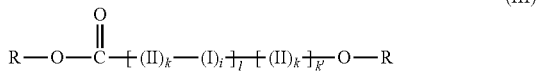

(III)

In the above general formula (III), R represents a linear or branched hydrocarbon group, a phenyl group which may contain fluorine atom(s), or a hydrogen atom. Examples of R include a methyl group, an ethyl group, a n-propyl group, an isopropyl group, a butyl group, an isobutyl group, a pentyl group, an isoamyl group, a hexyl group, a tetrafluoropropyl group, a t-butyl-phenyl group and a pentafluorophenyl group.

In the above general formula (III), "k" represents an average length of the chain formed of the aromatic polycarbonate-forming unit which is an aromatic polycarbonate chain. The aromatic polycarbonate-forming unit is a main structural unit of the polycarbonate copolymer of the present invention. The aromatic polycarbonate chain forms the main polymer structure of the polycarbonate copolymer. "k" represents an integer of at least 4, preferably 4-100, more preferably 5-70. This chain length represented by "k" has to be at least a certain length. If not, the structure represented by "-(I)$_i$-" might relatively increase, and as a result, it might have the tendency of the random copolymerizability of the polycarbonate copolymer to be increased and the properties such as heat resistance that a polycarbonate originally has to be lost.

The structure "-(II)$_k$-" which is the aromatic polycarbonate chain is a structure derived from the aromatic polycarbonate prepolymer, and the average molecular weight (Mw) thereof is preferably 5,000-60,000, more preferably 10,000-50,000, most preferably 10,000-40,000.

When the molecular weight of the aromatic polycarbonate chain is too low, the properties of the polycarbonate copolymer might be influenced significantly by the copolymerization component. Though it may be possible to modify the polymer properties, the effect to keep useful properties that a polycarbonate originally has might be insufficient.

When the molecular weight of the aromatic polycarbonate chain is too high, the polycarbonate copolymer might be impossible to achieve high fluidity while keeping useful properties that a polycarbonate originally has.

"i" represents an average length of the part "-(I)$_i$-" which is formed of a structural unit derived from the aliphatic diol compound. "i" is an integer of at least 1, preferably 1-5, more preferably 1-3, further preferably 1-2, most preferably 1. It becomes more preferable as "i" becomes closer to 1.

When the average length of the part "-(I)$_i$-" derived from the aliphatic diol compound is too long, heat resistance and/or physical properties might be deteriorated which might make it difficult to obtain the effect of the present invention.

"l" represents an average length of the structural unit "-[-(II)$_k$-(I)$_i$-]-" formed of the aromatic polycarbonate chain and the part derived from the aliphatic diol compound. "l" represents an integer of at least 1, preferably 1-30, more preferably 1-20, most preferably 1-10.

"k'" represents an integer of 0 or 1. That is, the part "-(I)$_i$-" derived from the aliphatic diol compound may have the aromatic polycarbonate chain on both sides thereof, or may have the aromatic polycarbonate chain on its one side only. In many cases, it has the aromatic polycarbonate chain on both sides.

While the content rate of the aromatic polycarbonate chain "-(II)$_k$-" and the part "-(I)$_i$-" derived from the aliphatic diol compound in the polycarbonate copolymer is not particularly limited, the molar ratio of ("-(II)$_k$-"/"-(I)$_i$-") of all the copolymer molecules on average is preferably 0.1-3, more preferably 0.6-2.5, most preferably 2.

While the ratio "k"/"l" is not particularly limited, it is preferably 2-200, more preferably 4-100.

According to the present invention, at least 70% by weight, preferably 80% by weight, more preferably 90% by weight, most preferably 95% by weight of the polymer molecules based upon the total amount of the polymer molecules consisting the polycarbonate copolymer of the present invention has "i" which is an integer of 1. A resin or a polymer is generally an aggregate or a collected body of polymer molecules having various structures and molecular weights. The polycarbonate copolymer of the present invention is an aggregate or a collected body of polymer molecules containing at least 70% by weight of a polymer molecule having the structure wherein the aromatic polycarbonate long chain ("-(II)$_k$-") is connected with "-(I)-" ("i"=1) which is formed of one structural unit derived from the aliphatic diol compound. When the content of the polymer molecule wherein "i"=1 in the collected body is less than 70% by weight, the ratio of copolymerizing components is increased. As a result, the properties of polymer might be easily influenced by the copolymerising components, which makes it difficult to keep good properties that a polycarbonate originally has.

The ratio of the polymer molecules having "i"=1 in the polycarbonate copolymer can be analyzed by carrying out $^1$H-NMR analysis of the polycarbonate copolymer.

(4) Feature (b)

According to the present invention, the content of the structural unit represented by the general formula (I) is 1-30 mol %, preferably 1-25 mol %, more preferably 1-20 mol % based upon the total amount of the structural units constituting said polycarbonate copolymer.

The content of the structural unit represented by the general formula (II) is 99-70 mol %, preferably 99-75 mol %, most preferably 99-80 mol %, based upon the total amount of the structural units constituting said polycarbonate copolymer.

When the ratio of the structural unit represented by the general formula (I) is too small, the polycarbonate copolymer might be impossible to satisfy the properties of high molecular weight and high fluidity.

When the ratio of the structural unit represented by the general formula (I) is too large, excellent properties such as physical strength and heat resistance that an aromatic polycarbonate resin originally has might be lost.

The polycarbonate copolymer of the present invention can contain other structural units derived from other copolymerising components within the scope of the present invention. However, it is desirable that the polycarbonate copolymer of the present invention is consisting of 1-30 mol % (preferably 1-25 mol %, more preferably 1-20 mol %) of the structural unit represented by the general formula (I) and 99-70 mol % (preferably 99-75 mol %, most preferably 99-80 mol %) of the structural unit represented by the general formula (II).

(5) Feature (c)

The polycarbonate copolymer of the present invention has Q-value (280° C., 160 kg load) which is an index of fluidity in the range from 0.02 to 1.0 ml/s, preferably in the range from 0.03 to 0.5 ml/s, which means that the polycarbonate copolymer has high fluidity.

In general, melting properties of a polycarbonate resin can be represented by "Q=K·P$^N$", wherein Q-value represents an outflow rate of a molten resin (ml/sec), "K" represents a segment of regression equation formula which is an independent variable depending on a molecular weight and/or structure of the polycarbonate resin, "P" represents a pressure value measured by a Koka type flow tester at 280° C. (load: 10-160 kgf) (kg/cm$^2$), N-value represents a structural viscosity index.

When Q-value is too low, injection molding of precision components or thin components might be difficult. In this case, it would be necessary to take countermeasures such as elevating the molding temperature, but problems such as gelation, emergence of different kind structures or the increase in N-value might occur under a high temperature.

When Q-value is too high, blow molding and/or extrusion molding might be difficult because of declining of the melt tension which might cause a drawdown to make it difficult to obtain a satisfactory molded product. In addition, injection molding might be difficult because of stringing which makes it difficult to obtain a satisfactory molded product.

(6) Feature (d)

The polycarbonate copolymer of the present invention has weight average molecular weight (Mw) of 30,000-100,000, preferably 30,000-80,000, more preferably 35,000-75,000. That is, the polycarbonate copolymer has high fluidity while being highly polymerized.

When the weight average molecular weight of the polycarbonate copolymer is too low, blow molding and/or extrusion molding might be difficult because of declining of the melt tension which might cause a drawdown to make it difficult to obtain a satisfactory molded product. Injection molding might be difficult because of stringing which makes it difficult to obtain a satisfactory molded product. Properties such as physical strength and heat resistance of the molded product obtained might be deteriorated. Properties such as resistance to organic solvents might also be deteriorated because of extension of an oligomer region.

When the weight average molecular weight of the polycarbonate copolymer is too high, injection molding of precision components or thin components might be difficult which may cause the increase of a molding cycle time and the negative influence to the production cost. Therefore, it would be necessary to take countermeasures such as elevating the molding temperature, but problems such as gelation, emergence of different kind structures or the increase in N-value might occur under a high temperature.

(7) N-Value (Structural Viscosity Index)

The polycarbonate copolymer of the present invention has a structural viscosity index (N-value) represented by the following mathematical formula (1) of preferably 1.3 or less, more preferably 1.28 or less, most preferably 1.25 or less:

[Mathematical Formula 5]

$$N\text{-value}=(\log(Q160)-\log(Q10))/(\log 160-\log 10) \quad (1)$$

In the above mathematical formula (1), Q160 represents a melting fluid volume per unit time (ml/sec) measured under the conditions of 280° C. and 160 kg load.

Q10 represents a melting fluid volume per unit time (ml/sec) measured under the conditions of 280° C. and 10 kg load.

In the present invention, it is measured by using a measuring apparatus manufactured by Shimadzu Corporation, trade name "CFT-500D". The stroke is 7.0-10.0 mm. The nozzle size is 1 mm(diameter)×10 mm(length).

The structural viscosity index (N-value) is an index of a branching degree of an aromatic polycarbonate resin. The polycarbonate copolymer of the present invention has low N-value, which means that the content of a branching structure is low and the content of a linear or straight chain structure is high.

In the case of conventional polycarbonate resins having the same Mw, it has a tendency that the fluidity becomes high and the Q-value becomes high when the content of a branching structure or the N-value is increased. In the case of the polycarbonate copolymer of the present invention, on the other hand, high fluidity or high Q-value can be achieved while keeping the N-value low.

(8) Relationship Between Mw and Q-Value

According to the present invention, Mw and Q-value preferably satisfy the following mathematical formula (2), more preferably satisfy the following mathematical formula (3). That is, the polycarbonate copolymer of the present invention can have a high molecular weight (high Mw) and high fluidity (high Q-value) at the same time. A polycarbonate copolymer which can satisfy the following mathematical formula (2) or preferably (3) had not been previously known.

[Mathematical Formula 6]

$$4.61\times\text{EXP}(-0.0000785\times Mw)<Q(\text{ml/s}) \quad (2)$$

$$4.61\times\text{EXP}(-0.0000785\times Mw)<Q(\text{ml/s})<2.30\times\text{EXP}(-0.0000310\times Mw) \quad (3)$$

In the case of conventional polycarbonate resins, highly polymerizing would cause the decrease in fluidity. In order to improve fluidity, the increase in the amount of low-molecular weight components would be required. Therefore, it had not been easy to produce a polycarbonate having high molecular weight and high fluidity at the same time as the property of its own.

The reason for that the polycarbonate copolymer of the present invention can have a high molecular weight and high fluidity at the same time may be considered to be the novel molecular structure thereof.

(9) Process for Producing Polycarbonate Copolymer

The polycarbonate copolymer of the present invention can be obtained by conducting a transesterification reaction between a polycondensation polymer having the structure represented by the above general formula (II) as a main repeating unit, hereinafter "aromatic polycarbonate prepolymer", and an aliphatic diol compound which derives the structure represented by the above general formula (I) under reduced pressure.

The polycarbonate copolymer thus obtained can have high molecular weight and high fluidity at the same time while keeping excellent properties such as impact resistance that a polycarbonate resin originally has.

Especially, it is preferable to produce the polycarbonate copolymer of the present invention by using an end-capped aromatic polycarbonate compound satisfying the specific conditions as will be described later.

When producing an aromatic polycarbonate prepolymer having a repeating unit represented by the general formula (II), it is possible to use multifunctional compound(s) having at least 3 functional groups in combination with the above-mentioned aromatic dihydroxy compound. Preferable examples of the multifunctional compounds include a compound having a phenolic hydroxy group and/or a carboxyl group.

When producing an aromatic polycarbonate prepolymer having a repeating unit represented by the general formula (II), it is possible to use dicarboxylic acid compound in combination with the above-mentioned aromatic dihydroxy compound to produce a polyestercarbonate. Examples of the dicarboxylic acid compounds include terephthalic acid, isophthalic acid, naphthalene dicarboxylic acid and 1,4-cyclohexane dicarboxylic acid. It is preferable that these dicarboxylic acid compounds are subjected to reaction in the form of acid chloride or ester.

When producing a polyestercarbonate, the dicarboxylic acid compound can be used in an amount of 0.5-45 mol %, more preferably 1-40 mol % based upon 100 mol % of the total amount of the dihydroxy components and dicarboxylic acid components.

It is preferable that at least a part of the above-mentioned aromatic polycarbonate prepolymer is terminally end-capped by a terminal group derived from an aromatic monohydroxy compound or a terminal phenyl group, hereinafter "an end-capped terminal group". The content of the end-capped terminal groups based upon the total amount of the terminals is preferably 60 mol % or more, wherein the specific effect of the present invention can be exhibited remarkably.

The concentration of terminal phenyl groups which is the content of the end-capped terminal groups based upon the total amount of the structural units of polymer is preferably 2 mol % or more, more preferably 2-20 mol %, most preferably 2-12 mol %. When the concentration of terminal phenyl groups is 2 mol % or more, the reaction with the aliphatic diol compound proceeds rapidly, and the specific effect of the present invention can be exhibit remarkably. The content of the end-capped terminal groups based upon the total amount of the terminal groups of polymer can be analyzed by $^1$H-NMR analysis.

It is also possible to analyze the concentration of terminal hydroxy groups by spectrometric measurement using Ti complex. The concentration of terminal hydroxy groups by this measurement is preferably 1,500 ppm or less, more preferably 1,000 ppm or less. When the concentration of terminal hydroxy groups is higher than the above range or the concentration of the end-capped terminal groups is lower than the above range, a polymer having sufficiently high molecular weight might not be obtained by the transesterification reaction with the aliphatic diol compound and the polycarbonate copolymer satisfying the features (a) to (d) of the present invention might not be obtained.

According to the present invention, "total amount of terminal groups of a polycarbonate" or "total amount of terminal groups of the aromatic polycarbonate prepolymer" is calculated on the assumption that, for example, the total amount of the terminal groups of 0.5 mol of a polycarbonate having no branching structures or having a linear structure is 1 mol.

Examples of the end-capped terminal groups include a phenyl terminal group, a cresyl terminal group, an o-tolyl terminal group, a p-tolyl terminal group, a p-t-butylphenyl terminal group, a biphenyl terminal group, an o-methoxycarbonylphenyl terminal group and a p-cumylphenyl terminal group.

Among them, a terminal group derived from an aromatic monohydroxy compound having a low boiling point which can be easily removed from the reaction system of the transesterification reaction with the aliphatic diol compound is preferable. A phenyl terminal group or a p-tert-butylphenyl terminal group is more preferable.

In the case of interfacial polymerization, the end-capped terminal group can be introduced by using a terminal terminating agent at the time of producing the aromatic polycarbonate prepolymer. Examples of the terminal terminating agents include p-tert-butyl phenol, phenol, p-cumylphenol and long-chain alkyl substituted phenol. The amount of the terminal terminating agent can be determined properly according to the intended content of terminal groups of the aromatic polycarbonate prepolymer which means the desired molecular weight of the aromatic polycarbonate prepolymer, the reaction apparatus to be used, reaction conditions or the like.

In the case of melt polymerization, end-capped terminal groups can be introduced by using diester carbonate such as diphenyl carbonate in an amount excess to the aromatic dihydroxy compound at the time of producing the aromatic polycarbonate prepolymer. While depending on the reaction apparatus to be used and reaction conditions, diester carbonate is used preferably in an amount of 1.00 to 1.30 mole, more preferably 1.02 to 1.20 mole per mole of the aromatic dihydroxy compound, thereby an aromatic polycarbonate prepolymer satisfying the above-mentioned content of end-capped terminal groups can be obtained.

According to the present invention, it is preferable to use a terminally end-capped polycondensation polymer obtained by transesterification reaction between an aromatic dihydroxy compound and diester carbonate as the aromatic polycarbonate prepolymer.

Regarding the molecular weight of the aromatic polycarbonate prepolymer, it is preferable that the weight average molecular weight (Mw) is in the range from 5,000 to 60,000, more preferably in the range from 10,000 to 50,000, most preferably in the range from 10,000 to 40,000.

When using an aromatic polycarbonate prepolymer having lower molecular weight outside the above range, influence of copolymerizing components on the properties of the copolymer obtained might be serious. Though it may be possible to modify the polymer properties, the effect to keep useful properties that a polycarbonate originally has might be insufficient.

When using an aromatic polycarbonate prepolymer having higher molecular weight outside the above range, since the aromatic polycarbonate prepolymer itself has high viscosity, it might be necessary to carry out the production of prepolymer under the conditions of high temperature and high shearing for long time, or it might be necessary to carry out the reaction with the aliphatic diol compound under high conditions of high temperature and high shearing for long time, which might be undesirable for obtaining a polycarbonate copolymer having high fluidity while keeping useful properties of the aromatic polycarbonate.

According to the present invention, the above-mentioned terminally end-capped aromatic polycarbonate prepolymer is reacted with an aliphatic diol compound in the presence of a transesterification catalyst under reduced pressure, thereby highly polymerizing can be achieved rapidly under moderate conditions. That is, the reaction between the aliphatic diol compound and the aromatic polycarbonate prepolymer can proceed faster than the reaction of producing an aliphatic polycarbonate unit by a transesterification reaction after a cleavage reaction of the aromatic polycarbonate prepolymer by the aliphatic diol compound.

As a result, the polymer molecules having the structural unit derived from the aliphatic diol compound wherein the chain length "i" in the above formula (III) is 1 ("i"=1) are produced in a larger amount than the polymer molecules having the structural unit derived from the aliphatic diol compound wherein the chain length "i" is 2 or more, and thus, a polycarbonate copolymer having the extremely high content of the polymer molecules having "i"=1 can be obtained.

Even a polycarbonate copolymer having the structural unit represented by the formula (I) and the structural unit represented by the formula (II) at the same rate as the present invention had been previously known, a polycarbonate copolymer containing the polymer molecules having the structural unit wherein "i"=1 in the above formula (III) at an extremely high rate cannot be obtained by a method of reacting an aromatic dihydroxy compound, an aliphatic diol compound and a carbonate bond-forming compound at the same time. A polycarbonate copolymer containing the polymer molecules having the structural unit wherein the chain length "i" in the above formula (III) at a low rate is a polymer having large N-value or the branching degree, which might have a tendency of occurring such problems as gelation, deterioration in hue and in physical strength such as impact resistance and stress-cracking resistance.

The polycarbonate copolymer obtained by reacting the end-capped aromatic polycarbonate prepolymer with an aliphatic diol compound in the presence of a transesterification catalyst under reduced pressure according to the present invention has a high Q-value while having high molecular weight, and more preferably, has a low N-value. In addition, the content of a unit having different kind structures which might cause negative effects on the present invention can be reduced to the extremely small amount. The unit having different kind structures here means a branching point unit or the like that a polycarbonate obtained by the conventional melt polymerization usually contains with a high proportion. Examples of the units having different kind structures include compounds having the structures shown below, but not limited to them. In the structural formulas below, $(R_1)$ p, $(R_2)$ q and X are the same as shown in the above formula (II). "Y" represents a hydrogen atom, a phenyl group, a methyl group, the structure of the formula (II) or the like.

[Chemical Formula 61]

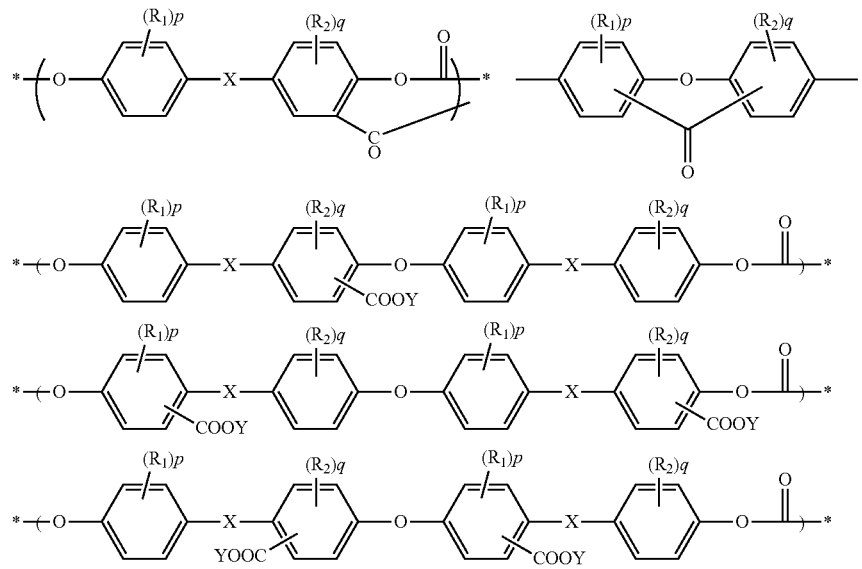

-continued

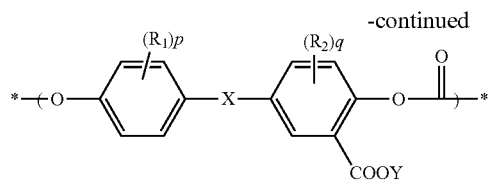

Employable examples of the aliphatic diol compounds which derives the structure represented by the above-mentioned formula (I) to be reacted with the aromatic polycarbonate prepolymer by a transesterification reaction are the same as mentioned above.

The amount of the aliphatic diol compound to be used according to the present invention is preferably 0.01 to 1.0 mole, more preferably 0.1 to 1.0 mole, further preferably 0.2 to 0.7 mole per mole of the total amount of the terminal groups of the aromatic polycarbonate prepolymer.

When using the aliphatic diol compound having relatively low boiling point, the excess amount can be added in consideration of the possibility that a part of the aliphatic diol compound might be discharged from the reaction system by volatilization without contributing to the reaction according to the reaction conditions.

For example, the aliphatic diol compounds having relatively low boiling point such as 1,4-cyclohexanedimethanol (boiling point: 283° C.), p-xylyleneglycol (boiling point: 288° C.), m-xylyleneglycol (boiling point:290° C.) and polycarbonate diol can be added in an amount of up to 50 mole per mole of the total amount of the terminal groups of the aromatic polycarbonate prepolymer so that the content of the structural unit derived from the aliphatic diol compound in the polycarbonate copolymer obtained becomes within the intended range.

When the amount of the aliphatic diol compound to be used is too large beyond the above range, the rate of copolymerizing components might increase and the influence of the structural unit represented by the formula (I) derived from the aliphatic diol compound which is a copolymerizing component on the polymer properties might become significant.

Though it may make it possible to modify the polymer properties, it would not be preferable in terms of the effect of keeping useful properties that the aromatic polycarbonate resin originally has.

When the amount of the aliphatic diol compound to be used is too small beyond the above range, high molecular weight and high fluidity might be ineffective which would not be preferable.

It is preferable that the starting materials to be used for producing the polycarbonate copolymer of the present invention such as the aromatic dihydroxy compound, the aliphatic diol compound and the carbonate bond-forming compound are of high chemical purity.

It is possible to carry out the production by using commercial products or materials having a normal level of chemical purity for industrial use. When using a low-purity material, however, the product thus obtained might contain by-products derived from impurities and/or different kind skeletal structures, which might cause problems such as a significant coloration of a polymer and/or a molded product obtained, deterioration of various properties such as heat stability and physical strength to make it difficult to keep useful properties that a polycarbonate resin originally has.

Preferable chemical purity of the aliphatic diol compound is 70% or more, more preferably 80% or more, most preferably 90% or more. Preferable chemical purity of the carbonate bond-forming compound such as diphenylcarbonate is 80% or more, more preferably 90% or more, most preferably 95% or more. Preferable chemical purity of the aromatic dihydroxy compound is 90% or more, more preferably 95% or more, most preferably 99% or more.

When the is a compound represented by the formula below such as BPEF, details about impurities contained in the starting material containing the aliphatic diol compound as a main component and that may degrade the chemical purity thereof will be described below.

[Chemical Formula 62]
Aliphatic Diol Compound:

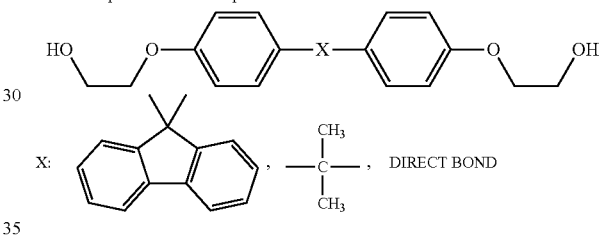

Examples of the impurities contained in the starting material containing the above-mentioned aliphatic diol compound as a main component and that may degrade the chemical purity thereof include the following compounds:

[Chemical Formula 62]
Impurities:

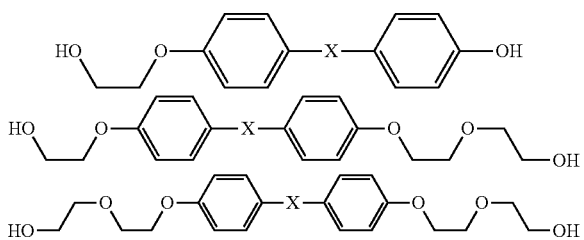

It is desirable that the content of the impurities having the above structures is 30% or less, preferably 20% or less, more preferably 10% or less based upon the starting material containing the above-mentioned aliphatic diol compound as a main component.

In addition, the starting material may also contain other impurities than the above impurities degrading the chemical purity, such as chlorine, nitrogen, boron, alkali metals, alkali earth metals, light metals and heavy metals. It is desirable that the contents of chlorine, nitrogen, boron, alkali metals, alkali earth metals, light metals and heavy metals are low.

Examples of the above alkali metals include lithium, sodium, potassium, rubidium, cesium and salts or derivatives thereof. Examples of the above alkali earth metals include beryllium, magnesium, calcium, strontium, barium and salts or derivatives thereof. Examples of the above light metals include titanium, aluminum and salts or derivatives thereof.

Examples of the above heavy metals include vanadium, chromium, manganese, iron, cobalt, nickel, copper, zinc, gallium, germanium, niobium, molybdenum, ruthenium, rhodium, palladium, silver, cadmium, indium, tin, antimony, tantalum, tungsten, osmium, iridium, platinum, gold, thallium, lead, bismuth, arsenic, selenium, tellurium, and salts or derivatives thereof.

It is preferable that the content of these impurities are low for all the starting materials.

The contents of impurities contained in the aliphatic diol compound are as follows:

The content of chlorine is 3 ppm or less, preferably 2 ppm or less, more preferably 1 ppm or less.

The content of nitrogen is 100 ppm or less.

The content of alkali metals, alkali earth metals, titanium or heavy metals (particularly, iron, nickel, chromium, zinc, copper, manganese, cobalt, molybdenum, tin) is 10 ppm or less, preferably 5 ppm or less, more preferably 1 ppm or less.

The contents of impurities contained in the other starting materials such as the aromatic dihydroxy compound and the carbonate bond-forming compound are as follows:

The content of chlorine is 2 ppm or less, preferably 1 ppm or less, more preferably 0.8 ppm or less.

The content of nitrogen is 100 ppm or less.

The content of alkali metals, alkali earth metals, titanium or heavy metals (particularly, iron, nickel, chromium, zinc, copper, manganese, cobalt, molybdenum, tin) is 10 ppm or less, preferably 5 ppm or less, more preferably 1 ppm or less.

When the content of metal components is large, the increase in the reaction rate by the catalyst activity, or conversely, the deterioration of reactivity might occur. As a result, the supposed reaction might be inhibited to proceed a side reaction, which might cause the increase of branched structures naturally produced or the increase of N-value beyond expectation. Furthermore, problems such as a significant coloration of a polymer and/or a molded product obtained, deterioration of various properties such as heat stability might occur.

The temperature of the transesterification reaction between the aromatic polycarbonate prepolymer and the aliphatic diol compound is preferably in the range of 240° C. to 320° C., more preferably 260° C. to 310° C., most preferably 270° C. to 300° C.

The degree of pressure reduction is preferably in the range of 13 kPaA (100 torr) or less, more preferably in the range of 1.3 kPaA (10 torr) or less, further preferably in the range from 0.67 kPaA to 0.013 kPaA (from 5 torr to 0.1 torr).

Examples of the basic compound catalysts to be used for the transesterification of the present invention include alkali metal compounds and/or alkali earth metal compounds, and nitrogen-containing compounds.

Preferable examples of alkali metal compounds and/or alkali earth metal compounds include organic acid salts, inorganic salts, oxide, hydroxide, hydride, alkoxide, quaternary ammonium hydroxide and salts thereof and amines of alkali metals and alkali earth metals. These compounds can be used each independently or two or more of them can be used in combination with each other.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium phenylborate, sodium benzoate, potassiumbenzoate, cesiumbenzoate, lithiumbenzoate, disodium hydrogenphosphate, dipotassium hydrogenphosphate, dilithium hydrogenphosphate, disodium phenylphosphate, a disodium salt of bisphenol A, a dipotassium salt of bisphenol A, a dicesiumsalt of bisphenol A and a dilithium salt of bisphenol A, a sodium salt of phenol, a potassium salt of phenol, a cesium salt of phenol, a lithium salt of phenol.

Examples of alkali earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of nitrogen-containing compounds include quaternary ammonium hydroxides containing alkyl groups and/or aryl groups such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzoimidazole; and a base or a basic salt such as ammonia, tetramethyl ammonium borohydride, tetrabutyl ammonium borohydride, tetrabutyl ammonium tetraphenylborate and tetraphenyl ammonium tetraphenylborate.

Regarding the transesterification catalyst, salts of zinc, tin, zirconium or lead can be preferably used. They can be used each independently or two or more of them can be used in combination with each other.

Examples of the transesterification catalysts include zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II) and lead acetate (IV).

The above catalysts can be used in an amount of preferably $1 \times 10^{-9}$ to $1 \times 10^{-3}$ mole, more preferably $1 \times 10^{-7}$ to $1 \times 10^{-5}$ mole per mole of the total amount of dihydroxy compounds.

According to the present invention, by the transesterification reaction between the aromatic polycarbonate prepolymer and the aliphatic diol compound, the weight average molecular weight (Mw) of the aromatic polycarbonate resin after the reaction can be increased preferably by 5,000 or more, more preferably by 10,000 or more, further preferably 15,000 or more compared to the weight average molecular weight (Mw) of the aromatic polycarbonate prepolymer.

The type of reaction apparatus or the materials of the vessels are not particularly limited and any of the known apparatus can be used. Any of the continuous polymerization or the batch polymerization can be used. The reaction apparatus used for carrying out the above-mentioned reaction can be a vertical reactor equipped with an anchor blade, a Maxblend impeller, a helical ribbon blade or the like, or can be a horizontal reactor equipped with a paddle blade, a lattice blade, a spectacle-shaped blade or the like, or can be an extruder equipped with a screw. In addition, it is desirable to use a reaction apparatus wherein the above-mentioned apparatuses are properly combined with each other taking viscosity of the polymer in consideration. It is more desirable to use a reaction apparatus equipped with a screw having a good horizontal stirring efficiency and a unit capable of dealing with reduced pressure.

It is further desirable to use a biaxial extruder or a horizontal reactor having a polymer seal and a vent.

Regarding the material of the apparatus, it is desirable to use a material which has no influence on the color tone of the polymer such as stainless steel selected from SUS310, SUS316, SUS304 or the like, nickel and iron nitride. In addition, a buff processing, an electropolishing processing and/or metal plating such as chromium plating can be applied on the inner side of the apparatus which is a place contacting with polymer.

According to the present invention, a catalyst deactivator can be added to the highly polymerized polymer in the above-mentioned highly polymerizing process. It is desirable, in general, to employ a method of adding known acid materials to deactivate catalyst. Examples of the acid materials include aromatic sulfonic acid such as p-toluenesulfonic acid, aromatic sulfonic acid esters such as butyl p-toluenesulfonate, organohalides such as stearic acid chloride, butyric acid chloride, benzoyl chloride and toluenesulfonic acid chloride, alkyl sulfate such as dimethyl sulfate and organohalides such as benzyl chloride.

After deactivating the catalyst, a process wherein to remove low-boiling compounds in the polymer by degassing under reduced pressure ranging from 0.013 to 0.13 kPaA (from 0.1 torr to 1 torr) at a temperature ranging from 200° C. to 350° C. For this process, a horizontal reactor equipped with a stirring blade excellent in surface renewability such as a paddle blade, a lattice blade and a spectacle-shaped blade or a thin-film evaporator can preferably be used.

According to the present invention, various additives such as heat stabilizer, antioxidant, pigment, dye enhancing agents, fillers, ultraviolet absorber, lubricant, mold release agents, crystal nucleating agents, plasticizer, fluidability-improving agents and antistatic agents can be added to the polymer.

These additives can be mixed with the polycarbonate resin by a conventional method. For example, a method wherein the components are subjected to dispersion mixing by a rapid mixer such as a tumble mixer, a Henschel mixer, a ribbon blender and a super mixer, and then the mixture is subjected to melting and kneading by an extruder, a banbury mixer, a roll kneader or the like can be employed appropriately.

The color evaluation of an aromatic polycarbonate resin is represented by a YI-value in general. A branched aromatic polycarbonate resin obtained by interfacial polymerization usually has the YI-value of 0.8-1.0. A conventional highly polymerized aromatic polycarbonate resin obtained by melt polymerization usually has the YI-value of 1.7-2.0 because of the deterioration of quality during the production process.

The polycarbonate copolymer obtained by the present invention has the YI-value comparable to the aromatic polycarbonate resin obtained by interfacial polymerization, and the deterioration of color is not observed.

II. Process for Producing a Highly Polymerized Aromatic Polycarbonate Resin

The process for producing a highly polymerized aromatic polycarbonate resin of the present invention comprises a highly-polymerizing process wherein an aromatic polycarbonate is reacted with an aliphatic diol compound which is a branched aliphatic diol compound or a carbonate-type aliphatic diol compound having a specific structure selected from the above-mentioned aliphatic diol compounds in the presence of a transesterification catalyst to increase the molecular weight.

(1) Aliphatic Diol Compound

The branched aliphatic diol compound to be used for the process for producing a highly polymerized aromatic polycarbonate resin of the present invention is a compound represented by the following formula (g1):

[Chemical Formula 64]

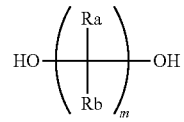

(g1)

In the above formula (g1), Ra and Rb each independently represent a hydrogen atom, a linear or branched alkyl group having 1-12 carbon atoms or a phenyl group. Ra and Rb can be same or different from each other. "m" represents an integer of 1-30, preferably 2-8, more preferably 2-3.

Preferably, Ra and Rb in the formula (g1) each independently represent a hydrogen atom or a linear or branched alkyl group having 1-5 carbon atoms. More preferably, Ra and Rb in the formula (g1) each independently represent a linear or branched alkyl group having 1-4 carbon atoms. Most preferable examples of Ra and Rb include a methyl group, an ethyl group, a propyl group, a n-butyl group and an i-butyl group.

Preferable examples of the aliphatic diol compound represented by the formula (g1) include a compound represented by the following formula (g2). In the formula (g2), Ra and Rb are the same as those in the formula (g1). "n" represents an integer of 1-28, preferably 1-6, more preferably 1-3, most preferably 1.

Preferably, Ra and Rb in the formula (g2) each independently represent a hydrogen atom or a linear or branched alkyl group having 1-5 carbon atoms. More preferably, Ra and Rb in the formula (g2) each independently represent a linear or branched alkyl group having 1-4 carbon atoms. Most preferable examples of Ra and Rb include a methyl group, an ethyl group, a propyl group, a n-butyl group and an i-butyl group.

[Chemical Formula 65]

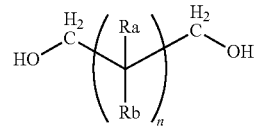

(g2)

Preferable examples of the aliphatic diol compound represented by the formula (g2) include a compound represented by the following formula (g3). In the formula (g3), Ra and Rb are the same as those in the formula (g1).

[Chemical Formula 66]

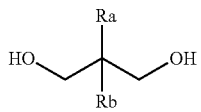
(g3)

Preferably, Ra and Rb in the formula (g3) each independently represent a hydrogen atom or a linear or branched alkyl group having 1-5 carbon atoms. More preferably, Ra and Rb in the formula (g3) each independently represent a linear or branched alkyl group having 1-4, most preferably 2-4 carbon atoms. Most preferable examples of Ra and Rb include a methyl group, an ethyl group, a propyl group, a n-butyl group and an i-butyl group. More preferable examples of Ra and Rb include an ethyl group, a propyl group, a n-butyl group and an i-butyl group.

Examples of the branched aliphatic diol compounds include 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,2-diol, propane-1,3-diol, ethane-1,2-diol (1,2-ethyleneglycol), 2,2-diisoamylpropane-1,3-diol and 2-methylpropane-1,3-diol.

Most preferable examples among the above aliphatic diol compounds include 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

In addition, a carbonate-type aliphatic diol compound represented by the following formula (g4) can also be used for the process for producing a highly polymerized aromatic polycarbonate resin of the present invention:

[Chemical Formula 67]

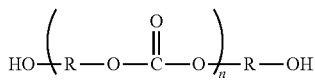
(g4)

In the formula (g4), R represents a divalent hydrocarbon group selected from the group consisting of the following structures:

[Chemical Formula 67]

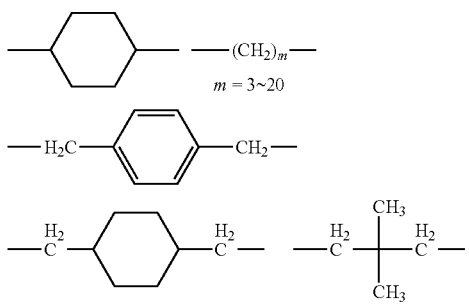

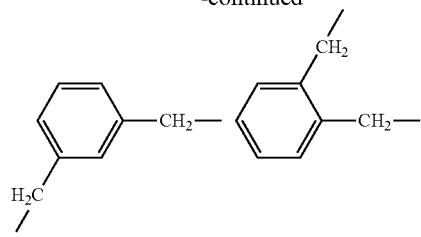

In the formula (g4), R is preferably a divalent hydrocarbon group represented by $-(CH_2)_m-$ wherein "m" is an integer of 3-20, more preferably 3-8, or a divalent hydrocarbon group represented by $-CH_2-C(CH_3)_2-CH_2-$. "n" represents an integer of 1-20, preferably 1-3, more preferably 1-2, most preferably 1. Examples of the carbonate-type aliphatic diol compound include bis(3-hydroxy-2,2-dimethylpropyl)carbonate.

(2) Aromatic Polycarbonate

The aromatic polycarbonate to be used for the process for producing a highly polymerized aromatic polycarbonate resin of the present invention is a polycondensation polymer having a structure represented by the above general formula (II) as a main repeating unit which is an aromatic polycarbonate prepolymer.

The process for producing of the present invention comprises a process wherein the aromatic polycarbonate prepolymer is reacted with the aliphatic diol compound having the structures represented by any one of the above formulas (g1)-(g4) under reduced pressure. According to the present invention, an aromatic polycarbonate resin having advantages of a linked and highly polymerized polycarbonate using a linking agent which enables high molecular weight and high fluidity, and also having remarkably improved heat resistance can be obtained while keeping useful properties such as impact resistance that a common polycarbonate originally has.

The aromatic polycarbonate prepolymer to be used for the present invention can be synthesized by interfacial polymerization or by melt polymerization. It also can be synthesized by solid-phase polymerization or thin-film polymerization. It also can be a recycled polycarbonate recovered from used products such as used disk molded products. These polycarbonates can be mixed with each other to use as the prepolymer before highly-polymerizing reaction. For example, a polycarbonate resin obtained by interfacial polymerization can be mixed with a polycarbonate resin obtained by meld polymerization. Or a polycarbonate resin obtained by melt polymerization or interfacial polymerization can be mixed with a recycled polycarbonate recovered from used disk molded products and the like.

The aromatic polycarbonate prepolymer in the present invention can also be described as a polycondensation product having a reaction product unit of an aromatic dihydroxy compound with a carbonate bond-forming compound as a main repeating unit.

Therefore, the aromatic polycarbonate prepolymer can be obtained with ease by a known transesterification method wherein an aromatic dihydroxy compound which derives corresponding structures is reacted with diester carbonate in the presence of a basic catalyst, or by a known interfacial polymerization method wherein an aromatic dihydroxy compound is reacted with phosgene or the like in the presence of an acid binding agent.

Particularly in the process of the present invention, it is preferable to use an end-capped aromatic polycarbonate compound satisfying the features mentioned later.

When producing an aromatic polycarbonate prepolymer, it is possible to use multifunctional compound(s) having at least 3 functional groups in combination with the above-mentioned aromatic dihydroxy compound. Preferable examples of the multifunctional compounds include a compound having a phenolic hydroxy group and/or a carboxyl group.

When producing an aromatic polycarbonate prepolymer, it is possible to use dicarboxylic acid compound in combination with the above-mentioned aromatic dihydroxy compound to produce a polyestercarbonate. Examples of the dicarboxylic acid compounds include terephthalic acid, isophthalic acid, naphthalene dicarboxylic acid and 1,4-cyclohexane dicarboxylic acid. It is preferable that these dicarboxylic acid compounds are subjected to reaction in the form of acid chloride or ester.

When producing a polyestercarbonate, the dicarboxylic acid compound can be used in an amount of 0.5-45 mol %, more preferably 1-40 mol % based upon 100 mol % of the total amount of the dihydroxy components and dicarboxylic acid components.

It is preferable that at least a part of the above-mentioned aromatic polycarbonate prepolymer is terminally end-capped by a terminal group derived from an aromatic monohydroxy compound or a terminal phenyl group, hereinafter "an end-capped terminal group". The content of the end-capped terminal groups based upon the total amount of the terminals is preferably 60 mol % or more, wherein the specific effect of the present invention can be exhibited remarkably.

The concentration of terminal phenyl groups which is the content of the end-capped terminal groups based upon the total amount of the structural units of polymer is preferably 2 mol % or more, more preferably 2-20 mol %, most preferably 2-12 mol %. When the concentration of terminal phenyl groups is 2 mol % or more, the reaction with the aliphatic diol compound proceeds rapidly, and the specific effect of the present invention can be exhibit remarkably. The content of the end-capped terminal groups based upon the total amount of the terminal groups of polymer can be analyzed by $^1$H-NMR analysis.

It is also possible to analyze the concentration of terminal hydroxy groups by spectrometric measurement using Ti complex. The concentration of terminal hydroxy groups by this measurement is preferably 1,500 ppm or less, more preferably 1,000 ppm or less. When the concentration of terminal hydroxy groups is higher than the above range or the concentration of the end-capped terminal groups is lower than the above range, a polymer having sufficiently high molecular weight might not be obtained by the transesterification reaction with the aliphatic diol compound.

According to the present invention, "total amount of terminal groups of a polycarbonate" or "total amount of terminal groups of the aromatic polycarbonate prepolymer" is calculated on the assumption that, for example, the total amount of the terminal groups of 0.5 mol of a polycarbonate having no branching structures or having a linear structure is 1 mol.

Examples of the end-capped terminal groups include a phenyl terminal group, a cresyl terminal group, an o-tolyl terminal group, a p-tolyl terminal group, a p-t-butylphenyl terminal group, a biphenyl terminal group, an o-methoxycarbonylphenyl terminal group and a p-cumylphenyl terminal group.

Among them, a terminal group derived from an aromatic monohydroxy compound having a low boiling point which can be easily removed from the reaction system of the transesterification reaction with the aliphatic diol compound is preferable. A phenyl terminal group or a p-tert-butylphenyl terminal group is more preferable.

In the case of interfacial polymerization, the end-capped terminal group can be introduced by using a terminal terminating agent at the time of producing the aromatic polycarbonate prepolymer. Examples of the terminal terminating agents include p-tert-butyl phenol, phenol, p-cumylphenol and long-chain alkyl substituted phenol. The amount of the terminal terminating agent can be determined properly according to the intended content of terminal groups of the aromatic polycarbonate prepolymer which means the desired molecular weight of the aromatic polycarbonate prepolymer, the reaction apparatus to be used, reaction conditions or the like.

In the case of melt polymerization, end-capped terminal groups can be introduced by using diester carbonate such as diphenyl carbonate in an amount excess to the aromatic dihydroxy compound at the time of producing the aromatic polycarbonate prepolymer. While depending on the reaction apparatus to be used and reaction conditions, diester carbonate is used preferably in an amount of 1.00 to 1.30 mole, more preferably 1.02 to 1.20 mole per mole of the aromatic dihydroxy compound, thereby an aromatic polycarbonate satisfying the above-mentioned content of end-capped terminal groups can be obtained.

According to the present invention, it is preferable to use a terminally end-capped polycondensation polymer obtained by transesterification reaction between an aromatic dihydroxy compound and diester carbonate as the aromatic polycarbonate prepolymer.

Regarding the molecular weight of the aromatic polycarbonate prepolymer, it is preferable that the weight average molecular weight (Mw) is in the range from 5,000 to 60,000, more preferably in the range from 10,000 to 50,000, most preferably in the range from 10,000 to 40,000.

When using an aromatic polycarbonate prepolymer having higher molecular weight outside the above range, since the aromatic polycarbonate prepolymer itself has high viscosity, it might be necessary to carry out the production of prepolymer under the conditions of high temperature and high shearing for long time, and/or it might be necessary to carry out the reaction with the aliphatic diol compound under the conditions of high temperature and high shearing for long time.

Particularly in the process of the present invention, it is preferable to use an end-capped aromatic polycarbonate compound satisfying the features mentioned later.

(3) Cyclic Carbonate

According to the present invention, the above-mentioned terminally end-capped aromatic polycarbonate prepolymer is reacted with an aliphatic diol compound in the presence of a transesterification catalyst under reduced pressure, thereby highly polymerizing can be achieved rapidly under moderate conditions. That is, the reaction between the aliphatic diol compound and the aromatic polycarbonate prepolymer proceeds faster than the reaction of producing an aliphatic polycarbonate unit by a transesterification reaction after a cleavage reaction of the aromatic polycarbonate prepolymer by the aliphatic diol compound.

According to the method of reacting the aliphatic diol compound having an above-mentioned specific structure of the present invention, the reaction between the aromatic polycarbonate prepolymer and the aliphatic diol compound is carried out and at the same time, a cyclic carbonate which is a ring compound having a structure corresponding to the structure of the aliphatic diol compound is produced as a by-product.

By removing the by-product cyclic carbonate from the reaction system, highly polymerization of the aromatic polycarbonate prepolymer proceeds to obtain an aromatic polycarbonate resin having almost the same structure as a conventional polycarbonate homopolymer such as a homopolycarbonate resin derived from bisphenol A eventually.

The preferable method for producing according to the present invention comprises a highly-polymerizing process wherein an aromatic polycarbonate is reacted with said aliphatic diol compound and a cyclic carbonate-removing process wherein at least a part of cyclic carbonate produced as a by-product by the highly-polymerizing process is removed from the reaction system.

The highly-polymerizing process and the cyclic carbonate-removing process should not necessarily be considered as separate processes in a physical sense and in terms of time. Actually, these processes are carried out usually simultaneously. That is, the preferable method for producing according to the present invention comprises a process wherein an aromatic polycarbonate is reacted with said aliphatic diol compound to highly polymerize, and at the same time, at least a part of cyclic carbonate produced as a by-product by the reaction is removed from the reaction system.

The by-product cyclic carbonate is a compound represented by the following formula (h1):

[Chemical Formula 69]

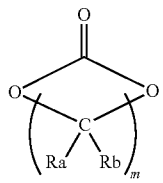

(h1)

In the formula (h1), Ra and Rb each independently represent a hydrogen atom, a linear or branched alkyl group having 1-12 carbon atoms or a phenyl group. Ra and Rb can be same or different from each other. "m" represents an integer of 1-30, preferably 2-8, more preferably 2-3.

Preferably, Ra and Rb in the formula (h1) each independently represent a hydrogen atom or a linear or branched alkyl group having 1-5 carbon atoms. More preferably, Ra and Rb in the formula (h1) each independently represent a linear or branched alkyl group having 1-4 carbon atoms. Most preferable examples of Ra and Rb include a methyl group, an ethyl group, a propyl group, a n-butyl group and an i-butyl group.

Preferable examples of the cyclic carbonate represented by the formula (h1) include a compound represented by the following formula (h2):

[Chemical Formula 70]

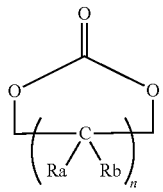

(h2)

In the formula (h2), Ra and Rb are the same as those in the formula (h1). "n" represents an integer of 1-28, preferably 1-6, more preferably 1-3, most preferably 1.

Preferably, Ra and Rb in the formula (h2) each independently represent a hydrogen atom or a linear or branched alkyl group having 1-5 carbon atoms, more preferably, a linear or branched alkyl group having 1-4 carbon atoms. Most preferable examples of Ra and Rb include a methyl group, an ethyl group, a propyl group, a n-butyl group and an i-butyl group.

Preferable examples of the cyclic carbonate represented by the formula (h2) include a compound represented by the following formula (h3). In the formula (h3), Ra and Rb are the same as those in the formula (h2).

[Chemical Formula 71]

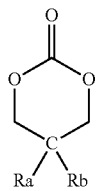

(h3)

Examples of the above-mentioned cyclic carbonate include the following compounds:

[Chemical Formula 72]

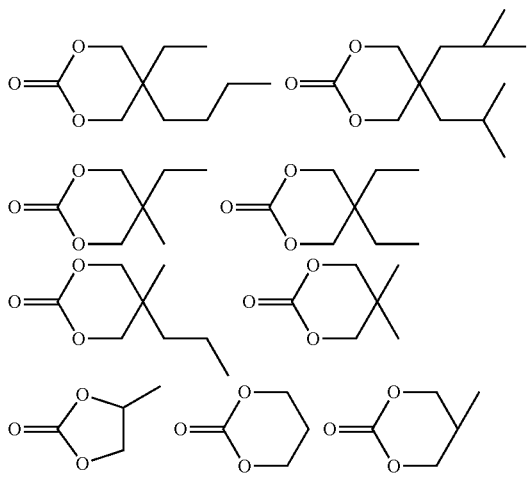

The process of the present invention using the aliphatic diol compound having the structures represented by any one of the above formulas (g1)-(g4) has the advantage that highly polymerizing can be achieved at a high reaction rate compared to the conventional method of producing a polycarbonate by melt polymerization. This advantage is similar to the highly polymerized polycarbonate resin obtained by a linking and highly polymerizing method using other aliphatic diol compound than the above-mentioned (g1) or (g4) aliphatic diol compound as a linking agent which had also been found by the present inventor.

However, according to the method of the present invention using the aliphatic diol compound having the structures represented by any one of the above formulas (g1)-(g4), a cyclic carbonate having a specific structure is produced as a by-product. After removing the by-product cyclic carbonate from the reaction system, a highly polymerized polycarbonate resin having almost the same skeleton as a polycarbonate homopolymer. Since the by-product cyclic carbonate has a structure corresponding to the aliphatic diol compound used, it can be assumed to be a ring compound derived from the aliphatic diol compound. However, the reaction mechanism of producing a cyclic carbonate as a by-product simultaneously with the highly polymerizing reaction is not necessarily defined.

For example, mechanisms shown by the following reaction schemes (1) and (2) are assumed but they are not altogether clarified. The process of the present invention using the aliphatic diol compound having the structures represented by any one of the above formulas (g1)-(g4) is simply characterized in the step of reacting an aromatic polycarbonate prepolymer with an aliphatic diol compound having a specific structure and the step of removing a by-product cyclic carbonate having a structure corresponding to the aliphatic diol compound, and is not necessarily limited to any reaction mechanism.

SCHEME (1)

[Chemical Formula 73]

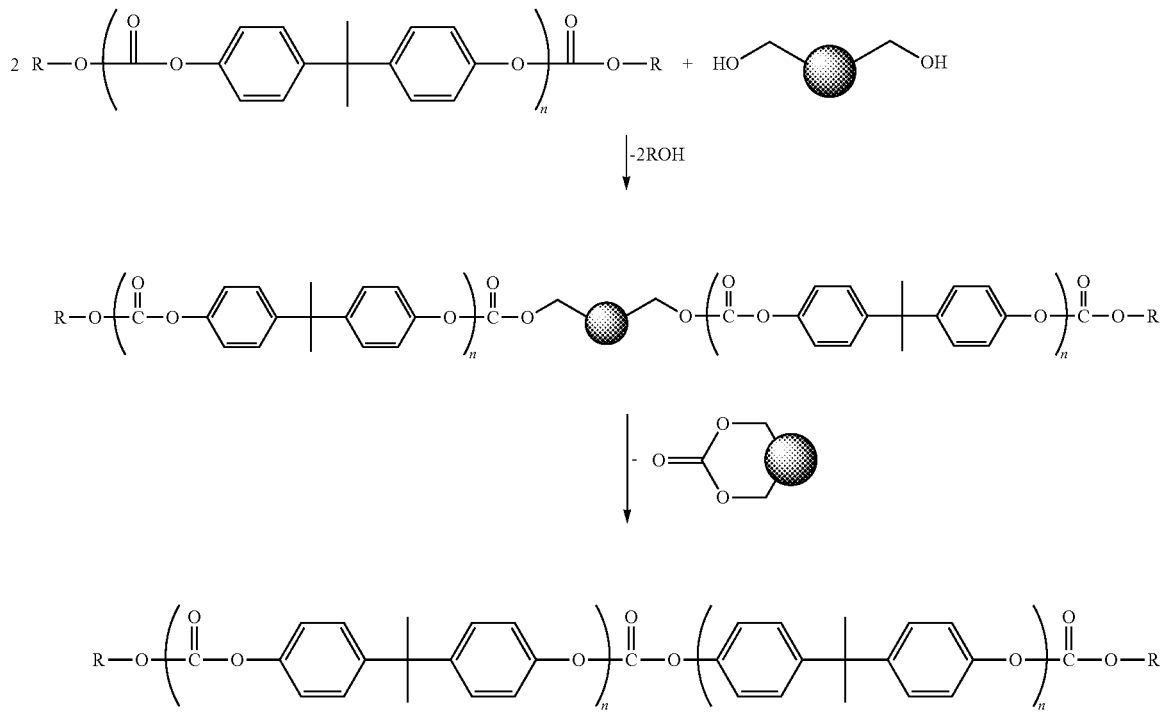

SCHEME (2)

[Chemical Formula 74]

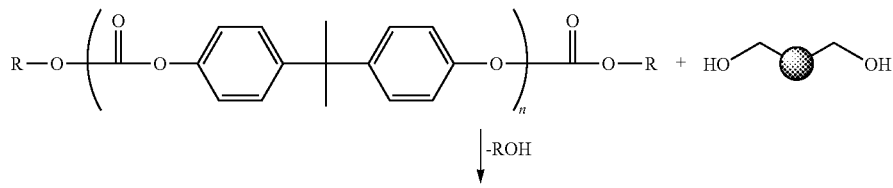

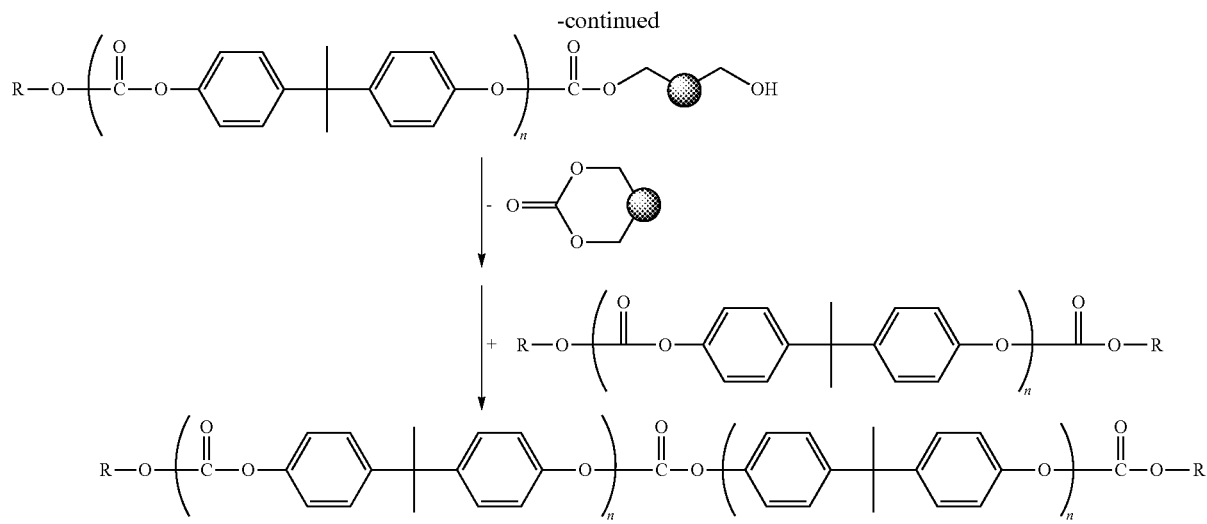

Unlike the case of a highly polymerized polycarbonate copolymer obtained by a linking and highly polymerizing process using an aliphatic diol compound as a linking agent, the highly polymerized polycarbonate resin obtained by the process of the present invention using the aliphatic diol compound having the structures represented by any one of the above formulas (g1)-(g4) contains little copolymerising components derived from the linking agent and the skeleton of polymer is almost the same as a polycarbonate homopolymer.

Since the highly polymerized aromatic polycarbonate resin obtained by using the above-mentioned aliphatic diol compound does not substantially contain copolymerising components derived from the aliphatic diol compound as a linking agent or is extremely few in amount even if contained, it has extremely high heat stability and is excellent in heat resistance, compared to the highly polymerized polycarbonate copolymer obtained by a linking and highly polymerizing process using other aliphatic diol compounds as a linking agent.

In addition, while having almost the same skeleton as a polycarbonate homopolymer obtained by a conventional method, the highly polymerized aromatic polycarbonate resin obtained by using the above-mentioned aliphatic diol compound has excellent properties such as a low N-value, a low content of units having different kind structures and an excellent color tone, which is the same advantage as the highly polymerized polycarbonate resin obtained by a linking and highly polymerizing method using other aliphatic diol compounds has. The unit having different kind structures here means a branching point unit or the like that a polycarbonate obtained by the conventional melt polymerization usually contains with a high proportion.

Examples of the units having different kind structures include the units shown in the above description regarding the polycarbonate copolymer but not particularly limited to them.

In the case that the highly polymerized polycarbonate resin obtained by the process of the present invention using the aliphatic diol compound having the structures represented by any one of the above formulas (g1)-(g4) contains the copolymerizing components derived from said aliphatic diol compound in its skeleton, the content of the structural unit derived from said aliphatic diol compound is preferably 1 mol % or less, more preferably 0.1 mol % or less based upon the total amount of the structural units consisting the highly polymerized polycarbonate resin.

The amount of the aliphatic diol compound to be used according to the present invention is preferably 0.01 to 1.0 mole, more preferably 0.1 to 1.0 mole, further preferably 0.2 to 0.7 mole per mole of the total amount of the terminal groups of the aromatic polycarbonate prepolymer.

When using the aliphatic diol compound having relatively low boiling point, the excess amount can be added in consideration of the possibility that a part of the aliphatic diol compound might be discharged from the reaction system by volatilization without contributing to the reaction according to the reaction conditions.

For example, the aliphatic diol compounds can be added in an amount of up to 50 mole, preferably up to 10 mole more preferably up to 5 mole per mole of the total amount of the terminal groups of the aromatic polycarbonate prepolymer.

It is preferable that the starting materials to be used for producing the highly polymerized polycarbonate resin of the present invention such as the aromatic dihydroxy compound, the aliphatic diol compound and the carbonate bond-forming compound are of high chemical purity.

It is possible to carry out the production by using commercial products or materials having a normal level of chemical purity for industrial use. When using a low-purity material, however, the product thus obtained might contain by-products derived from impurities and/or different kind skeletal structures, which might cause problems such as a significant coloration of a polymer and/or a molded product obtained, deterioration of various properties such as heat stability and physical strength to make it difficult to keep useful properties that a polycarbonate resin originally has.

Preferable chemical purity and impurity contents of aliphatic diol compounds are the same as those used for producing the above-mentioned polycarbonate copolymer. Furthermore, using starting materials having higher purity will improve a color tone and a molecular weight retention rate which is an index indicating how the deterioration of molecular weight can be inhibited at the time of loading heat retention under high temperature.

(3) Process for Production

The conditions of the process for producing according to the present invention using the aliphatic diol compound having the structures represented by any one of the above formulas (g1)-(g4) will be described in more detail below.
(i) Addition of Aliphatic Diol Compound According to the present invention using the aliphatic diol compound having the structures represented by any one of the above formulas (g1)-(g4), the highly polymerizing reaction that is a transesterification reaction is carried out in a highly-polymerization reactor by adding the aliphatic diol compound thereto to mix with the aromatic polycarbonate prepolymer.

The method for adding and mixing the aliphatic diol compound and the aromatic polycarbonate prepolymer is not particularly limited. In the case of using the aliphatic diol compound having a relatively high boiling point such as 240° C. or higher, it is preferable to feed the aliphatic diol compound directly into the highly-polymerization reactor under high vacuum with the degree of pressure reduction of 10 torr (1333 Pa) or less, more preferably, 2.0 torr (267 Pa) or less, most preferably 0.01-1 torr (1.3-133 Pa). When the degree of pressure reduction at the time of feeding the aliphatic diol compound into the highly polymerization reactor is insufficient, a cleavage reaction of the main chain of the prepolymer by by-products such as phenol might proceed, and as a result, the extension of reaction time of the reaction mixture might be required in order to achieve high molecular weight.

In the case of using the aliphatic diol compound having a relatively low boiling point such as 350° C. or lower, it is possible to mix the aromatic polycarbonate prepolymer and the aliphatic diol compound under a relatively moderate degree of pressure reduction. For example, after mixing the aromatic polycarbonate prepolymer and the aliphatic diol compound under a pressure close to the normal pressure to produce a prepolymer mixture, said prepolymer mixture can be subjected to highly polymerization reaction under reduced pressure, whereby even using the aliphatic diol compound having a relatively low boiling point, volatilization would be suppressed to a minimum and a high molecular weight can be achieved without use of an excess amount of the aliphatic diol compound.

(ii) Transesterification Reaction (Highly Polymerization Reaction)

The temperature of the transesterification reaction between the aromatic polycarbonate prepolymer and the aliphatic diol compound is preferably in the range of 240° C. to 320° C., more preferably 260° C. to 310° C., most preferably 270° C. to 300° C.

The degree of pressure reduction is preferably in the range of 13 kPaA (100 torr) or less, more preferably in the range of 1.3 kPaA (10 torr) or less, further preferably in the range from 0.67 kPaA to 0.013 kPaA (from 5 torr to 0.1 torr).

Examples of the basic compound catalysts to be used for the transesterification of the present invention include alkali metal compounds and/or alkali earth metal compounds, and nitrogen-containing compounds.

Preferable examples of alkali metal compounds and/or alkali earth metal compounds include organic acid salts, inorganic salts, oxide, hydroxide, hydride, alkoxide, quaternary ammonium hydroxide and salts thereof and amines of alkali metals and alkali earth metals. These compounds can be used each independently or two or more of them can be used in combination with each other.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium boron hydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt of bisphenol A, a dipotassium salt of bisphenol A, a dicesium salt of bisphenol A and a dilithium salt of bisphenol A, a sodium salt of phenol, a potassium salt of phenol, a cesium salt of phenol, a lithium salt of phenol.

Examples of alkali earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of nitrogen-containing compounds include quaternary ammonium hydroxides containing alkyl groups and/or aryl groups such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzoimidazole; and a base or a basic salt such as ammonia, tetramethyl ammonium borohydride, tetrabutyl ammonium borohydride, tetrabutyl ammonium tetraphenylborate and tetraphenyl ammonium tetraphenylborate.

Regarding the transesterification catalyst, salts of zinc, tin, zirconium or lead can be preferably used. They can be used each independently or two or more of them can be used in combination with each other.

Examples of the transesterification catalysts include zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II) and lead acetate (IV).

The above catalysts can be used in an amount of preferably $1 \times 10^{-9}$ to $1 \times 10^{-3}$ mole, more preferably $1 \times 10^{-7}$ to $1 \times 10^{-5}$ mole per mole of the total amount of dihydroxy compounds.

(iii) Cyclic Carbonate-Removing Process

According to the process for producing a highly polymerized aromatic polycarbonate resin of the present invention, an aromatic polycarbonate prepolymer is highly polymerized by the above-mentioned highly polymerization reaction, and at the same time, a cyclic carbonate produced by said reaction as a by-product is removed away from the reaction system. By removing the by-product cyclic carbonate from the reaction system, the highly polymerization reaction of the aromatic polycarbonate prepolymer is promoted.

Examples of methods for removing the cyclic carbonate include distillation wherein the cyclic carbonate is distilled away together with phenol which is also a by-product and an unreacted aliphatic diol compound. The temperature of distillation is preferably 260° C. to 320° C.

Removing process is carried out for at least a part of the cyclic carbonate. It is most preferable to remove all the by-product cyclic carbonate. Usually, however, it is not easy to remove completely.

In the case that the cyclic carbonate cannot be removed completely, the cyclic carbonate is allowed to remain in the manufactured product of the polycarbonate resin. The preferable remained amount of cyclic carbonate in the manufactured product is up to 3000 ppm. That is, according to the process of the present invention using the aliphatic diol compound having the structures represented by any one of the above formulas (g1)-(g4), a polycarbonate resin composition containing 3000 ppm or less of cyclic carbonate is obtained as mentioned later.

The cyclic carbonate removed away from the reaction system can be recovered and recycled through some processes such as a hydrolysis step and/or a purifying step. Phenol removed together with cyclic carbonate can also be recovered and recycled to provide to the process of producing diphenylcarbonate.

(iv) Other Conditions

According to the present invention, by the transesterification reaction between the aromatic polycarbonate prepolymer and the aliphatic diol compound, the increase in the weight average molecular weight (Mw) of the aromatic polycarbonate resin after the reaction can be increased preferably by 5,000 or more, more preferably by 10,000 or more, further preferably 15,000 or more compared to the weight average molecular weight (Mw) of the aromatic polycarbonate prepolymer.

The type of reaction apparatus or the materials of the vessels are not particularly limited and any of the known apparatus can be used. Any of the continuous polymerization or the batch polymerization can be used. The reaction apparatus used for carrying out the above-mentioned reaction can be a vertical reactor equipped with an anchor blade, a Maxblend impeller, a helical ribbon blade or the like, or can be a horizontal reactor equipped with a paddle blade, a lattice blade, a spectacle-shaped blade or the like, or can be an extruder equipped with a screw. In addition, it is desirable to use a reaction apparatus wherein the above-mentioned apparatuses are properly combined with each other taking viscosity of the polymer in consideration. It is more desirable to use a reaction apparatus equipped with a rotary blade having a good horizontal stirring efficiency and a unit capable of dealing with reduced pressure.

It is further desirable to use a biaxial extruder or a horizontal reactor having a polymer seal and a degassing means.

Regarding the material of the apparatus, it is desirable to use a material which has no influence on the color tone of the polymer such as stainless steel selected from SUS310, SUS316, SUS304 or the like, nickel and iron nitride. In addition, a buff processing, an electropolishing processing and/or metal plating such as chromium plating can be applied on the inner side of the apparatus which is a place contacting with polymer.

According to the present invention, a catalyst deactivator can be added to the highly polymerized polymer in the above-mentioned highly polymerizing process. It is desirable, in general, to employ a method of adding known acid materials to deactivate catalyst. Examples of the acid materials include aromatic sulfonic acid such as p-toluenesulfonic acid, aromatic sulfonic acid esters such as butyl p-toluenesulfonate, organohalides such as stearic acid chloride, butyric acid chloride, benzoyl chloride and toluenesulfonic acid chloride, alkyl sulfate such as dimethyl sulfate and organohalides such as benzyl chloride.

After deactivating the catalyst, a process wherein to remove low-boiling compounds in the polymer by degassing under reduced pressure ranging from 0.013 to 0.13 kPaA (from 0.1 torr to 1 torr) at a temperature ranging from 200° C. to 350° C. can be carried out. For carrying out this process, a horizontal reactor equipped with a stirring blade excellent in surface renewability such as a paddle blade, a lattice blade and a spectacle-shaped blade or a thin-film evaporator can preferably be used.

It is further desirable to use a biaxial extruder or a horizontal reactor having a polymer seal and a vent.

According to the present invention, various additives such as heat stabilizer, antioxidant, pigment, dye enhancing agents, fillers, ultraviolet absorber, lubricant, mold release agents, crystal nucleating agents, plasticizer, fluidability-improving agents and antistatic agents can be added to the polymer.

These additives can be mixed with the polycarbonate resin by a conventional method. For example, a method wherein the components are subjected to dispersion mixing by a rapid mixer such as a tumble mixer, a Henschel mixer, a ribbon blender and a super mixer, and then the mixture is subjected to melting and kneading by an extruder, a banbury mixer, a roll kneader or the like can be employed appropriately.

The color evaluation of an aromatic polycarbonate resin is represented by a YI-value in general. A branched aromatic polycarbonate resin obtained by interfacial polymerization usually has the YI-value of 0.8-1.0. A conventional highly polymerized aromatic polycarbonate resin obtained by melt polymerization usually has the YI-value of 1.7-2.0 because of the deterioration of quality during the production process.

The polycarbonate copolymer obtained by the present invention has the YI-value comparable to the aromatic polycarbonate resin obtained by interfacial polymerization, and the deterioration of color is not observed.

Furthermore, using starting materials having higher purity will improve a color tone and a molecular weight retention rate which is an index indicating how the deterioration of molecular weight can be inhibited at the time of loading heat retention under high temperature. More precisely, the molecular weight retention rate can be improved to 100%.

(4) Highly Polymerized Aromatic Polycarbonate Resin

The highly polymerized aromatic polycarbonate resin obtained by the process of the present invention using the aliphatic diol compound having the structures represented by any one of the above formulas (g1)-(g4) has weight average molecular weight (Mw) of 30,000-100,000, preferably 30,000-80,000, more preferably 35,000-75,000. That is, the highly polymerized aromatic polycarbonate resin has high fluidity while being highly polymerized.

When the weight average molecular weight of the highly polymerized aromatic polycarbonate resin is too low, blow molding and/or extrusion molding might be difficult because of declining of the melt tension which might cause a drawdown to make it difficult to obtain a satisfactory molded product. Injection molding might be difficult because of stringing which makes it difficult to obtain a satisfactory molded product. Properties such as physical strength and heat resistance of the molded product obtained might be deteriorated. Properties such as resistance to organic solvents might also be deteriorated because of extension of an oligomer region.

When the weight average molecular weight of the highly polymerized aromatic polycarbonate resin is too high, injection molding of precision components or thin components might be difficult which may cause the increase of a molding cycle time and the negative influence to the production cost. Therefore, it would be necessary to take countermeasures such as elevating the molding temperature, but problems such as gelation, emergence of different kind structures or the increase in N-value might occur under a high temperature.

The highly polymerized aromatic polycarbonate resin obtained by the process of the present invention has a structural viscosity index (N-value) represented by the following mathematical formula (1) of preferably 1.3 or less, more preferably 1.28 or less, most preferably 1.25 or less:

[Mathematical Formula 7]

$$N\text{-value}=(\log(Q160)-\log(Q10))/(\log 160-\log 10) \quad (1)$$

In the above mathematical formula (1), Q160 represents a melting fluid volume per unit time (ml/sec) measured under the conditions of 280° C. and 160 kg load.

Q10 represents a melting fluid volume per unit time (ml/sec) measured under the conditions of 280° C. and 10 kg load.

In the present invention, it is measured by using a measuring apparatus manufactured by Shimadzu Corporation, trade name "CFT-500D". The stroke is 7.0-10.0 mm. The nozzle size is 1 mm(diameter)×10 mm(length).

The structural viscosity index (N-value) is an index of a branching degree of an aromatic polycarbonate resin. The highly polymerized aromatic polycarbonate resin obtained by the process of the present invention has a low N-value, which means that the content of a branching structure is low and the content of a linear or straight chain structure is high.

In the case of conventional polycarbonate resins having the same Mw, it has a tendency that the fluidity becomes high and the Q-value becomes high when the content of a branching structure or the N-value is increased. In the case of the polycarbonate copolymer of the present invention, on the other hand, high fluidity or high Q-value can be achieved while keeping the N-value low.

(4) Polycarbonate Resin Composition

The polycarbonate resin composition of the present invention comprises a highly polymerized aromatic polycarbonate resin obtained by the process of the present invention using the aliphatic diol compound (g1) or (g4) as a main component and cyclic polycarbonate represented by the following formula (h1).

That is, the highly polymerized aromatic polycarbonate resin obtained by the process of the present invention using the aliphatic diol compound (g1) or (g4) can contain a small amount of residual cyclic carbonate after removing the cyclic polycarbonate produced as a by-product during the production process.

[Chemical Formula 75]

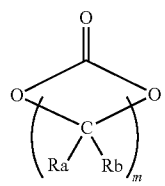

(h1)

In the formula (h1), Ra and Rb each independently represent a hydrogen atom, a linear or branched alkyl group having 1-30 carbon atoms, preferably 1-6 carbon atoms, a phenyl group or a cyclohexyl group. Ra and Rb can be same or different from each other. "m" represents an integer of 1-30, preferably 2-8, more preferably 2-3.

Preferably, Ra and Rb in the formula (h1) each independently represent a hydrogen atom or a linear or branched alkyl group having 1-5 carbon atoms. More preferably, Ra and Rb in the formula (h1) each independently represent a linear or branched alkyl group having 1-4 carbon atoms. Most preferable examples of Ra and Rb include a methyl group, an ethyl group, a propyl group, a n-butyl group and an i-butyl group.

Preferable examples of the cyclic carbonate represented by the formula (h1) include a compound represented by the following formula (h2):

[Chemical Formula 76]

In the formula (h2), Ra and Rb are the same as those in the formula (h1). "n" represents an integer of 1-28, preferably 1-6, more preferably 1-3, most preferably 1.

Preferably, Ra and Rb in the formula (h2) each independently represent a hydrogen atom or a linear or branched alkyl group having 1-5 carbon atoms, more preferably, a linear or branched alkyl group having 1-4 carbon atoms. Most preferable examples of Ra and Rb include a methyl group, an ethyl group, a propyl group, a n-butyl group and an i-butyl group.

Preferable examples of the cyclic carbonate represented by the formula (h2) include a compound represented by the following formula (h3). In the formula (h3), Ra and Rb are the same as those in the formula (h2).

[Chemical Formula 77]

Examples of the above-mentioned cyclic carbonate include the following compounds:

[Chemical Formula 78]

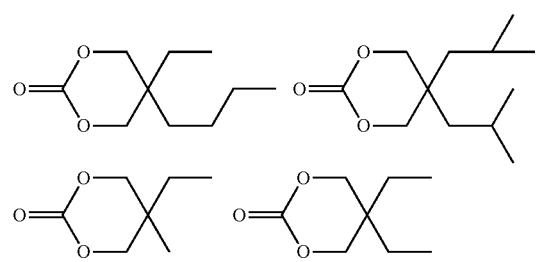

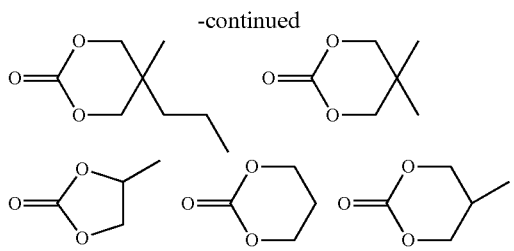

The content of the cyclic carbonate represented by the above formula (h1) in the polycarbonate resin composition of the present invention is 3000 ppm or less, preferably 1000 ppm or less, more preferably 500 ppm or less, most preferably 300 ppm or less. While the lower limit of the content of cyclic carbonate is not particularly limited, it is ideally 0%, usually the detection limit or measurable limit, preferably 0.0005 ppm. When the content of cyclic carbonate is too large, defects such as deterioration of physical strength might occur.

(5) Products

The polycarbonate copolymer of the present invention, the highly polymerized aromatic polycarbonate resin obtained by the process of the present invention and the polycarbonate resin composition of the present invention can be used for various molded products or sheet or film products obtained by injection molding, blow molding, extrusion molding, injection blow molding, rotational molding, compression molding or the like. In the case of using the polycarbonate for these purposes, the polycarbonate produced by the process of the present invention can be used independently, or can be used by blending with other polymers. Depending on the intended use, it can also be used accompanied with a process of hard coating, laminating or the like.

Most preferably, the polycarbonate copolymer of the present invention, the highly polymerized aromatic polycarbonate resin obtained by the process of the present invention and the polycarbonate resin composition of the present invention are used for extrusion molding, blow molding, injection molding or the like. Examples of the products thus obtained include a blow-molded article, an extrusion-molded article, an injection-molded article such as precision components or thin components. Preferable examples of the precision components or thin components include those having a thickness of 1 μm to 3 mm.

Examples of the molded articles include optical media products such as compact discs, digital video discs, mini discs and magnetic optical discs, optical communication media such as optical fibers, optical components such as a headlight lens of a car and a lens on a camera, optical equipment components such as a siren light cover and an illumination lump cover, replacement goods for a window glass of a vehicle such as a train and a car, replacement goods for a window glass of a house, a daylight window components such as a sunroof and a greenhouse roof, lenses or chassis of a goggle, sunglasses and spectacles, packages or chassis of office automation equipments such as a copying machine, a fax machine and a personal computer, chassis of home electric appliances such as a TV set and a microwave oven, electronic components such as a connector and an IC tray, protective equipments such as a helmet, a protector and a protective mask, medical goods such as a case for dialysis and artificial denture, domestic articles such as dishes, trays and a baby bottle, miscellaneous goods such as wrapping materials, writing tools and stationery.

However, these examples are not intended to limit the scope of the present invention.

Most preferably, the polycarbonate copolymer of the present invention, the highly polymerized aromatic polycarbonate resin obtained by the process of the present invention and the polycarbonate resin composition of the present invention are used for the following articles that are required to have high mechanical strength and high-precision moldability:

Automotive components; a headlight lens, a meter board, a sunroof, replacement goods for a window glass, outer panel components Various films such as a liquid crystal display, a light guide plate, an optical disc substrate Building materials such as a transparent sheet Chassis of a personal computer, a printer, a liquid crystal display TV as a structural member III. Aromatic Polycarbonate Compound The aromatic polycarbonate compound of the present invention is substantially formed of a structural unit represented by the following general formula (1)(=carbonate-forming unit), which has weight average molecular weight (Mw) of 5,000 to 60,000 (feature (A)), the concentration of terminal hydroxy groups of not more than 1500 ppm (feature (B)), and the concentration of terminal phenyl groups of not less than 2 mol % (feature (C)).

That is, the aromatic polycarbonate compound of the present invention is a polycondensation polymer having mainly a repeating unit formed of the reaction product of an aromatic dihydroxy compound and a carbonate bond-forming compound.

[Chemical Formula 79]

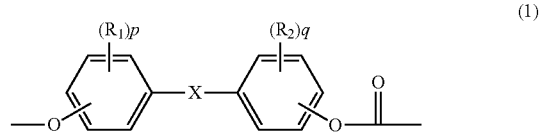

In the general formula (1), the two phenylene groups may be any of p-phenylene groups, m-phenylene groups, or o-phenylene groups. The two phenylene groups may have same substitution layout, or may have different substitution layout with each other. It is most preferable that both of them are p-phenylene groups.

In the general formula (1), $R_1$ and $R_2$ each independently represent a halogen atom, a nitro group, an amino group, an alkyl group having 1-20 carbon atoms, an alkoxy group having 1-20 carbon atoms, a cycloalkyl group having 6-20 carbon atoms, an aryl group having 6-20 carbon atoms, a cycloalkoxyl group having 6-20 carbon atoms, an aryloxy group having 6-20 carbon atoms or an aralkyl group having 6-20 carbon atoms.

Examples of the alkyl group having 1-20 carbon atoms include a methyl group, an ethyl group, a propyl group, an isopropyl group, a n-butyl group, a t-butyl group, an isobutyl group, a n-pentyl group, and an amyl group.

Examples of the alkoxy group having 1-20 carbon atoms include a methoxy group, an ethoxy group, a propoxy group, and an isopropoxy group.

Examples of the cycloalkyl group having 6-20 carbon atoms include a cyclohexyl group, an adamantyl group, a bicyclodecanyl group and a tricyclodecanyl group.

Examples of the aryl group having 6-20 carbon atoms include a phenyl group, a naphthyl group, and a 4-isopropylphenyl group.

Examples of the cycloalkoxyl group having 6-20 carbon atoms include cyclohexyloxy group.

Examples of the aryloxy group having 6-20 carbon atoms include a phenoxy group, a naphthoxy group, a chlorophenoxy group and a bromophenoxy group.

Examples of the aralkyl group having 6-20 carbon atoms include a benzyl group, a 2-methoxybenzyl group, a 3-methoxybenzyl group, a 4-methoxybenzyl group, 2-nitrobenzyl group, 3-nitrobenzyl group, 4-nitrobenzyl group, 2-chlorobenzyl group, 3-chlorobenzyl group, 4-chlorobenzyl group, 2-methylbenzyl group, 3-methylbenzyl group and 4-methylbenzyl group.

Preferable examples of $R_1$ and $R_2$ include a fluorine atom, an amino group, a methoxy group, a methyl group, a cyclohexyl group and a phenyl group.

"p" and "q" each independently represent an integer of 0-4, preferably 0-2. "X" represents a single bond or an organic group selected from the group consisting of the divalent organic groups represented by the following general formulas (1'):

[Chemical Formula 80]

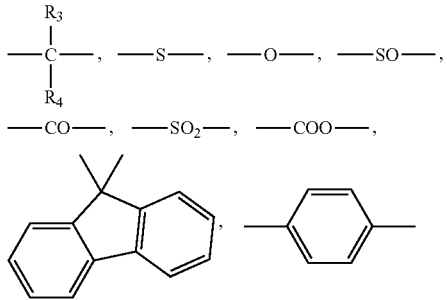

In the general formula (1'), $R_3$ and $R_4$ each independently represent a hydrogen atom, an alkyl group having 1-10 carbon atoms or an aryl group having 6-10 carbon atoms $R_3$ and $R_4$ may be linked with each other to form an aliphatic ring.

Examples of "X" include a single bond, —(CH$_2$)— and divalent organic groups represented by the following formulas:

[Chemical Formula 81]

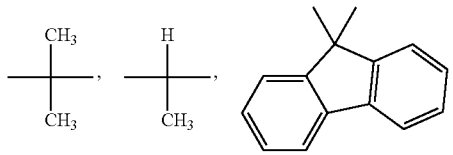

Examples of the above-mentioned carbonate-forming units include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-isopropylphenyl)butane, 2,2-bis(4-hydroxyphenyl)butane, 2,2-bis(4-hydroxyphenyl)octane, 2,2-bis(3-tert-butyl-4-hydroxyphenyl)propane, 2,2-bis(3-bromo-4-hydroxyphenyl)propane, bis(4-hydroxyphenyl) phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3-cyclohexyl-4-hydroxyphenyl)propane, 1,1-bis(3-cyclohexyl-4-hydroxyphenyl)cyclohexane, 2,2-bis(3,5-dimethyl-4-hydroxyphenyl)propane, 2,2-bis(4-hydroxy-3-phenylphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 1,1-bis(4-hydroxyphenyl)-3,3,5-trimethylcyclohexane, 4,4'-dihidroxydiphenylether, 4,4'-dihidroxybiphenyl, 9,9-bis(4-hydroxyphenyl)fluorene, 9,9-bis(4-hydroxy-3-methylphenyl)fluorene, 4,4'-dihydroxy-3,3'-dimethylphenylether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxy-3,3'-dimethyldiphenylsulfone, 4,4'-sulfonyldiphenol, 2,2'-diphenyl-4,4'-sulfonyldiphenol, 2,2'-dimethyl-4,4'-sulfonyldiphenol, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0$^{2.6}$]decane, 4,4'-(1,3-adamantanediyl)diphenol, 1,3-bis(4-hydroxyphenyl)-5,7-dimethyladamantane.

Among them, a structural unit derived from 2,2-bis(4-hydroxyphenyl)propane (=bisphenol A or "BPA") is preferable. The aromatic polycarbonate-forming unit of the present invention can be obtained by combining two or more of structural units derived from two or more of the above-mentioned various monomers (aromatic dihydroxy compounds) if necessary, for the purpose of controlling optical properties such as controlling a glass transition temperature, improving fluidity, improving the refractive index and reducing the birefringence.

The aromatic polycarbonate compound of the present invention has the weight average molecular weight (Mw) in the range from 5,000 to 60,000, more preferably in the range from 10,000 to 50,000, most preferably in the range from 10,000 to 40,000.

When using an aromatic polycarbonate compound having lower molecular weight outside the above range, in the case of reacting with an aliphatic diol compound, influence of the aliphatic diol compound on the properties of the polymer obtained might be serious. Though it may be possible to modify the polymer properties, useful properties that a polycarbonate originally has might be deteriorated.

When using an aromatic polycarbonate compound having higher molecular weight outside the above range, the concentration of active terminals might be declined and the effect of reacting with an aliphatic diol compound might be insufficient. In addition, since the aromatic polycarbonate compound itself has high viscosity, it might be necessary to carry out the production of polymer under the conditions of high temperature and high shearing for long time, which might be undesirable for obtaining a n aromatic polycarbonate resin having high quality.

It is preferable that at least a part of the above-mentioned aromatic polycarbonate compound is terminally end-capped by a phenyl group. The concentration of end-capped terminal groups (=terminal phenyl groups) is preferably 2 mol % or more, more preferably 2-20 mol %, most preferably 2-12 mol %. When the concentration of terminal phenyl groups is 2 mol % or more, the reaction with the aliphatic diol compound proceeds rapidly, and the specific effect of the present invention can be exhibit remarkably.

The aromatic polycarbonate compound of the present invention is obtained by the reaction between an aromatic dihydroxy compound such as BPA and a carbonate bond-forming compound such as diphenyl carbonate which contains a phenyl group derived from the aromatic dihydroxy compound and a phenyl group derived from the carbonate bond-forming compound in a polymer molecule. The terminal phenyl group of the aromatic polycarbonate compound of the present invention is the one derived from the carbonate bond-forming compound. The concentration of terminal phenyl groups of the present invention is the content of terminal phenyl groups based upon the total amount of all the structural units (mole) derived from the aromatic dihydroxy compound consisting the aromatic polycarbonate compound and all the terminal phenyl groups (mole) derived from the carbonate bond-forming compound (mol %).

The concentration of terminal hydroxy groups is preferably 1,500 ppm or less, more preferably 1,300 ppm or less, further preferably 1,000 ppm or less, most preferably 700 ppm or less. When the concentration of terminal hydroxy groups is within this range, the reaction with the aliphatic diol compound proceeds rapidly, and the specific effect of the present invention can be exhibit remarkably.

According to the present invention, "total amount of terminal groups" of the aromatic polycarbonate compound is calculated on the assumption that, for example, the total amount of the terminal groups of 0.5 mol of a polycarbonate having no branching structures or having a linear structure is 1 mol. The concentration of terminal phenyl groups and the concentration of terminal hydroxy groups can be analyzed by $^1$H-NMR analysis.

(2) Production of Aromatic Polycarbonate Compound

The aromatic polycarbonate compound of the present invention can be obtained by reacting an aromatic dihydroxy compound with a carbonate bond-forming compound. More precisely, the aromatic polycarbonate compound can be obtained by a known interfacial polymerization wherein an aromatic dihydroxy compound deriving the corresponding structure is reacted with phosgene in the presence of an acid binding agent, or a known transesterification method wherein an aromatic dihydroxy compound is reacted with diester carbonate in the presence of a basic catalyst.

The aromatic polycarbonate compound to be used for the present invention can be synthesized by interfacial polymerization or by melt polymerization. It also can be synthesized by solid-phase polymerization or thin-film polymerization. It also can be a recycled polycarbonate recovered from used products such as used disk molded products. These polycarbonates can be mixed with each other to use as the prepolymer before highly-polymerizing reaction. For example, a polycarbonate resin obtained by interfacial polymerization can be mixed with a polycarbonate resin obtained by meld polymerization. Or a polycarbonate resin obtained by melt polymerization or interfacial polymerization can be mixed with a recycled polycarbonate recovered from used disk molded products and the like.

Examples of the aromatic dihydroxy compounds to be used for producing the aromatic polycarbonate compound of the present invention include a compound represented by the following general formula (2):

[Chemical Formula 82]

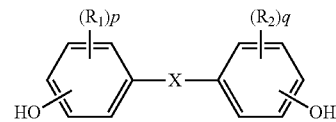

(2)

In the general formula (2), $R_1$-$R_2$, p, q and X are the same as in the general formula (1) respectively.

Examples of the above-mentioned aromatic dihydroxy compounds include bis(4-hydroxyphenyl)methane,
1,1-bis(4-hydroxyphenyl)ethane,
1,2-bis(4-hydroxyphenyl)ethane,
2,2-bis(4-hydroxyphenyl)propane,
2,2-bis(4-hydroxy-3-isopropylphenyl)butane,
2,2-bis(4-hydroxyphenyl)butane,
2,2-bis(4-hydroxyphenyl)octane,
2,2-bis(3-tert-butyl-4-hydroxyphenyl)propane,
2,2-bis(3-bromo-4-hydroxyphenyl)propane,
bis(4-hydroxyphenyl)phenylmethane,
1,1-bis(4-hydroxyphenyl)-1-phenylethane,
bis(4-hydroxyphenyl)diphenylmethane,
2,2-bis(4-hydroxy-3-methylphenyl)propane,
1,1-bis(4-hydroxy-3-tert-butylphenyl)propane,
2,2-bis(3-cyclohexyl-4-hydroxyphenyl)propane,
1,1-bis(3-cyclohexyl-4-hydroxyphenyl)cyclohexane,
2,2-bis(3,5-dimethyl-4-hydroxyphenyl)propane,
2,2-bis(4-hydroxy-3-phenylphenyl)propane,
2,2-bis(4-hydroxy-3-bromophenyl)propane,
2,2-bis(3,5-dibromo-4-hydroxyphenyl)propane,
1,1-bis(4-hydroxyphenyl)cyclopentane,
1,1-bis(4-hydroxyphenyl)cyclohexane,
2,2-bis(4-hydroxy-3-methoxyphenyl)propane,
1,1-bis(4-hydroxyphenyl)-3,3,5-trimethylcyclohexane,
4,4'-dihidroxydiphenylether,
4,4'-dihidroxybiphenyl,
9,9-bis(4-hydroxyphenyl)fluorene,
9,9-bis(4-hydroxy-3-methylphenyl)fluorene,
4,4'-dihydroxy-3,3'-dimethylphenylether,
4,4'-dihydroxyphenylsulfide,
4,4'-dihydroxy-3,3'-dimethyldiphenylsulfide,
4,4'-dihydroxydiphenylsulfoxide,
4,4'-dihydroxy-3,3'-dimethyldiphenylsulfoxide,
4,4'-dihydroxydiphenylsulfone,
4,4'-dihydroxy-3,3'-dimethyldiphenylsulfone,
4,4'-sulfonyldiphenol,
2,2'-diphenyl-4,4'-sulfonyldiphenol,
2,2'-dimethyl-4,4'-sulfonyldiphenol,
1,3-bis{2-(4-hydroxyphenyl)propyl}benzene,
1,4-bis{2-(4-hydroxyphenyl)propyl}benzene,
1,4-bis(4-hydroxyphenyl)cyclohexane,
1,3-bis(4-hydroxyphenyl)cyclohexane,
4,8-bis(4-hydroxyphenyl)tricyclo[5.2.1.0$^{2.6}$]decane,
4,4'-(1,3-adamantanediyl)diphenol,
1,3-bis(4-hydroxyphenyl)-5,7-dimethyladamantane.

Among them, a structural unit derived from 2,2-bis(4-hydroxyphenyl)propane (=bisphenol A or "BPA") is preferable because of the stability as a monomer and availability of a commercial product having a low impurity content.

The aromatic polycarbonate-forming unit of the present invention can be obtained by combining two or more of structural units derived from two or more of the above-mentioned various monomers (aromatic dihydroxy compounds) if necessary, for the purpose of controlling optical properties such as controlling a glass transition temperature, improving fluidity, improving the refractive index and reducing the birefringence.

It is possible to use dicarboxylic acid compound in combination with the above-mentioned aromatic dihydroxy compound to produce a polyestercarbonate. Examples of the dicarboxylic acid compounds include terephthalic acid, isophthalic acid, naphthalene dicarboxylic acid and 1,4-cyclohexane dicarboxylic acid. It is preferable that these dicarboxylic acid compounds are subjected to reaction in the form of acid chloride or ester.

When producing a polyestercarbonate, the dicarboxylic acid compound can be used in an amount of 0.5-45 mol %, more preferably 1-40 mol % based upon 100 mol % of the total amount of the dihydroxy components and dicarboxylic acid components.

In addition, it is possible to use multifunctional compound(s) having at least 3 functional groups in combination with the above-mentioned aromatic dihydroxy compound, if necessary. Preferable examples of the multifunctional compounds include a compound having a phenolic hydroxy group and/or a carboxyl group.

Examples of 3-functional compounds include
1,1,1-tris(4-hydroxyphenyl)ethane,
2,2',2''-tris(4-hydroxyphenyl)diisopropylbenzene,
α-methyl-α,α',α''-tris(4-hydroxyphenyl)-1,4-diethylbenzene,
α,α',α''-tris(4-hydroxyphenyl)-1,3,5-triisopropylbenzene,
phloroglucin, 4,6-dimethyl-2,4,6-tris(4-hydroxyphenyl)heptane 1,3,5-tris(4-hydroxyphenyl)benzene,
2,2-bis[4,4-(4,4'-dihydroxyphenyl)-cyclohexyl]propane,
trimellitic acid, 1,3,5-benzenetricarboxylic acid,
pyromellitic acid, trimethylolpropane, 1,2,5-pentatriol,
3,4-dihydroxybenzylalcohol, 1,2,6-hexatriol,
1,3,5-adamantanetriol.

Examples of 4 or more-functional compounds include purpurogallin, 2,3,4,4'-tetrahydroxybenzophenone, 2,3,4,4'-tetrahydroxydiphenylmethane, gallein, 2,3,3',4,4',5'-hexahydroxybenzophenone.

Among them, 1,1,1-tris(4-hydroxyphenyl)ethane is preferable because of the stability as a monomer and availability of a commercial product having a low impurity content.

In the case of producing an aromatic polycarbonate compound wherein a branching structure is introduced, a branching structure can be introduced in its molecular chain at a desirable quantity by using the above-mentioned multifunctional compounds as a branching agent at the time of reacting an aromatic dihydroxy compound and a carbonate bond-forming compound.

It is possible to vary the amount of the branching agent to be used or the amount of the branching structure to be introduced depending on the purpose for improvement such as blow moldability, drip preventing properties and flame retardant properties. It is desirable that the amount of the branching agent is preferably 0.01-1 mol %, more preferably 0.1-0.9 mol %, most preferably 0.2-0.8 mol % based upon the total amount of the carbonate structural unit represented by the above-mentioned general formula (1) in the aromatic polycarbonate compound (total mole number). Or it is desirable that the amount of the branching agent is preferably 0.01-1 mol %, more preferably 0.1-0.9 mol %, most preferably 0.2-0.8 mol % based upon the total amount of the entire aromatic dihydroxy compound to be used and the entire branching agent to be used (total mole number).

In the interfacial polymerization, examples of carbonate bond-forming compounds include carbonyl halides such as phosgene and haloformates.

The reaction is usually carried out in the presence of an acid binding agent and a solvent. Examples of the acid binding agents include alkali metal hydroxide such as sodium hydroxide and potassium hydroxide and amines such as pyridine. Examples of solvents include halogenated hydrocarbon such as methylene chloride and chlorobenzene. In addition, a catalyst such as tertiary amines or quaternary ammonium salts can be used for accelerating the reaction. The reaction temperature is usually in the range from 0° C. to 40° C. and the reaction time is usually in the range from several minutes to 5 hours.

In the case of interfacial polymerization, a terminal terminating agent can be used in order to achieve the desired amount of the end-capped terminal groups or the desired concentration of the terminal phenyl groups at the time of producing the aromatic polycarbonate compound. Examples of the terminal terminating agents include p-tert-butyl phenol, phenol, p-cumylphenol and long-chain alkyl substituted phenol. The amount of the terminal terminating agent to be used can be determined properly according to the intended content of terminal groups of the aromatic polycarbonate compound, the reaction apparatus to be used, reaction conditions or the like.

In the case of melt polymerization, diester carbonate is used as a carbonate bond-forming compound. Examples of diester carbonates include a compound represented by the following general formula (3):

[Chemical Formula 83]

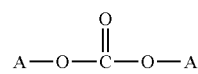

(3)

In the above general formula (3), "A" represents a monovalent linear, branched or ringed hydrocarbon group having 1-10 carbon atoms which may be substituted. The two "A"s may be the same or different with each other.

Examples of the diester carbonate include aromatic diester carbonates such as diphenyl carbonate, ditolyl carbonate, bis(2-chlorophenyl)carbonate, m-cresyl carbonate, dinaphthyl carbonate and bis(4-phenylphenyl)carbonate. Other diester carbonates such as dimethyl carbonate, diethyl carbonate, dibutyl carbonate and dicyclohexyl carbonate can be used if necessary. Among them, it is preferable to use diphenyl carbonate from a viewpoint of reactivity, stability against coloring of the resin thus obtained and cost.

In the case of melt polymerization, end-capped terminal groups can be introduced by using diester carbonate such as diphenyl carbonate in an amount excess to that of the aromatic dihydroxy compound at the time of producing the aromatic polycarbonate compound. The aromatic polycarbonate compound of the present invention is preferably produced by reacting the aromatic dihydroxy compound and diester carbonate in the presence of a transesterification catalyst at a rate of [diester carbonate]/[aromatic dihydroxy compound]=1.0-1.3 (molar ratio). That is, diester carbonate is used preferably in an amount of 1.00 to 1.30 mole, more preferably 1.02 to 1.20 mole per mole of the aromatic dihydroxy compound.

The melt polymerization using diester carbonate as a carbonate bond-forming compound is carried out by stirring the aromatic dihydroxy compound with diester carbonate at a predetermined rate on heating under an inert gas atmosphere and then distilling the produced alcohols or phenols away.

While the reaction temperature is depending on the boiling point of alcohols or phenols thus produced, it is usually in the range from 120° C. to 350° C. The reaction is carried out under reduced pressure from the beginning and is completed by continuously distilling the produced alcohols or phenols. Transesterification catalysts such as basic compound catalysts which are commonly used can be used in order to accelerate the reaction.

Examples of the basic compound catalysts include alkali metal compounds and/or alkali earth metal compounds, nitrogen-containing compounds and boron-containing compounds.

Preferable examples of alkali metal compounds and/or alkali earth metal compounds include organic acid salts, inorganic salts, oxide, hydroxide, hydride, alkoxide, quaternary ammonium hydroxide and salts thereof and amines of alkali metals and alkali earth metals. These compounds can be used each independently or two or more of them can be used in combination with each other.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium gluconate, sodium boron hydride, sodium phenylborate, sodium benzoate, potassium benzoate, cesium benzoate, lithium benzoate, disodium hydrogenphosphate, dipotassium hydrogenphosphate, dilithium hydrogenphosphate, disodium phenylphosphate, a disodium salt of bisphenol A, a dipotassium salt of bisphenol A, a dicesium salt of bisphenol A and a dilithium salt of bisphenol A, a sodium salt of phenol, a potassium salt of phenol, a cesium salt of phenol, a lithium salt of phenol, $Ph_4BNa$, $N(CHCO_2Na)_3$, and $PhNa_2PO_4$.

Examples of alkali earth metal compounds include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenylphosphate.

Examples of nitrogen-containing compounds include base such as quaternary ammonium hydroxides containing alkyl groups and/or aryl groups such as tetramethyl ammonium hydroxide, tetraethyl ammonium hydroxide, tetrapropyl ammonium hydroxide, tetrabutyl ammonium hydroxide and trimethylbenzyl ammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzoimidazole; and a base or a basic salt such as ammonia, tetramethyl ammonium borohydride, tetrabutyl ammonium borohydride, tetrabutyl ammonium tetraphenylborate and tetraphenyl ammonium tetraphenylborate, or basic salts thereof.

Examples of boron-containing compounds include $Et_4PB(OH)_4$ and $Ph_4PBPh_4$.

Regarding the transesterification catalyst, salts of zinc, tin, zirconium or lead can be preferably used. They can be used each independently or two or more of them can be used in combination with each other.

Examples of the transesterification catalysts include zinc acetate, zinc benzoate, zinc 2-ethylhexanoate, tin chloride (II), tin chloride (IV), tin acetate (II), tin acetate (IV), dibutyltin dilaurate, dibutyltin oxide, dibutyltin dimethoxide, zirconium acetylacetonate, zirconium oxyacetate, zirconium tetrabutoxide, lead acetate (II) and lead acetate (IV).

The above catalysts can be used in an amount of preferably $1 \times 10^{-9}$ to $1 \times 10^{-3}$ mole, more preferably $1 \times 10^{-7}$ to $1 \times 10^{-5}$ mole per mole of the total amount of dihydroxy compounds.

The reaction temperature of melt polymerization is preferably in the range of 180° C. to 320° C., more preferably 180° C. to 310° C., most preferably 180° C. to 300° C. The degree of pressure reduction is preferably 20 kPaA (150 torr) or less, more preferably 13 kPaA (100 torr) or less, further preferably 1.3 kPaA (10 torr) or less, most preferably 0.67-0.013 kPaA (5-0.1 torr).

For example, the reaction begins under the conditions of around 20 kPaA (150 torr) and 180° C., and then, gradually the temperature is elevated and the pressure is reduced to a high-vacuum state, and finally the pressure is reduced to 0.13 kPaA (1 torr) or less, and the temperature is elevated to 260° C.–300° C., more preferably 260° C.–280° C. Rapid increase in temperature and/or rapid pressure reduction to high-vacuum state is not preferable because the carbonate bond-forming compound such as diphenyl carbonate itself is distilled away which makes it difficult to keep the appropriate reaction molar ratio, which might cause unable to obtain a desired polymer.

The structural viscosity index (N-value) of the aromatic polycarbonate compound of the present invention can be 1.3 or less depending on the intended use.

In the case of producing a polycarbonate resin having a high molecular weight, high fluidity with no branching structures or with a low N-value, the N-value of the aromatic polycarbonate compound is preferably 1.3 or less, more preferably 1.28 or less, most preferably 1.25 or less.

The structural viscosity index (N-value) is an index of a branching degree of an aromatic polycarbonate resin and is represented by the following mathematical formula (1):

[Mathematical Formula 8]

$$N\text{-value}=(\log(Q160)-\log(Q10))/(\log 160-\log 10) \quad (1)$$

In the above mathematical formula (1), Q160 represents a melting fluid volume per unit time (ml/sec) measured under the conditions of 280° C. and 160 kg load.

Q10 represents a melting fluid volume per unit time (ml/sec) measured under the conditions of 280° C. and 10 kg load.

In the present invention, it is measured by using a measuring apparatus manufactured by Shimadzu Corporation, trade name "CFT-500D". The stroke is 7.0-10.0 mm. The nozzle size is 1 mm(diameter)×10 mm(length).

When the aromatic polycarbonate compound of the present invention has the low N-value of 1,3 or less, the content of a branching structure is low and the content of a linear or straight chain structure is high.

In the case of conventional polycarbonate resins having the same Mw, it has a tendency that the fluidity becomes high and the Q-value becomes high when the content of a branching structure or the N-value is increased. The polycarbonate copolymer highly polymerized by using the aromatic polycarbonate compound having specific features of the present invention to react with an aliphatic diol compound, on the other hand, can achieve high fluidity or high Q-value while keeping the N-value low.

Meanwhile, the structural viscosity index (N-value) of the aromatic polycarbonate compound of the present invention can also be higher than 1.3 depending on the intended use. By using a predetermined amount of a branching agent to introduce a branching structure, an aromatic polycarbonate compound having a branching structure with the N-value of higher than 1.3, preferably 1.31-2.0, more preferably 1.31-1.7 can be obtained.

The above-mentioned aromatic polycarbonate compound of the present invention having a branching structure introduced by using a predetermined amount of a branching agent can be used as a prepolymer to be subjected to a transesterification reaction with a specific aliphatic diol compound under reduced pressure, which enables to obtain a highly polymerized branched aromatic polycarbonate resin having an intended branching degree under moderate conditions in a short time.

(3) Aromatic Polycarbonate Prepolymer Material

The aromatic polycarbonate compound of the present invention can be used as an aromatic polycarbonate prepolymer for the process for producing a highly polymerized aromatic polycarbonate resin comprising a highly polymerizing process wherein the aromatic polycarbonate prepolymer is reacted with an aliphatic diol compound through a transesterification reaction in the presence of a transesterification catalyst under reduced pressure.

That is, the aromatic polycarbonate prepolymer material containing the end-capped aromatic polycarbonate compound (=prepolymer) of the present invention as a main component is reacted with an aliphatic diol compound (=a linking agent) through a transesterification reaction to replace the end-capped terminal groups derived from the carbonate bond-forming compound present in the aromatic polycarbonate prepolymer (e.g. a terminal phenyl group) by an alcoholic hydroxy group, thereby promoting the linking reaction among the aromatic polycarbonate prepolymer molecules to increase the molecular weight to achieve high molecular weight rapidly under moderate conditions.

The prepolymer material for producing a highly polymerized aromatic polycarbonate resin which contains the aromatic polycarbonate prepolymer as a main component and is used for the above-mentioned use also contains residual carbonate monomer in an amount of preferably 3000 ppm or less, more preferably 2000 ppm or less, most preferably 1000 ppm or less.

The method for reducing the content of residual carbonate monomer to 3000 ppm or less is not particularly limited. Examples of the method include a method of controlling a charged amount of diester carbonate at the time of producing, for example, controlling the amount to be 1.3 mole or less, more preferably 1.2 mole or less per mole of the total amount of the aromatic dihydroxy compound, and a method of regulating the reaction temperature (for example, 180° C. to 320° C.) or the degree of pressure reduction (for example, 150 torr or less).

In the case of using the prepolymer material for producing a highly polymerized aromatic polycarbonate resin having the structural viscosity index (N-value) of 1.25 or less, since the content of a branching structure in the prepolymer is low and the content of a linear or straight chain structure is high, an aromatic polycarbonate resin or a polycarbonate copolymer having high molecular weight and high fluidity (high Q-value) while keeping the N-value low can be obtained by reacting the prepolymer material with an aliphatic diol compound to be highly polymerized.

The N-value of the highly polymerized aromatic polycarbonate resin thus obtained is preferably 1.3 or less, more preferably 1.28 or less, most preferably 1.25 or less. There is no large fluctuation in N-value compared to the aromatic polycarbonate compound (=prepolymer).

In the case of using a aromatic polycarbonate compound (=prepolymer) having a branching structure with the N-value of higher than 1.25, a highly polymerized branched aromatic polycarbonate resin having an intended branching degree corresponding to the amount of the branching agent can be obtained under moderate conditions in a short time, by reacting with the above-mentioned aliphatic diol compound through a transesterification reaction. In this case, the branching degree (N-value) of the branched aromatic polycarbonate resin thus obtained is preferably 1.31-2.2, more preferably 1.31-2.0. most preferably 1.31-1.9.

EXAMPLES

The present invention will be described in more detail below, referring to examples, which are not intended to limit the scope of the present invention.

The measurement values of the examples and comparative examples below were measured by using the following methods and/or devices:

1) Weight-average molecular weight in terms of polystyrene (Mw):

Measured by GPC using chloroform as a developing solvent, an analytical curve was prepared using a standard polystyrene having a known molecular weight (molecular weight distribution=1). Based upon the analytical curve, Mw was calculated from the retention time of GPC.

2) Glass transition temperature (Tg):

Measured by differential scanning calorimeter (DSC).

3) Total amount of terminal groups of polymer:

0.25 g of a polymer sample was dissolved into 5 ml of deuterated chloroform and then the amount of the terminals was measured at 23° C. by using a nuclear magnetic resonance 1H-NMR spectrometer, trade name "LA-500", manufactured by JEOL Ltd. The result was shown as the number of moles per ton of polymer.

4) Concentration of terminal hydroxy groups (ppm):

Measured by UV/visible spectroscopy (546 nm) of a complex formed from the polymer and titanium tetrachloride in a methylene chloride solution, or by observing terminal hydroxy groups from the result of $^1$H-NMR analysis.

5) Concentration of terminal phenyl groups (mol %):

Calculated by the following mathematical formula from the result of $^1$H-NMR analysis:

$$\text{Conc. Terminal Ph (mol \%)} = (X \div 2)/[(X \div 2)+(Y \div 8)] \times 100 \quad \text{[Mathematical Formula 9]}$$

Conc. Terminal Ph: Concentration of terminal phenyl groups

X: H-area ratio of terminal phenyl groups

Y: H-area ratio of phenyl groups

6) Color of polymer (YI value):

6 g of a polymer sample was dissolved into 60 ml of methylene chloride and then YI value was measured in a cell having an optical path length of 6 cm by using a spectroscopy colorimeter manufactured by NIPPON DENSHOKU INDUSTRIES CO., LTD, trade name "SE-2000".

7) Fluidity (Q-Value):

Q-value represents an outflow rate of a molten resin (ml/sec), which was evaluated by a molten fluid volume per unit time measured under the conditions of 280° C. and 160 kg load after drying at 130° C. for 5 hours by using a Koka type flow tester manufactured by Shimadzu Corporation, trade name "CFT-500D".

8) N-value:

A sample of aromatic polycarbonate dried at 130° C. for 5 hours was subjected to a measurement using a Koka type flow tester manufactured by Shimadzu Corporation, trade name "CFT-500D". "Q160" was evaluated with the sample by a molten fluid volume per unit time measured under the conditions of 280° C. and 160 kg, and "Q10" was evaluated in the same manner by a molten fluid volume per unit time measured under the conditions of 280° C. and 10 kg. N-value was calculated by the following mathematical formula (1) using "Q160" and "Q10":

[Mathematical Formula 5]

$$N\text{-value}=(\log(Q160)-\log(Q10))/(\log 160-\log 10) \quad (1)$$

9) Rate of polymer molecules having "i"=1:

The rate of polymer molecules wherein "i" which represents a chain length of a structural unit derived from an aliphatic diol compound is 1 ("i"=1) was measured by $^1$H-NMR analysis of a polycarbonate copolymer obtained.

10) Amount of residual carbonate monomer (DPC) and residual phenol (PhOH):

Quantative determination was carried out by the interior standard method using gel permeation chromatography (UV detector) or gas chromatography.

11) Content of cyclic carbonate in a polymer:

10 g of a polymer sample was dissolved in 100 ml of dichloromethane and was dropped into 1000 ml of methanol. The precipitate was separated by filtration to remove solvent in the filtrate. The solid thus obtained was analyzed by GC-MS under the following conditions. The minimum detectable quantity under the conditions of measurement was 0.0005 ppm.

Conditions of GC-MS measurement:
Measurement Device: Agilent HP6890/5973 MSD
Column: capillary column DB-5MS, 30 m×0.25 mm I.D., (Film thickness=0.5 μm)
Temperature Rising Conditions: 50° C. (5 min hold)-300° C. (15 min hold), 10° C./min
Inlet Temperature: 300° C., Input: 1.0 μl (Split ratio; 25)
Ionization Method: EI method
Carrier Gas: He, 1.0 ml/min
Aux Temperature: 300° C.
Mass Scan Range: 33-700
Solvent: Chloroform for HPLC
Internal Standard Material: 1,3,5-trimethylolphenol 12) Heat retention Test:

1 g of a sample polymer was charged into a test tube and was dried for 2 hours by a block heater at 120° C. in a nitrogen-substituted glove box with the oxygen concentration of 0.0%. Subsequently, heat retention was loaded for 50 minutes in said glove box by a block heater at 360° C. Measurements of the molecular weight (Mw) retention rate (%) and the amount of change in YI-value were conducted before and after the heat retention test.

This test was intended to give thermal history that is a possible maximum level of a usual molding temperature for a molding process of polycarbonate such as high-precision molding wherein keeping the melt viscosity of polymer lower is required. The long retention time of 50 minutes was established considering the possible longest retention time including a trouble of apparatuses or the like at an actual molding site.

13) Color of polymer (YI-value) before and after the heat retention test:

1 g of a sample polymer was dissolved into 60 ml of methylene chloride and then YI value was measured in a cell having an optical path length of 6 cm by using a spectroscopy colorimeter manufactured by NIPPON DENSHOKU INDUSTRIES CO., LTD, trade name "SE-2000".

Regarding the qualities of the aliphatic diol compounds used in the Examples and Comparative Examples, the chemical purity was 98-99%, the content of chlorine was 0.8 ppm or less, and the contents of alkali metals, alkali earth metals, titanium and heavy metals (iron, nickel, chromium, zinc, copper, manganese, cobalt, molybdenum, tin) were 1 ppm or less respectively.

Regarding the qualities of the aromatic dihydroxy compounds and diester carbonate used in the Examples and Comparative Examples, the chemical purity was 99% or higher, the content of chlorine was 0.8 ppm or less, and the contents of alkali metals, alkali earth metals, titanium and heavy metals (iron, nickel, chromium, zinc, copper, manganese, cobalt, molybdenum, tin) were 1 ppm or less respectively.

In the examples below, the prepolymer was abbreviated to "PP", a hydroxy group was abbreviated to "OH", and a phenyl group was abbreviated to "Ph" in some cases.

Example 1

10,000 g (43.80 mol) of 2,2-bis(4-hydroxyphenyl)propane, 10,581 g (49.39 mol) of diphenyl carbonate and 1 μmol/mol of sodium hydrogen carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis (4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 1 hour.

Then, while the internal temperature was raised to 280° C. taking 20 minutes and the degree of pressure reduction was kept at 0.13 kPaA (1 torr) or less, 393 g (0.90 mol) of melt 9,9-bis[4-(2-hydroxyethoxy)phenyl]fluorene, hereinafter "BPEF" which was the aliphatic diol compound, was charged therein and the transesterification reaction was continued for 30 minutes with stirring and kneading to obtain a polycarbonate copolymer having the weight average molecular weight (Mw) of 55,000.

Figure 2:
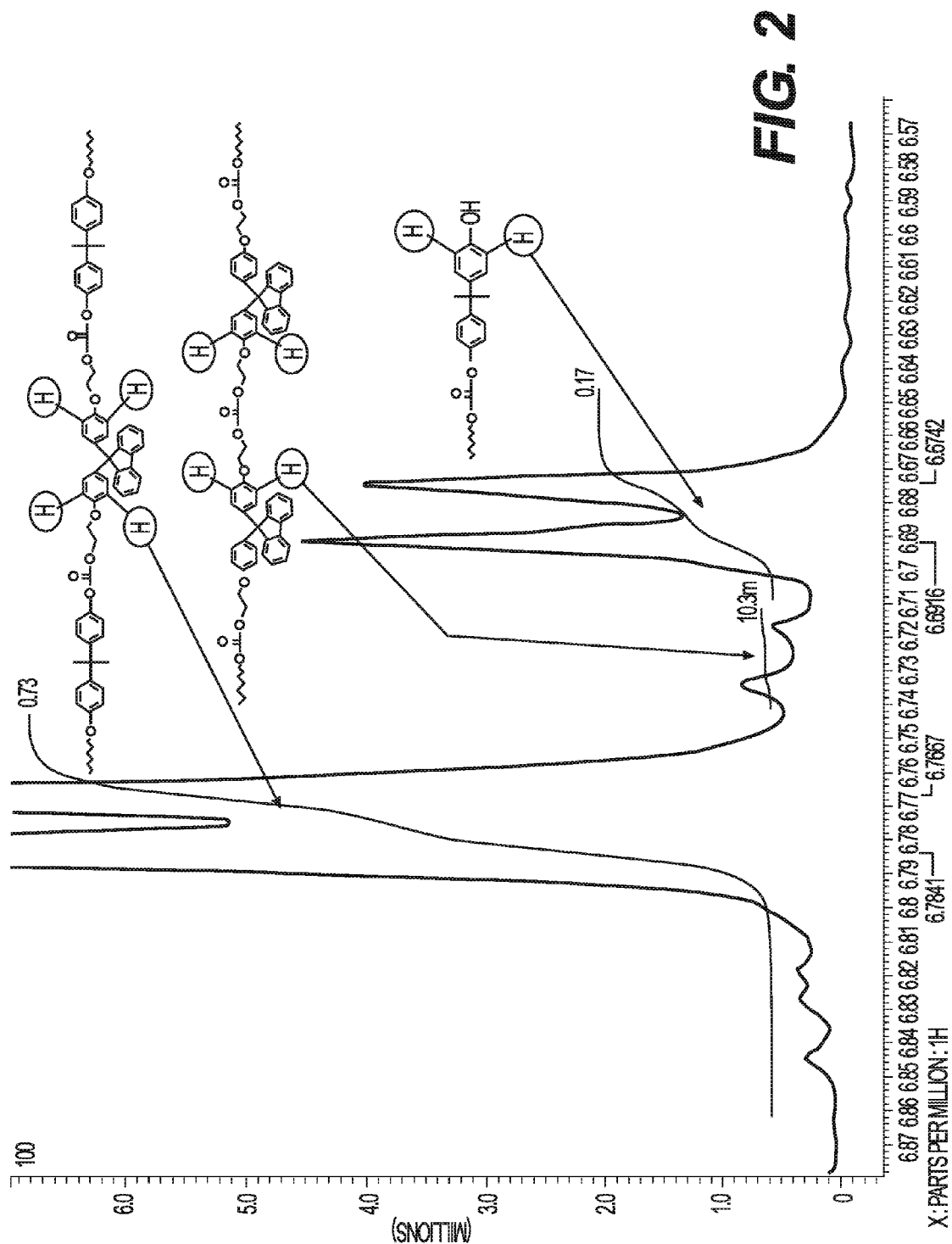
FIG. 2 shows a $^1$H-NMR chart (B) of the polycarbonate copolymer obtained by Example 1.

The results of $^1$H-NMR analysis of the polycarbonate copolymer thus obtained were shown in FIG. 1 ($^1$H-NMR chart (A)) and in FIG. 2 ($^1$H-NMR chart (B)). The $^1$H-NMR chart (A) shows a magnified figure of the peaks derived from the aliphatic diol compound corresponding to the methylene chain of BPEF, according to which the peak of the structural units derived from the aliphatic diol compound was recognized. The methylene chain of BPEF monomer has signals near 3.9 ppm, but it was obviously shifted to a different position after the reaction with an aromatic dihydroxy compound. The peak at 4.8 ppm is that of an aromatic OH group.

From these peaks, the formation of a structure formed of an aromatic polycarbonate chain and an aliphatic diol part was identified. The two strongest peaks show a structure formed by linking the aromatic polycarbonate chain with BPEF. The two week peaks next thereto show a structure formed by linking BPEF with each other (block copolymerization).

According to the FIG. 2, the peak derived from a phenyl group of BPEF was recognized, whereby the structure formed of an aromatic polycarbonate chain and an aliphatic diol part was also identified.

Therefore, it was recognized that the polycarbonate copolymer thus obtained was formed mainly of a polymer molecule having a structure derived from the aliphatic diol compound with the chain length of 1 ("i"=1) in the above-mentioned general formula (III), which was a structure consisting of an aromatic polycarbonate chain and one structural unit derived from the aliphatic diol compound. According to the result of the $^1$H-NMR analysis, the content of the polymer molecules having the structure with "i"=1 was 98 mol % based upon the total amount of the polycarbonate copolymer thus obtained.

The content of the structure derived from the aliphatic diol compound corresponding to the structure represented by the general formula (I) was 1.7 mol % and the content of the structure derived from the aromatic dihydroxy compound corresponding to the structure represented by the general formula (II) was 98 mol %, based upon the total amount of the polycarbonate copolymer thus obtained. Q160-value was 0.17 ml/s which satisfied the above-mentioned mathematical formula (2) representing the relationship of Mw and Q-value. The structural viscosity index (N-value) was 1.21.

The properties of the polycarbonate copolymer thus obtained were shown in Table 1. In Table 1, flexural modulus (GPa) and flexural strength (MPa) were measured in accordance with JIS-K7171. Tensile elastic modulus (GPa), tensile yield strength (MPa), tensile yield elongation (%) and tensile fracture strength (MPa) were measured in accordance with JIS-K7113. Izod impact strength (kg·cm/cm) was measured in accordance with JIS-K7110.

Examples 2-3

The experiments were carried out in the same manner as in Example 1 except for using the aliphatic diol compounds and the amount used as shown in Table 1.

Example of Production of Prepolymer 1; PP-A 10,000 g (43.80 mol) of 2,2-bis(4-hydroxyphenyl)propane, 10,588 g (49.39 mol) of diphenyl carbonate and 1 μmol/mol of sodium hydrogen carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis(4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 1 hour to obtain a polycarbonate prepolymer having the weight average molecular weight (Mw) of 24,000, hereinafter "PP-A".

The concentration of hydroxy groups (ppm) and the concentration of terminal phenyl groups (mol %) of the polycarbonate prepolymer thus obtained were shown in Table 2.

In Table 2, the concentration of hydroxy groups means the concentration of all the OH groups contained in the polymer which was calculated by $^1$H-NMR analysis. In Table 2, the concentration of terminal phenyl groups means the concentration of the terminal phenyl groups based on all the phenylene groups and phenyl groups in phenyl terminals including the phenyl groups substituted by hydroxy groups.

Example of Production of Prepolymer 2; PP-B 9,995 g (43.78 mol) of 2,2-bis(4-hydroxyphenyl)propane, 10,321 g (48.18 mol) of diphenyl carbonate and 1 μmol/mol of sodium hydrogen carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis(4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 1 hour to obtain a polycarbonate prepolymer having the weight average molecular weight (Mw) of 33,000, hereinafter "PP-B".

The concentration of hydroxy groups (ppm) and the concentration of terminal phenyl groups (mol %) of the polycarbonate prepolymer thus obtained were shown in Table 2. In Table 2, the concentration of terminal phenyl groups means the concentration of the terminal phenyl groups based on all the phenylene groups and phenyl groups in phenyl terminals which was calculated by $^1$H-NMR analysis.

Example of Production of Prepolymer 3; PP-C 125.00 g (0.548 mol) of 2,2-bis(4-hydroxyphenyl)propane and 0.3 g of hydrosulfite were dissolved into 730 mL of 8 mass %-sodium hydroxide aqueous solution. 300 mL of dichloromethane was added therein and, keeping 15° C. with stirring, 70.50 g (0.713 mol) of phosgene was added therein by blowing.

After the completion of blowing phosgene, 5.06 g (0.055 mol) of phenol was added as a molecular weight adjuster, and 130 mL of 8 mass %-sodium hydroxide aqueous solution was added additionally, and then the reaction mixture was stirred strongly to make an emulsion.

Subsequently, 0.60 mL of triethylamine was added therein and the reaction mixture was stirred at 20° C.-25° C. for about 1 hour to carry out polymerization.

After completion of the polymerization, the reaction mixture was separated into an aqueous phase and an organic phase. The organic phase was neutralized by phosphoric acid and then was washed with water.

The polymer solution thus obtained was dropped into warm water keeping at 50° C. to remove the solvent by evaporation, and a solid product thus obtained was crushed into pieces to obtain a white powdery precipitate. The precipitate thus obtained was filtrated and was dried at 120° C. for 24 hours to obtain a polymer power, hereinafter "PP-C".

The concentration of hydroxy groups (ppm) and the concentration of terminal phenyl groups (mol %) of the polycarbonate prepolymer thus obtained were shown in

Example 4

10 g of the aromatic polycarbonate prepolymer PP-A which was obtained by the above-mentioned Example of Production of Prepolymer 1 was charged into a four-neck flask of 300 cc equipped with a stirrer and a distiller and was heated and melted under vacuum at 280° C.

Subsequently, 0.33 g of 9,9-bis[4-(2-hydroxyethoxy)phenyl]fluorene (BPEF) which was the aliphatic diol compound was charged therein, and the mixture was stirred and kneaded for 60 minutes at a jacket temperature of 280° C. under reduced pressure of 0.04 kPaA (0.3 torr) to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 37,000, Q-value of 0.400, the content of the polymer molecules having the structure with "i"=1 (which was the rate of the aliphatic diol skeleton having "i"=1) of 96 mol %, and N-value of 1.22. The results were shown in Table 3.

Example 5-15

The experiments were carried out in the same manner as in Example 4 except for using the aromatic polycarbonate prepolymers and the aliphatic diol compounds as shown in Table 3. In the case of using PP-C, 1 μmol/mol of sodium hydrogen carbonate was added as a catalyst, wherein the amount of catalyst was calculated as the number of moles based upon the amount of 2,2-bis(4-hydroxyphenyl)propane unit. The results were shown in Table 3.

Comparative Example 1

10,000 g (43.80 mol) of 2,2-bis(4-hydroxyphenyl)propane, 10,000 g (46.68 mol) of diphenyl carbonate and 1 μmol/mol of sodium hydrogen carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis (4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 7 hour to obtain about kg of an aromatic polycarbonate having the weight average molecular weight (Mw) of 63,000, the concentration of terminal hydroxy groups of 700 ppm. The properties of the polycarbonate thus obtained were shown in Table 1.

Comparative Example 2

3634 g (15.92 mol) of 2,2-bis(4-hydroxyphenyl)propane and 30 g of hydrosulfite were dissolved into 40 L of 5 mass %-sodium hydroxide aqueous solution. 17 L of dichloromethane was added therein and, keeping 15° C. with stirring, 2100 g (21.23 mol) of phosgene was added therein by blowing.

After the completion of blowing phosgene, 99.91 g (0.67 mol) of p-tert-butylphenol was added as a molecular weight adjuster, and 10 L of 5 mass %-sodium hydroxide aqueous solution and 20 L of dichloromethane were added additionally, and then the reaction mixture was stirred strongly to make an emulsion.

Subsequently, 20 mL of triethylamine was added therein and the reaction mixture was stirred at 20° C.-25° C. for about 1 hour to carry out polymerization.

After completion of the polymerization, the reaction mixture was separated into an aqueous phase and an organic phase. The organic phase was neutralized by phosphoric acid and then was washed with water.

The polymer solution thus obtained was dropped into warm water keeping at 50° C. to remove the solvent by evaporation, and a solid product thus obtained was crushed into pieces to obtain a white powdery precipitate. The precipitate thus obtained was filtrated and was dried at 120° C. for 24 hours to obtain a polymer power.

Comparative Example 3

The experiment was carried out in the same manner as in Comparative Example 2 except for changing the amount of p-t-butylphenol as 78.86 g (0.52 mol). The properties of the polycarbonate thus obtained were shown in Table 1.

Comparative Example 4

50.96 g (0.2232 mol) of 2,2-bis(4-hydroxyphenyl)propane, 49.04 g (0.229 mol) of diphenyl carbonate and 1 μmol/mol of sodium hydrogen carbonate as a catalyst were charged into a four-neck flask of 300 cc equipped with a stirrer and a distiller, and was heated at 180° C. in a nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and, keeping the above temperature, the transesterification reaction was carried out for 40 minutes.

Then, the temperature was raised to 225° C. at a rate of 75° C./hr and the temperature was kept as above for 10 minutes.

Subsequently, the temperature was raised to 260° C. at a rate of 65° C./hr and, the pressure was reduced to 0.13 kPaA (1 torr) or less taking 1 hour, and then the pressure and temperature were kept as above for additionally 6 hours to obtain 30 g of aromatic polycarbonate having the weight average molecular weight (Mw) of 44,000.

The properties of the polycarbonate thus obtained were shown in Table 4.

Comparative Example 5

50.98 g (0.2233 mol) of 2,2-bis(4-hydroxyphenyl)propane, 49.04 g (0.229 mol) of diphenyl carbonate and 1 μmol/mol of sodium hydrogen carbonate as a catalyst were charged into a four-neck flask of 300 cc equipped with a stirrer and a distiller, and was heated at 180° C. in a nitrogen atmosphere with stirring for 30 minutes.

Subsequently, the degree of pressure reduction was adjusted to 20 kPaA (150 torr) and simultaneously the temperature was raised to 200° C. at a rate of 60'C/hr and, keeping the above temperature, the transesterification reaction was carried out for 40 minutes.

Then, the temperature was raised to 225° C. at a rate of 75° C./hr and the temperature was kept as above for 10 minutes.

Subsequently, the temperature was raised to 260° C. at a rate of 65° C./hr and, the pressure was reduced to 0.13 kPaA (1 torr) or less taking 1 hour, and then the pressure and temperature were kept as above for additionally 7 hours to obtain 30 g of aromatic polycarbonate having the weight average molecular weight (Mw) of 50,000. The properties of the polycarbonate thus obtained were shown in Table 4.

TABLE 1

|  | Example 1 | Example 2 | Example 3 | Comparative Example 1 | Comparative Example 2 | Comparative Example 3 |
| --- | --- | --- | --- | --- | --- | --- |
| BPA(g) | 10000 | 10000 | 10000 | 10000 |  |  |
| BPA(mol) | 43.80 | 43.80 | 43.80 | 43.80 |  |  |
| DPC(g) | 10581 | 10560 | 10200 | 10000 |  |  |
| DPC(mol) | 49.39 | 49.30 | 47.61 | 46.68 |  |  |
| DPC/BPA Molar Ratio | 1.13 | 1.13 | 1.09 | 1.07 |  |  |
| LinkingAgent | BPEF | BPA-2EO | PCPDM | — |  |  |
| Formula Weight of Linking Agent | 439 | 316 | 262 | — |  |  |
| Amount of Linking Agent (g) | 396 | 327 | 257 | — |  |  |
| Amount of Linking Agent (mol) | 0.90 | 1.03 | 0.98 | — |  |  |
| Mw | 55000 | 68000 | 48000 | 63000 | 46000 | 57000 |
| YI-value | 1.0 | 1.6 | 1.0 | 2.1 | 1.3 | 1.2 |
| Tg (° C.) | 153 | 153 | 152 | 152 | 155 | 155 |
| Flexural Modulus (GPa) | 2.3 | 2.3 | 2.2 | 2.2 | 2.3 | 2.3 |
| Flexural Strength (MPa) | 91 | 91 | 91 | 87 | 86 | 87 |
| Tensile Elastic Modulus (GPa) | 1.7 | 1.6 | 1.7 | 1.6 | 1.7 | 1.7 |
| Tensile Yield Strength (MPa) | 64 | 64 | 63 | 63 | 61 | 62 |
| Tensile Yield Elongation (%) | 5.9 | 6.0 | 6.0 | 6.2 | 5.9 | 6.0 |
| Tensile Fracture Strength (MPa) | 71 | 71 | 71 | 70 | 71 | 73 |
| Izod Impact Strength (kg · cm/cm) | 93 | 95 | 96 | 97 | 91 | 99 |
| Q-value [ml/s] 160 kg | 0.1700 | 0.0450 | 0.1414 | 0.0377 | 0.0995 | 0.0315 |
| N-value | 1.21 | 1.23 | 1.13 | 1.31 | 1.20 | 1.15 |
| Ratio of Polymer Molecules having "i" = 1 (mol %) | 98 | 97 | 100 |  |  |  |
| Ratio of Structure Represented by Formula (I) (mol %) | 1.7 | 2.1 | 1.6 |  |  |  |

TABLE 2

|  | PP-A | PP-B | PP-C |
| --- | --- | --- | --- |
| BPA (g) | 10000 | 9995.1 |  |
| BPA (mol) | 43.80 | 43.78 |  |
| DPC (g) | 10558 | 10321 |  |
| DPC (mol) | 49.29 | 48.18 |  |
| DPC/BPA Molar Ratio | 1.13 | 1.10 |  |
| Mw | 24000 | 33000 | 22000 |
| OH Concentration (ppm) | 181 | 73 | 73 |
| Terminal Ph Concentration (mol %) | 7.3 | 5.1 | 7.8 |

OH: Hydroxyl Group
Ph: Phenyl Group

TABLE 3

|  | Example 4 | Example 5 | Example 6 | Example 7 | Example 8 | Example 9 |
| --- | --- | --- | --- | --- | --- | --- |
| Prepolymer Used | PP-A | PP-B | PP-C | PP-A | PP-B | PP-C |
| Diol | BPEF | BPEF | BPEF | BPA-2EO | BPA-2EO | BPA-2EO |
| Formula Weight of Diol | 439 | 439 | 439 | 316 | 316 | 316 |
| Amount of Diol (g) | 0.33 | 0.22 | 0.35 | 0.24 | 0.16 | 0.25 |
| Amount of Diol (mol) | 0.00075 | 0.00050 | 0.00080 | 0.00075 | 0.00051 | 0.00080 |
| Mw | 37000 | 71000 | 37000 | 33000 | 47000 | 42000 |
| Q-value [ml/s] 160 kg | 0.4000 | 0.0266 | 0.3267 | 0.4357 | 0.1569 | 0.2258 |
| N-value | 1.22 | 1.25 | 1.19 | 1.18 | 1.22 | 1.18 |
| Tg (° C.) | 151 | 155 | 151 | 150 | 153 | 153 |
| Ratio of Polymer Molecules having "i" = 1 (mol %) | 96 | 98 | 88 | 89 | 92 | 94 |
| Ratio of Structure Represented by Formula (I) (mol %) | 1.9 | 1.3 | 2.0 | 1.9 | 1.3 | 2.0 |

|  | Example 10 | Example 11 | Example 12 | Example 13 | Example 14 | Example 15 |
| --- | --- | --- | --- | --- | --- | --- |
| Prepolymer Used | PP-A | PP-B | PP-C | PP-A | PP-B | PP-C |
| Diol | BP-2EO | BP-2EO | BP-2EO | FG | FG | FG |

TABLE 3-continued

| Formula Weight of Diol | 274 | 274 | 274 | 226 | 226 | 226 |
|---|---|---|---|---|---|---|
| Amount of Diol (g) | 0.20 | 0.14 | 0.22 | 0.17 | 0.12 | 0.18 |
| Amount of Diol (mol) | 0.00073 | 0.00051 | 0.00080 | 0.00075 | 0.00051 | 0.00080 |
| Mw | 52688 | 61000 | 47000 | 46000 | 48000 | 43000 |
| Q-value [ml/s] 160 kg | 0.1799 | 0.0523 | 0.1600 | 0.2200 | 0.2213 | 0.2844 |
| N-value | 1.18 | 1.22 | 1.22 | 1.13 | 1.21 | 1.20 |
| Tg (° C.) | 152 | 153 | 151 | 152 | 152 | 151 |
| Ratio of Polymer Molecules having "i" = 1 (mol %) | 78 | 100 | 74 | 100 | 100 | 100 |
| Ratio of Structure Represented by Formula (I) (mol %) | 1.9 | 1.3 | 2.0 | 1.9 | 1.3 | 2.0 |

TABLE 4

|  | Comparative Example 4 | Comparative Example 5 |
|---|---|---|
| BPA (g) | 50.96 | 50.98 |
| BPA (mol) | 0.2232 | 0.2233 |
| DPC (g) | 49.04 | 49.04 |
| DPC (mol) | 0.229 | 0.229 |
| DPC/BPA Molar Ratio | 1.03 | 1.03 |
| Diol | — | — |
| Formula Weight of Diol | — | — |
| Amount of Diol (g) | — | — |
| Amount of Diol (mol) | — | — |
| Mw | 44000 | 50000 |
| Q-value [ml/s] 160 kg | 0.1264 | 0.0788 |
| N-value | 1.30 | 1.31 |

Example of Production of Prepolymer 4; PP-D 10,000.6 g (43.81 mol) of 2,2-bis(4-hydroxyphenyl)propane, 10,560.0 g (49.30 mol) of diphenyl carbonate and 0.5 μmol/mol of cesium carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis(4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 1 hour to obtain a polycarbonate prepolymer having the weight average molecular weight (Mw) of 22,000, hereinafter "PP-D".

The concentration of hydroxy groups (ppm) and the concentration of terminal phenyl groups (mol %) of the polycarbonate prepolymer thus obtained were shown in Table 5.

In Table 5, the concentration of hydroxy groups means the concentration of all the OH groups contained in the polymer which was calculated by $^1$H-NMR analysis. In Table 5, the concentration of terminal phenyl groups means the concentration of the terminal phenyl groups based on all the phenylene groups and phenyl groups in phenyl terminals including the phenyl groups substituted by hydroxy groups.

Example 16

30 g of the aromatic polycarbonate prepolymer PP-D which was obtained by the above-mentioned Example of Production of Prepolymer 4 was charged into a four-neck flask of 300 cc equipped with a stirrer and a distiller and was heated and melted under normal pressure at 280° C.

Subsequently, 0.22 g of 1,4-cyclohexanedimethanol (CHDM) which was the aliphatic diol compound was charged therein, and the mixture was stirred and kneaded for 1 minute at a jacket temperature of 280° C. under normal pressure. Then, the mixture was stirred and kneaded under reduced pressure of 0.04 kPaA (0.3 torr) for 45 minutes to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 48,000, Q-value of 0.1294, the content of the polymer molecules having the structure with "i"=1 (which was the rate of the aliphatic diol skeleton having "i"=1) of 100 mol %, and N-value of 1.22. The results were shown in Table 6.

Example 17

30 g of the aromatic polycarbonate prepolymer PP-D which was obtained by the above-mentioned Example of Production of Prepolymer 4 was charged into a four-neck flask of 300 cc equipped with a stirrer and a distiller and was heated and melted under normal pressure at 300° C.

Subsequently, 0.22 g of 1,4-cyclohexanedimethanol (CHDM) which was the aliphatic diol compound was charged therein, and the mixture was stirred and kneaded for 15 minutes at a jacket temperature of 300° C. under normal pressure. Then, the mixture was stirred and kneaded under reduced pressure of 0.04 kPaA (0.3 torr) for 45 minutes to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 65,000, Q-value of 0.0305, the content of the polymer molecules having the structure with "i"=1 (which was the rate of the aliphatic diol skeleton having "i"=1) of 100 mol %, and N-value of 1.20. The results were shown in Table 6.

Example 18

30 g of the aromatic polycarbonate prepolymer PP-D which was obtained by the above-mentioned Example of Production of Prepolymer 4 was charged into a four-neck flask of 300 cc equipped with a stirrer and a distiller and was heated and melted under normal pressure at 300° C.

Subsequently, 0.30 g of decalindimethanol (DDM) which was the aliphatic diol compound was charged therein, and the mixture was stirred and kneaded for 15 minutes at a jacket temperature of 300° C. under normal pressure. Then, the mixture was stirred and kneaded under reduced pressure of 0.04 kPaA (0.3 torr) for 30 minutes to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 66,000, Q-value of 0.0319, the content of the polymer molecules having the structure with "i"=1 (which was the rate of the aliphatic diol skeleton having "i"=1) of 100 mol %, and N-value of 1.19. The results were shown in Table 6.

Example 19

30 g of the aromatic polycarbonate prepolymer PP-D which was obtained by the above-mentioned Example of Production of Prepolymer 4 was charged into a four-neck flask of 300 cc equipped with a stirrer and a distiller and was heated and melted under normal pressure at 280° C.

Subsequently, 0.30 g of decalindimethanol (DDM) which was the aliphatic diol compound was charged therein, and the mixture was stirred and kneaded for 1 minute at a jacket temperature of 280° C. under normal pressure. Then, the mixture was stirred and kneaded under reduced pressure of 0.04 kPaA (0.3 torr) for 55 minutes to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 61,000, Q-value of 0.0440, the content of the polymer molecules having the structure with "i"=1 (which was the rate of the aliphatic diol skeleton having "i"=1) of 100 mol %, and N-value of 1.17. The results were shown in Table 6.

TABLE 5

|  | PP-D |
|---|---|
| BPA (g) | 10000.6 |
| BPA (mol) | 43.81 |
| DPC (g) | 10560 |
| DPC (mol) | 49.30 |
| DPC/BPA Molar Ratio | 1.13 |
| Mw | 22000 |
| OH Concentration (ppm) | 60 |
| Terminal Ph Concentration (mol %) | 5.0 |

TABLE 6

|  | Example 16 | Example 17 | Example 18 | Example 19 |
|---|---|---|---|---|
| Prepolymer Used | PP-D | PP-D | PP-D | PP-D |
| Diol | CHDM | CHDM | DDM | DDM |
| Formula Weight of Diol | 144 | 144 | 198 | 198 |
| Amount of Diol (g) | 0.22 | 0.22 | 0.30 | 0.30 |
| Amount of Diol (mol) | 0.00151 | 0.00151 | 0.00151 | 0.00151 |
| Mw | 48000 | 65000 | 66000 | 61000 |
| Q-value [ml/s] 160 kg | 0.1294 | 0.0305 | 0.0319 | 0.0440 |
| N-value | 1.22 | 1.20 | 1.19 | 1.17 |
| Tg (° C.) | 149 | 150 | 149 | 150 |
| Ratio of Polymer Molecules having "i" = 1 (mol %) | 100 | 100 | 100 | 100 |
| Ratio of Structure Represented by Formula (I) (mol %) | 1.3 | 1.3 | 1.3 | 1.3 |

Figure 3:
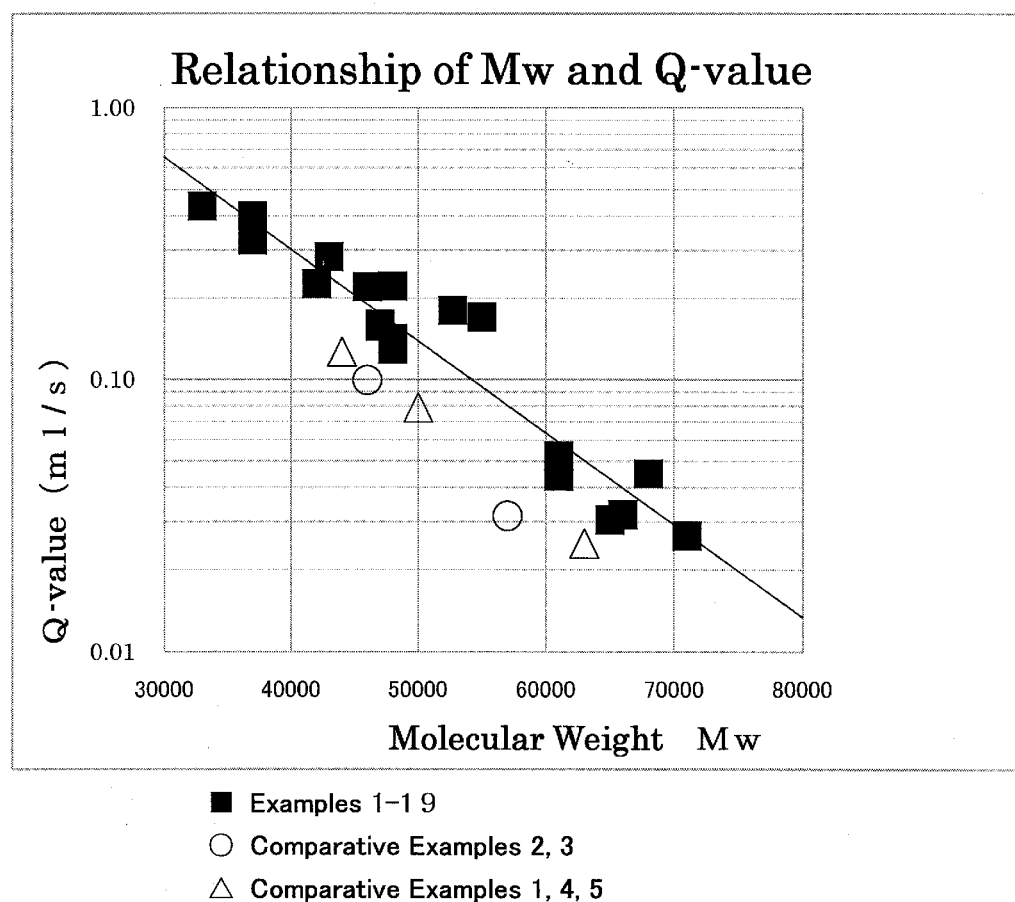
FIG. 3 shows a graph showing the relationship of Mw and Q-value (280° C., 160 kg load) of the polycarbonates obtained by Examples 1-19 and Comparative Examples 1-5.

FIG. 3 shows a relationship between Mw and Q-value (160 kg load, 280° C.) of the polycarbonates obtained in the above Examples and Comparative Examples. It shows that the polycarbonate copolymers of the present invention have a tendency that higher fluidity can be achieved for the same molecular weight compared to the conventional polycarbonate resins.

In the FIG. 3, the polycarbonate copolymers of the present invention (Examples 1-19) are shown as ■, black square, the polycarbonates obtained by interfacial polymerization (Comparative Examples 2, 3) are shown as ○, white circle, and the polycarbonates obtained by conventional melt polymerization having no aliphatic diol structures derived from aliphatic diol compound (Comparative Examples 1, 4, 5) are shown as Δ, white triangle. FIG. 3 shows that the polycarbonate copolymers of the present invention (Examples 1-19) has higher fluidity compared to the polycarbonates obtained by interfacial polymerization (Comparative Examples 2, 3) or the polycarbonates obtained by conventional melt polymerization having no aliphatic diol structures derived from aliphatic diol compound (Comparative Examples 1, 4, 5)

Figure 4:
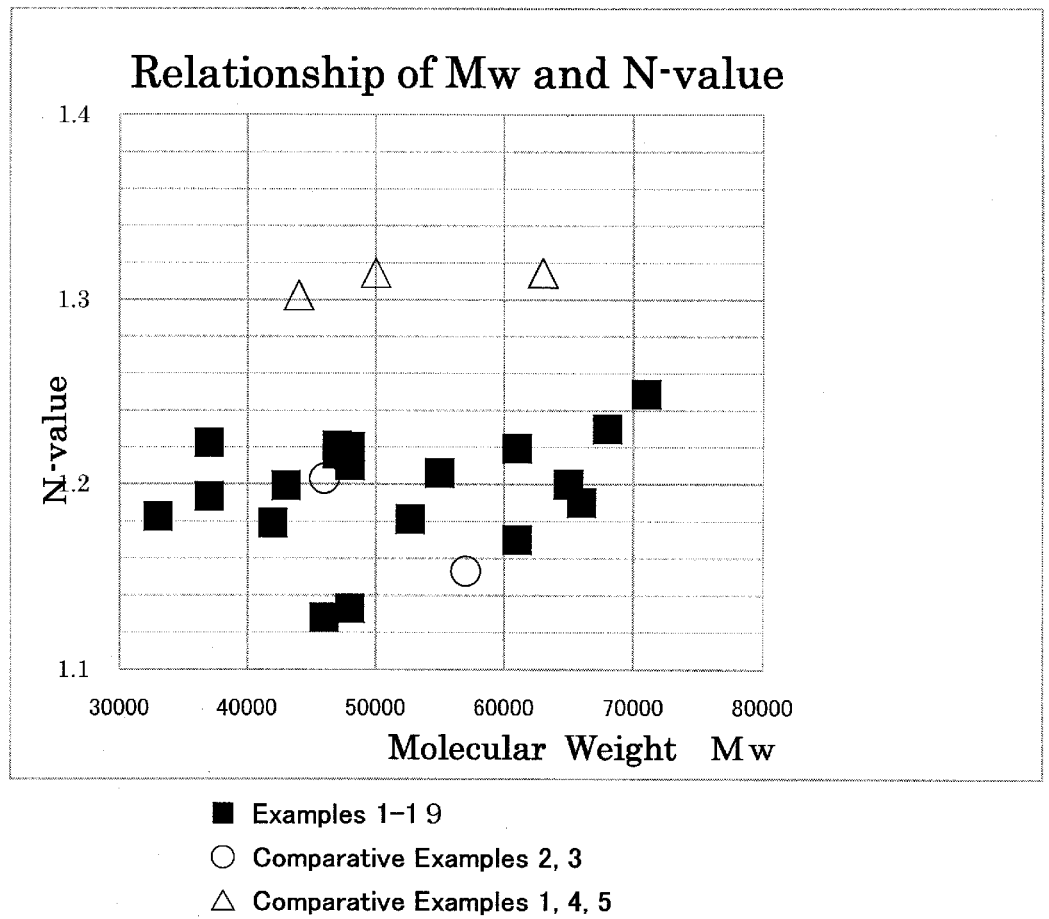
FIG. 4 shows a graph showing the relationship of Mw and N-value of the polycarbonates obtained by Examples 1-19 and Comparative Examples 1-5.

FIG. 4 shows a relationship between Mw and N-value of the polycarbonates obtained in the above Examples and Comparative Examples. The N-value of the polycarbonate copolymers of the present invention are clearly low which indicates that the content of a branching structure is extremely small though produced by melt polymerization.

Example 20

30.13 g of the aromatic polycarbonate prepolymer PP-D which was obtained by the above-mentioned Example of Production of Prepolymer 4 was charged into a four-neck flask of 300 cc equipped with a stirrer and a distiller and was heated and melted under normal pressure at 280° C.

Subsequently, 0.34 g of 2-butyl-2-ethylpropane-1,3-diol (BEPD) which was the aliphatic diol compound was charged therein, and the mixture was stirred and kneaded for 3 minute at a jacket temperature of 280° C. under normal pressure.

Then, the mixture was stirred and kneaded under reduced pressure of 0.04 kPaA (0.3 torr) for 70 minutes to carry out a transesterification reaction. Regarding the catalyst, the polymerization catalyst which had been used in the process of preparing the aromatic polycarbonate prepolymer was continuously used directly.

Phenol, cyclic carbonate (5-butyl-5-ethyl-1,3-dioxane-2-on) and unreacted 2-butyl-2-ethylpropane-1,3-diol (BEPD) were distilled from the reaction system was condensed in a cooling tube to remove away to obtain a polycarbonate resin having the weight average molecular weight (Mw) of 56,400, N-value of 1.19, the content of cyclic carbonate (5-butyl-5-ethyl-1,3-dioxane-2-on) of 154 ppm.

1 g of a the resin thus obtained was charged into a test tube and was dried for 2 hours by a block heater at 120° C. in a nitrogen-substituted glove box with the oxygen concentration of 0.0%. Subsequently, heat retention was loaded for 50 minutes in said glove box by a block heater at 360° C. As a result, the molecular weight (Mw) retention rate (%) before and after the heat retention test was 98% and the amount of change in YI-value was +5.0.

Figure 5:
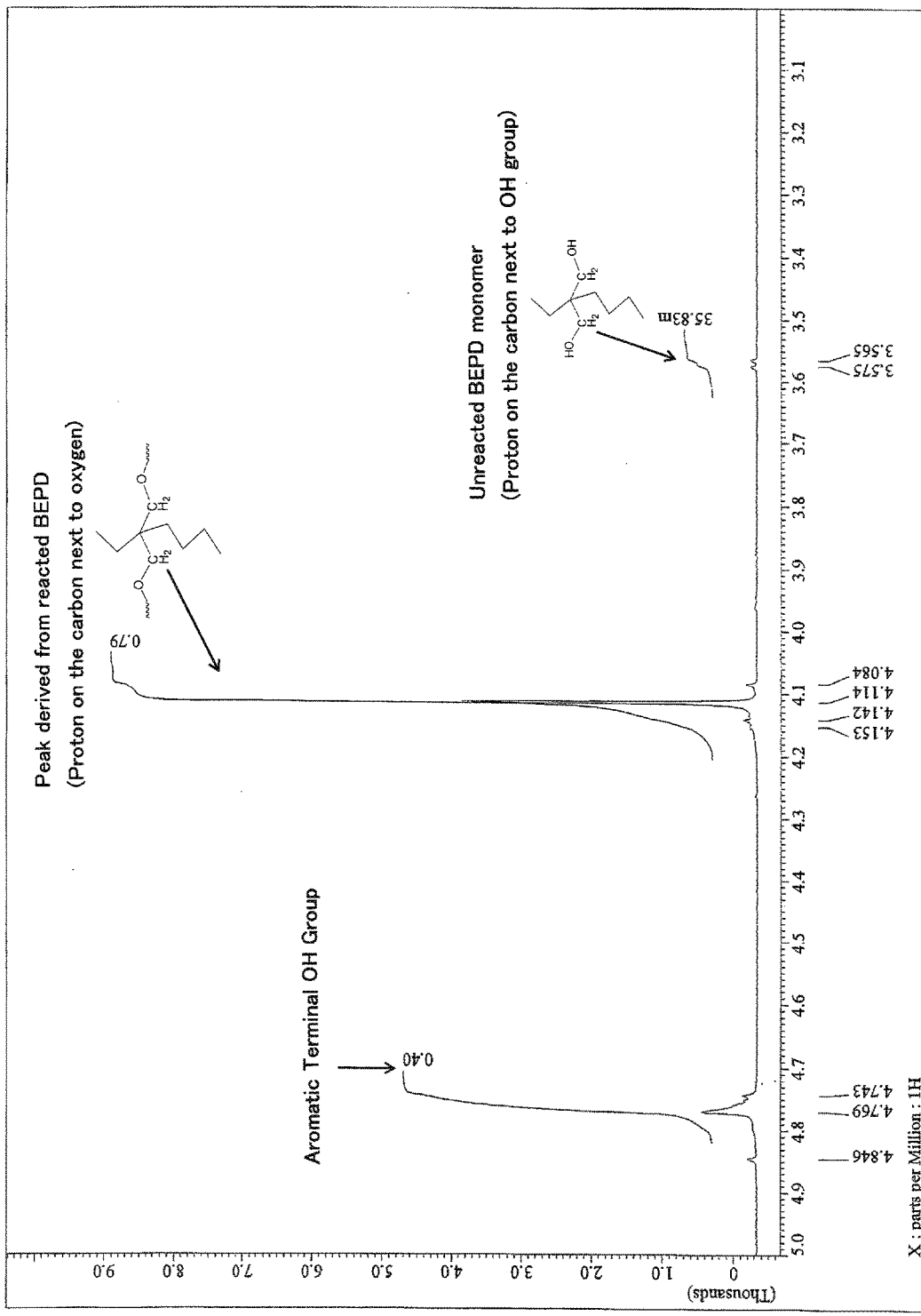
FIG. 5 shows a $^1$H-NMR chart of the reaction product obtained by Example 20.
Figure 6:
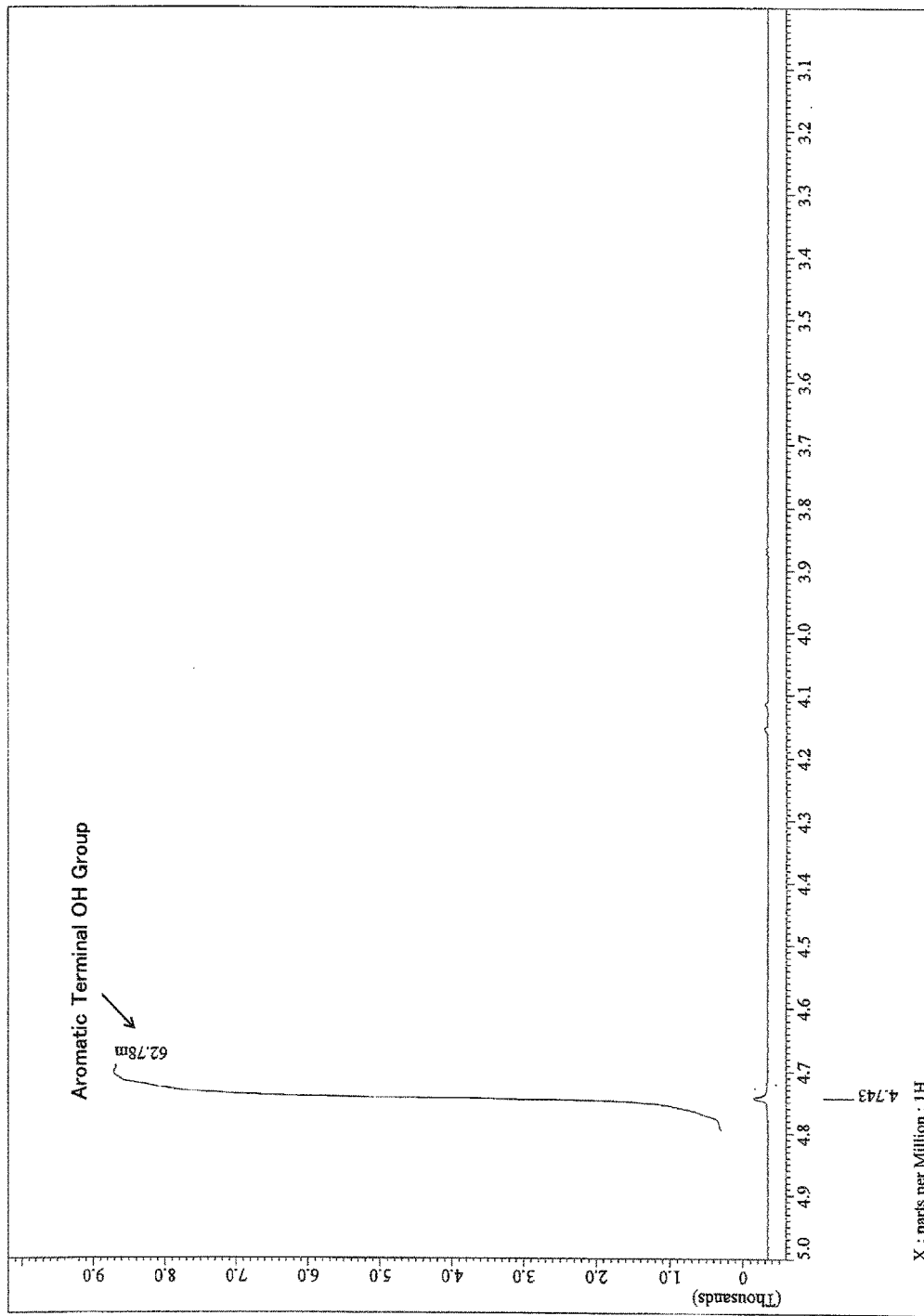
FIG. 6 shows a $^1$H-NMR chart of the resin obtained by Example 20.

1H-NMR chart of the mixture at the time that adding BEPD and stirring was completed was shown in FIG. 5. 1H-NMR chart of the polycarbonate resin finally obtained was shown in FIG. 6.

In FIG. 5, the peak of the structure derived from BEPD reacted with the aromatic polycarbonate prepolymer was recognized as a different peak from that of the unreacted BEPD monomer. In FIG. 6, on the other hand, the peak of the structure derived from BEPD reacted with the aromatic polycarbonate prepolymer and the peak of the unreacted BEPD monomer was disappeared.

From this result, the aromatic polycarbonate resin thus obtained was recognized as a polycarbonate homopolymer which does not have a structure derived from the aliphatic diol compound. It can be assumed that the aromatic diol compound added was once reacted with the aromatic polycarbonate prepolymer and then was removed as a cyclic carbonate.

Examples 21-26

The experiments were carried out in the same manner as in Example 20 except for using the aromatic polycarbonate prepolymers, the aliphatic diol compounds and the amounts used as shown in Table 7 to obtain polycarbonate resins. The properties of the polycarbonate resins thus obtained were shown in Table 7.

Comparative Example 6

The experiments was carried out in the same manner as in Example 20, that is, the reaction was carried out in a short time in the same manner as in Example 20, except that the aliphatic diol compound was not added.

Mw of the polycarbonate resin thus obtained was 22,000 which was not increased by the reaction.

TABLE 7

|  | Example 20 | Example 21 | Example 22 | Example 23 | Example 24 | Example 25 | Example 26 | Comparative Example 6 |
|---|---|---|---|---|---|---|---|---|
| Prepolymer Used | PP-D | PP-D | PP-D | PP-D | PP-D | PP-D | PP-D | PP-D |
| Amount of Prepolymer (g) | 30.13 | 30.02 | 29.98 | 30.05 | 30.13 | 30.00 | 30.06 | 30.00 |
| Diol | BEPD | DIBPD | EMPD | DEPD | MPPD | NPG-DI | 1,2-PD | 無添加 |
| Boiling Point of Diol (° C.) | 271 | 280 | 226 | 250 | 230 | — | 188 | — |
| Formula Weight of Diol | 160 | 188 | 118 | 132 | 132 | 234 | 76 | — |
| Amount of Diol (g) | 0.34 | 0.36 | 0.19 | 0.21 | 0.27 | 0.52 | 0.53 | — |
| Amount of Diol (mol) | 0.00211 | 0.00189 | 0.00163 | 0.00161 | 0.00205 | 0.00220 | 0.00693 | — |
| Molar number of Diol per mol of the total amount of terminals of PP | 0.33 | 0.29 | 0.25 | 0.25 | 0.32 | 0.34 | 0.35 | — |
| Ratio of structure represented by formula (I) at the time of completion of mixing and kneading (mol %) | 1.21 | 1.14 | 0.71 | 0.79 | 0.93 | 1.02 | 0.13 | — |
| Mw of Resin Obtained | 56400 | 41700 | 44000 | 42700 | 37000 | 38600 | 36100 | 22000 |
| N-value of Resin Obtained | 1.21 | 1.21 | 1.20 | 1.19 | 1.21 | 1.19 | 1.20 |  |
| Tg of Resin Obtained (° C.) | 149 | 149 | 149 | 149 | 148 | 148 | 148 |  |
| Ratio of structure represented by formula (I) of the Resin obtained (mol %) | 0.00 | 0.07 | 0.09 | 0.03 | 0.00 | 0.34 | 0.00 |  |
| Content of Cyclic Carbonate (ppm) | 154.211 | 674.570 | 23.876 | 49.286 | 23.247 | 4.931 | 0.042 |  |
| Mw before 360° C.-50 min Heat Retention Test | 56400 | 41700 | 44000 | 42700 | 37000 | 38600 | 36100 |  |
| Mw after 360° C.-50 min Heat Retention Test | 55000 | 38300 | 33200 | 40000 | 31000 | 30000 | 22000 |  |
| Mw Retention Rate (%) | 98 | 92 | 75 | 94 | 84 | 78 | 61 |  |
| YI-value before 360° C.-50 min Heat Retention Test | 0.5 | 0.9 | 1.1 | 0.9 | 1.2 | 1.2 | 0.8 |  |
| YI-value after 360° C.-50 min Heat Retention Test | 6.0 | 24.5 | 17.3 | 16.3 | 25.1 | 29.4 | 18.8 |  |
| Amount of Change in YI-value | 5.0 | 23.6 | 16.2 | 15.4 | 23.9 | 28.2 | 18.0 |  |

As shown in Examples 20-26, the rate (mol number) of the structure derived from the aliphatic diol compound in the polymer finally obtained was remarkably reduced compared to the rate (mol number) in the polymer at the time that adding the aliphatic diol compound and kneading were completed. According to the process for producing of the present invention using the aliphatic diol compound having the structures represented by any one of the above formulas (g1)-(g4), the rate (mol number) of the structure derived from the aliphatic diol compound in the polymer finally obtained was 50% or less, preferably 40% or less, more preferably 30% or less, further preferably 20% or less, most preferably 10% or less based upon the rate (mol number) of the structure derived from the aliphatic diol compound in the polymer at the time that adding the aliphatic diol compound and kneading were completed.

From the results shown in Examples 20-26, it is clear that the highly polymerized polycarbonate resin obtained by the process of the present invention using the aliphatic diol compound having the structures represented by any one of the above formulas (g1)-(g4) which has the structure similar to a polycarbonate homopolymer is highly excellent in heat stability. Moreover, the high molecular weight (Mw) retention rate (%) is high and the amount of change in YI-value is low before and after the heat retention test of extremely severe conditions of 360° C.-50 min.

The heat stability of polycarbonate copolymers obtained in the above Examples 1-3 was measured and the results were shown below. According to the results shown below, it is clear that the highly polymerized polycarbonate resin obtained by the process of the present invention using the aliphatic diol compound having the structures represented by any one of the above formulas (g1)-(g4) is extremely excellent in heat stability even compared to the polycarbonate copolymer of the present invention. The heat retention test was also carried out with the polycarbonate resin obtained in Comparative Example 1 which was highly polymerized by the conventional melt polymerization. However, gelation was occurred and it was difficult to measure the properties.

Example 1

Before 360° C.-50 min Retention Test: Mw=55,000
After 360° C.-50 min Retention Test: Mw=21,400
Mw retention rate=39%
Before 360° C.-50 min Retention Test: YI-value=1.0
After 360° C.-50 min Retention Test: YI-value=58.0
The amount of change in YI-value; 57.0

Example 2

Before 360° C.-50 min Retention Test: Mw=68,000
After 360° C.-50 min Retention Test: Mw=28,000
Mw retention rate=41%
Before 360° C.-50 min Retention Test: YI-value=1.6
After 360° C.-50 min Retention Test: YI-value=60.0
The amount of change in YI-value; 58.4

Example 3

Before 360° C.-50 min Retention Test: Mw=48,000
After 360° C.-50 min Retention Test: Mw=23,000
Mw retention rate=48%
Before 360° C.-50 min Retention Test: YI-value=1.0
After 360° C.-50 min Retention Test: YI-value=65.0
The amount of change in YI-value; 64.0

Example 27

50.000 g (0.219 mol) of 2,2-bis(4-hydroxyphenyl)propane, 48.019 g (0.224 mol) of diphenyl carbonate and 1 µmol/mol of sodium hydrogen carbonate as a catalyst were charged into a four-neck flask of 500 cc equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and, keeping the above temperature, the transesterification reaction was carried out for 40 minutes.

Then, the temperature was raised to 225° C. at a rate of 75° C./hr and the temperature was kept as above for 10 minutes.

Subsequently, the temperature was raised to 260° C. at a rate of 65° C./hr and, the pressure was reduced to 0.13 kPaA (1 torr) or less taking 1 hour, and then the pressure and temperature were kept as above for additionally 40 minutes to obtain 50 g of aromatic polycarbonate compound having the weight average molecular weight (Mw) of 29,000, which was a prepolymer for use for producing an aromatic polycarbonate resin, hereinafter "aromatic polycarbonate prepolymer" or "PP".

The aromatic polycarbonate prepolymer thus obtained had the concentration of terminal hydroxy groups of 1500 ppm, the concentration of the terminal phenyl groups of 3.5 mol %, and N-value of 1.23. The results are shown in Table 1.

10 g of the aromatic polycarbonate prepolymer thus obtained was charged into a four-neck flask of 300 cc equipped with a stirrer and a distiller and was heated and melted under vacuum at 280° C.

Subsequently, 0.153 g of 9,9-bis[4-(2-hydroxyethoxy)phenyl]fluorene (BPEF) which was the aliphatic diol compound was charged therein, and the mixture was stirred and kneaded for 30 minutes at a jacket temperature of 280° C. under reduced pressure of 0.04 kPaA (0.3 torr) to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 60,000. The results are shown in Table 8.

Examples 28-31

The experiments were carried out in the same manner as in Example 27 except for changing the amounts of 2,2-bis(4-hydroxyphenyl)propane and diphenyl carbonate, the aliphatic diol compounds and the amount thereof as shown in Table 8 to obtain polycarbonate resins. The results are shown in Table 8.

Example 32

10,000 g (43.8 mol) of 2,2-bis(4-hydroxyphenyl)propane, 10,322 g (48.2 mol) of diphenyl carbonate and 1 µmol/mol of sodium hydrogen carbonate as a catalyst were charged into a 50-liter SUS316 reactor equipped with a stirrer and a distiller, and the air in the reactor was substituted with nitrogen. The amount of catalyst was calculated as the number of moles based upon the amount of 2,2-bis(4-hydroxyphenyl)propane.

The degree of pressure reduction was adjusted to 27 kPaA (200 torr) and the starting materials were heated and melted at 200° C. with stirring for 30 minutes.

Subsequently, a transesterification reaction was carried out for 4 hours while condensing phenol distilled from the reaction system in a cooling tube and removing, keeping the internal temperature at 260° C. and the degree of pressure reduction at 0.13 kPaA (1 torr) or less for 1 hour to obtain a polycarbonate prepolymer having the weight average molecular weight (Mw) of 23,000.

The aromatic polycarbonate prepolymer thus obtained had the concentration of terminal hydroxy groups of 500 ppm, the concentration of the terminal phenyl groups of 6.6 mol %, and N-value of 1.20. The results are shown in Table 8.

In Table 8, the concentration of hydroxy groups means the concentration of all the OH groups contained in the polymer. The concentration of terminal phenyl groups means the concentration of the terminal phenyl groups based on all the phenylene groups and phenyl groups in phenyl terminals, which was calculated by $^1$H-NMR analysis 10 g of the aromatic polycarbonate prepolymer thus obtained was charged into a four-neck flask of 300 cc equipped with a stirrer and a distiller and was heated and melted under vacuum at 280° C.

Subsequently, 0.33 g of 9,9-bis[4-(2-hydroxyethoxy)phenyl]fluorene (BPEF) which was the aliphatic diol compound was charged therein, and the mixture was stirred and kneaded for 15 minutes at a jacket temperature of 280° C. under reduced pressure of 0.04 kPaA (0.3 torr) to carry out a transesterification reaction. Regarding the catalyst, the polymerization catalyst which had been used in the process of preparing the aromatic polycarbonate prepolymer was continuously used directly.

Phenol distilled from the reaction system was condensed in a cooling tube to remove away to obtain a polycarbonate copolymer having the weight average molecular weight (Mw) of 50,000. The results were shown in Table 8.

Examples 33-36

The experiments were carried out in the same manner as in Example 32 except for changing the amounts of 2,2-bis(4-hydroxyphenyl)propane and diphenyl carbonate, the aliphatic diol compounds and the amount thereof as shown in Table 8 to obtain polycarbonate resins. The results were shown in Table 8.

Figure 7:
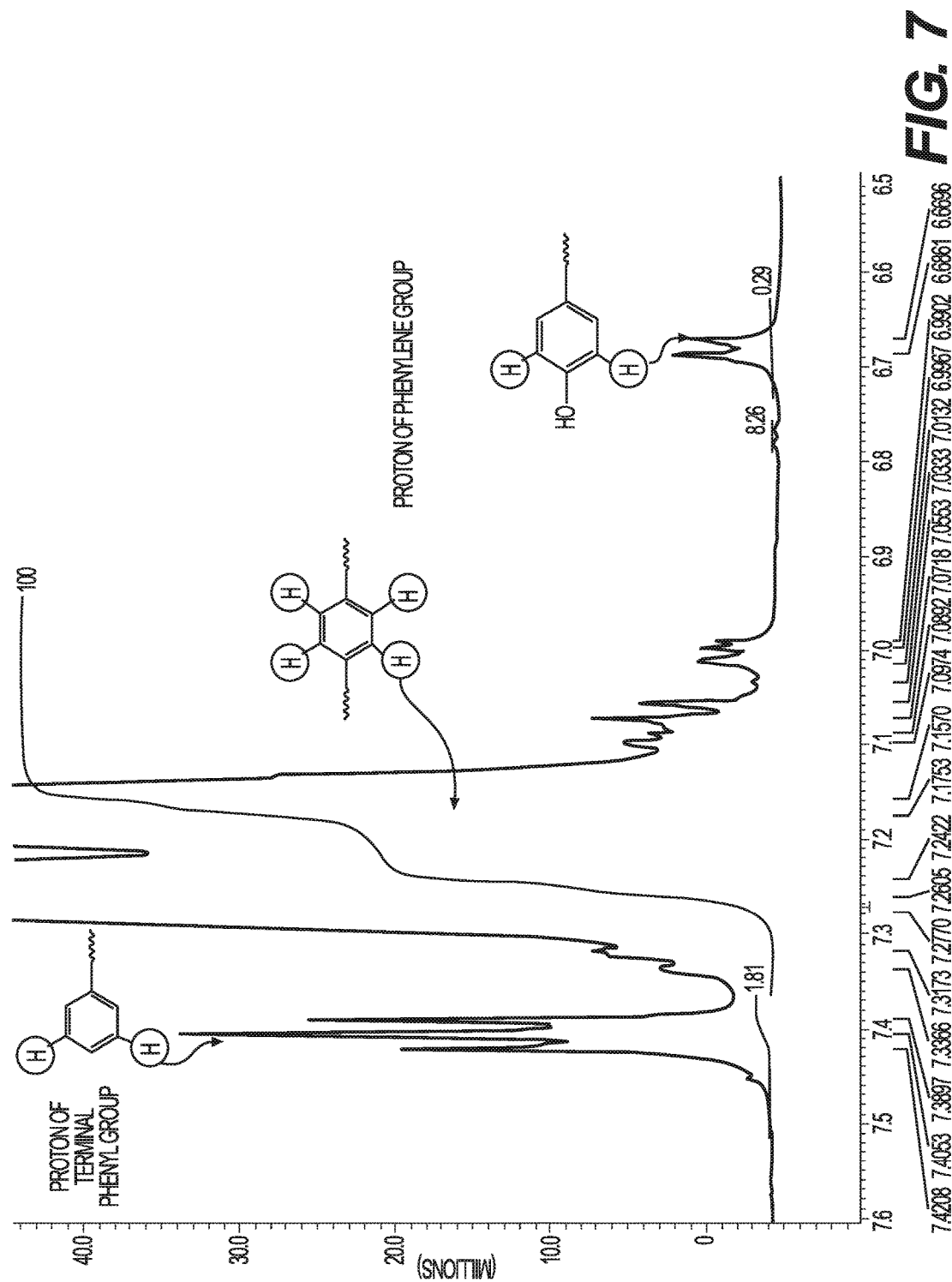
FIG. 7 shows a $^1$H-NMR chart of the aromatic polycarbonate prepolymer obtained by Example 34.

The result of $^1$H-NMR analysis of the aromatic polycarbonate prepolymer obtained by Example 34 was shown in FIG. 7. FIG. 7 shows a magnified figure of the peaks derived from a phenyl group and a phenylene group of the polycarbonate prepolymer, according to which the peak derived from the terminal phenyl group.

The phenylene group of 2,2-bis(4-hydroxyphenyl)propane unit has signals at 7.0-7.3 ppm, but the peak derived from the terminal phenyl group has at near 7.4 ppm. The concentration of terminal phenyl groups was calculated from the ratio of strength of these signals.

Example 37

50.000 g (0.219 mol) of 2,2-bis(4-hydroxyphenyl)propane, 49.000 g (0.229 mol) of diphenyl carbonate, 0.210 g (0.00069 mol) of 1,1,1-trisphenolethane (hereinafter, "TPE") and 3 μmol/mol of sodium hydrogen carbonate as a catalyst were charged into a four-neck flask of 500 cc equipped with a stirrer and a distiller and was heated at 180° C. in an nitrogen atmosphere with stirring for 30 minutes.

Subsequently, the degree of pressure reduction was adjusted to 20 kPaA (150 torr) and simultaneously the temperature was raised to 200° C. at a rate of 60° C./hr and, keeping the above temperature, the transesterification reaction was carried out for 40 minutes.

Then, the temperature was raised to 225° C. at a rate of 75° C./hr and the temperature was kept as above for 10 minutes.

Subsequently, the temperature was raised to 260° C. at a rate of 65° C./hr and, the pressure was reduced to 0.13 kPaA (1 torr) or less taking 1 hour, whereby 50 g of an aromatic polycarbonate prepolymer having the weight average molecular weight (Mw) of 27,000 was obtained.

The aromatic polycarbonate prepolymer thus obtained had the concentration of terminal hydroxy groups of 480 ppm, the concentration of the terminal phenyl groups of 7.3 mol %, and N-value of 1.31. The results were shown in Table 9.

In Table 9, the concentration of hydroxy groups means the concentration of all the OH groups contained in the polymer, which was calculated by $^1$H-NMR analysis. The concentration of terminal phenyl groups means the concentration of the terminal phenyl groups based on all the phenylene groups and phenyl groups in phenyl terminals, which was calculated by $^1$H-NMR analysis.

10 g of the aromatic polycarbonate prepolymer thus obtained was charged into a four-neck flask of 300 cc equipped with a stirrer and a distiller and was heated and melted under vacuum at 290° C.

Subsequently, 0.328 g (2.1 mmol) of 9,9-bis[4-(2-hydroxyethoxy)phenyl]fluorene (BPEF) was added therein, and the mixture was stirred and kneaded for 15 minutes at a jacket temperature of 290° C. under reduced pressure of 0.04 kPaA (0.3 torr).

Phenol distilled from the reaction system was condensed in a cooling tube to remove away to obtain an aromatic polycarbonate resin having the weight average molecular weight (Mw) of 55,000. The results were shown in Table 9.

Example 38

The experiment was carried out in the same manner as in Example 37 except for changing the amount of 2,2-bis(4-hydroxyphenyl)propane, diphenyl carbonate, 1,1,1-trisphenolethane and the aliphatic diol compound as shown in Table 9. The results were shown in Table 9.

Comparative Example 7

The experiment was carried out in the same manner as in Example 32 except for changing the amount of 2,2-bis(4-hydroxyphenyl)propane, diphenyl carbonate and the aliphatic diol compound and the amount thereof as shown in Table 8. The results were shown in Table 8.

The aromatic polycarbonate resin thus obtained had a high concentration of terminal hydroxy groups and a low concentration of terminal phenyl groups and therefore, the polymer was not sufficiently highly polymerized.

Comparative Example 8

The experiment was carried out in the same manner as in Example 37 except for changing the amount of 2,2-bis(4- hydroxyphenyl)propane, diphenyl carbonate, 1,1,1-trisphenolethane and the aliphatic diol compound as shown in Table 9. The results were shown in Table 9.

The aromatic polycarbonate resin thus obtained had a high concentration of terminal hydroxy groups and a low concentration of terminal phenyl groups, and therefore, the polymer was not sufficiently highly polymerized.

weight keeping useful properties of a polycarbonate by conventional interfacial polymerization without using other resins or additives. In addition, it is possible to produce the polycarbonate copolymer by a simple process without requiring restricted manufacturing conditions.

When the high fluidity polycarbonate copolymer of the present invention is used as an alternative for the conven-

TABLE 8

|  | BPA | | DPC | | DPC/BPA Molar Ratio | PP Mw | Residual DPC ppm | Residual PhOH ppm | Terminal OH Conc. ppm | Terminal Ph Conc. mol % | N-value | PP (g) | Diol | Formula Weight of Diol | Amount of Diol (g) | Copolymer Mw |
|---|---|---|---|---|---|---|---|---|---|---|---|---|---|---|---|---|
|  | (g) | (mol) | (g) | (mol) | | | | | | | | | | | | |
| Ex. 27 | 50.000 | 0.219 | 48.091 | 0.224 | 1.025 | 29000 | 200 | 240 | 1500 | 3.5 | 1.23 | 10 | BPEF | 438.51 | 0.153 | 60000 |
| Ex. 28 | 50.000 | 0.219 | 49.264 | 0.230 | 1.050 | 30000 | 600 | 120 | 700 | 5.7 | 1.23 | 10 | BPA-2EO | 316.39 | 0.182 | 60000 |
| Ex. 29 | 50.000 | 0.219 | 50.437 | 0.235 | 1.075 | 21000 | 1500 | 20 | 70 | 7.4 | 1.15 | 10 | BP-2EO | 274.31 | 0.209 | 42000 |
| Ex. 30 | 50.000 | 0.219 | 51.610 | 0.241 | 1.100 | 21000 | 1600 | 20 | 30 | 7.7 | 1.18 | 10 | PCPDM | 262.39 | 0.210 | 42000 |
| Ex. 31 | 50.000 | 0.219 | 48.091 | 0.224 | 1.025 | 48000 | 100 | 40 | 1000 | 2.0 | 1.29 | 10 | BPEF | 438.51 | 0.086 | 55000 |
| Ex. 32 | 10000 | 43.8 | 10322 | 48.2 | 1.100 | 23000 | 900 | 150 | 500 | 6.6 | 1.20 | 10 | BPEF | 438.51 | 0.295 | 50000 |
| Ex. 33 | 10000 | 43.8 | 10557 | 49.3 | 1.125 | 20000 | 1900 | 140 | 300 | 7.9 | 1.14 | 10 | SPA-2EO | 316.39 | 0.257 | 44000 |
| Ex. 34 | 10000 | 43.8 | 10322 | 48.2 | 1.100 | 21000 | 900 | 250 | 600 | 6.8 | 1.13 | 10 | BP-2EO | 274.31 | 0.190 | 45000 |
| Ex. 35 | 10000 | 43.8 | 10557 | 49.3 | 1.125 | 19000 | 1500 | 190 | 500 | 7.6 | 1.12 | 10 | PCPDM | 262.39 | 0.207 | 41000 |
| Ex. 36 | 10000 | 43.8 | 10791 | 50.4 | 1.150 | 17000 | 2600 | 140 | 250 | 8.9 | 1.11 | 10 | FG | 226.27 | 0.209 | 35000 |
| C.Ex.7 | 10000 | 43.8 | 9618 | 44.9 | 1.025 | 31000 | 30 | 150 | 2700 | 1.9 | 1.24 | 10 | BPEF | 438.51 | 0.082 | 32000 |

TABLE 9

|  | BPA | | TPE | | DPC | | DPC/BPA Mole Ratio | PP Mw | Residual DPC ppm | Residual PhOH ppm | Terminal OH Conc. ppm | Terminal Ph Conc. mol % | N-value | PP (g) | Diol | Formula Weight of Diol | Amount of Diol (g) | Copolymer Mw |
|---|---|---|---|---|---|---|---|---|---|---|---|---|---|---|---|---|---|---|
|  | (g) | (mol) | (g) | (mol) | (g) | (mol) | | | | | | | | | | | | |
| Ex. 37 | 50.000 | 0.219 | 0.210 | 0.00069 | 49.000 | 0.229 | 1.047 | 27000 | 800 | 120 | 480 | 7.3 | 1.31 | 10 | BPEF | 438.51 | 0.328 | 55000 |
| Ex. 38 | 50.000 | 0.219 | 0.339 | 0.00111 | 49.000 | 0.229 | 1.049 | 28000 | 700 | 130 | 300 | 5.1 | 1.50 | 10 | BPEF | 438.51 | 0.225 | 60000 |
| Comp Ex. 8 | 50.000 | 0.219 | 0.210 | 0.00069 | 45.000 | 0.210 | 0.962 | 28000 | 50 | 100 | 2500 | 1.9 | 1.32 | 10 | BPEF | 438.51 | 0.082 | 29000 |

The abbreviated codes used in Tables 1-9 represent as follows:
PP: aromatic polycarbonate compound (=prepolymer)
BPA: 2,2-bis(4-hydroxyphenyl)propane
DPC: diphenylcarbonate
TPE: 1,1,1-trisphenolethane
BPEF: 9,9-bis[4-(2-hydroxyethoxy)phenyl]fluorene (Bp=625° C.)
BPA-2EO: 2,2'-bis[4-(2-hydroxyethoxy)phenyl]propane (Bp=480° C.)
BP-2EO: 4,4'-bis(2-hydroxyethoxy)biphenyl (Bp=430° C.)
PCPDM: pentacyclopentadecanedimethanol (Bp=420° C.)
FG:fluoreneglycol (Bp=370° C.)
CHDM: 1,4-cyclohexanedimethanol (Bp=283° C.)
DDM: decalindimethanol (Bp=34 IT)
BEPD: 2 butyl-2-ethylpropane-1,3-diol
DIBPD: 2,2-diisobutylpropane-1,3-diol
EMPD: 2-ethyl-2-methylpropane-1,3-diol
DEPD:2,2-diethylpropane-1,3-diol
MPPD:2-methyl-2-propylpropane-1,3-diol
NPG-D 1: bis(3-hydroxy-2,2-dimethylpropyl)carbonate
1,2-PD: propane-1,2-diol

INDUSTRIAL APPLICABILITY

The novel polycarbonate copolymer of the present invention has improved fluidity while having high molecular tional commonly-used polycarbonate resins or resin compositions, it has advantages such that a molding cycle will be shortened, the molding temperature will be decreased or the like.

Therefore, it can be used for various molded products or sheet or film products obtained by injection molding, blow molding, extrusion molding, injection blow molding, rotational molding, compression molding or the like. Furthermore, it will have advantages such as reduction of loads on natural environments and reduction of manufacturing cost by saving electric power consumption or the like. Therefore, the high fluidity polycarbonate copolymer of the present invention is an economically excellent and nature-friendly resin.

According to the process for producing a resin using the aliphatic diol compound having the structures represented by any one of the above formulas (g1)-(g4), a polycarbonate resin having not only high molecular weight, high fluidity and excellent quality but also having almost the same structure as a polycarbonate obtained by the interfacial polymerization and excellent heat resistance can be obtained by removing at least a part of cyclic carbonate produced as a by-product from the reaction system.

When the highly polymerized polycarbonate resin thus obtained is used as an alternative for the conventional commonly-used polycarbonate resins or resin compositions, it has advantages such that a molding cycle will be shortened, the molding temperature will be decreased or the like, as well as the above-mentioned polycarbonate copolymer of the present invention.

Therefore, it can be used for various molded products or sheet or film products obtained by injection molding, blow molding, extrusion molding, injection blow molding, rotational molding, compression molding or the like. Furthermore, it will have advantages such as reduction of loads on natural environments and reduction of manufacturing cost by saving electric power consumption or the like. Therefore, the highly polymerized polycarbonate resin of the present invention is an economically excellent and nature-friendly resin.

Especially, it exhibits an extremely excellent heat resistance. Even a thermal history that is a possible maximum level of a normal molding temperature for a molding process of polycarbonate is given, highly polymerized polycarbonate resin of the present invention can keep a high molecular (Mw) retention rate such as 70% or higher and a small amount of change in YI-value such as +25 or less. Therefore, it can be suitably used for high-precision molding wherein keeping the melt viscosity of polymer lower is required.

The novel aromatic polycarbonate compound has specific terminal properties and is suitable for using as a prepolymer material for producing a polycarbonate resin by reacting with an aliphatic diol compound having aliphatic hydrocarbon groups binding to the terminal hydroxy groups through a transesterification reaction.

Reacting the aromatic polycarbonate compound of the present invention with a specific aliphatic diol compound through a transesterification reaction enables the increase in molecular weight of the aromatic polycarbonate resin satisfactorily in a simple method while keeping good quality of the resin. Especially, a highly-polymerized high-fluidity polycarbonate copolymer scarcely containing a branching structure can be produced without using additives.

In the case of introducing a branching structure into the aromatic polycarbonate compound by using a predetermined amount of a branching agent, on the other hand, an aromatic polycarbonate resin having an intended branching degree can be produced with ease.

The invention claimed is:

1. A polycarbonate resin composition comprising a highly polymerized aromatic polycarbonate resin having a weight average molecular weight (Mw) in the range from 5,000 to 60,000 as a main component and also comprising cyclic polycarbonate represented by the following general formula (h3), the cyclic carbonate being present in an amount of not less than 0.0005 ppm and not more than 3000 ppm:

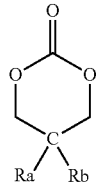

(h3)

wherein said Ra represents an ethyl group, and Rb represents a butyl group;

wherein the highly polymerized aromatic polycarbonate resin is produced by a process which comprises a highly-polymerizing process wherein an aromatic polycarbonate is reacted with an aliphatic diol compound represented by the following general formula (g3) in the presence of a transesterification catalyst to increase the molecular weight:

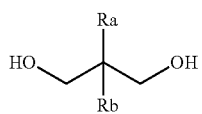

(g3)

wherein Ra and Rb are as defined above.

2. The polycarbonate resin composition according to claim 1, wherein said highly polymerized aromatic polycarbonate resin has a structural viscosity index (N-value) represented by the following mathematical formula (1) of 1.25 or less:

$$N\text{-value}=(\log(Q160)-\log(Q10))/(\log 160-\log 10) \quad (1)$$

wherein Q160 represents a melting fluid volume per unit time (ml/sec) measured under the conditions of 280° C. and 160 kg load, and Q10 represents a melting fluid volume per unit time (ml/sec) measured under the conditions of 280° C. and 10 kg load.

* * * * *